US012440553B2

(12) United States Patent
Cohen et al.

(10) Patent No.: US 12,440,553 B2
(45) Date of Patent: Oct. 14, 2025

(54) MULTIVALENT CARRIERS AND RELATED VACCINE COMPOSITIONS

(71) Applicant: California Institute of Technology, Pasadena, CA (US)

(72) Inventors: Alexander A. Cohen, Pasadena, CA (US); Pamela J. Bjorkman, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 307 days.

(21) Appl. No.: 17/523,813

(22) Filed: Nov. 10, 2021

(65) Prior Publication Data

US 2022/0168414 A1   Jun. 2, 2022

Related U.S. Application Data

(60) Provisional application No. 63/112,495, filed on Nov. 11, 2020.

(51) Int. Cl.
| | |
|---|---|
| *A61K 39/215* | (2006.01) |
| *A61K 39/385* | (2006.01) |
| *A61K 39/39* | (2006.01) |
| *A61P 31/14* | (2006.01) |
| *A61P 37/04* | (2006.01) |
| *C07K 14/165* | (2006.01) |
| *A61K 39/00* | (2006.01) |

(52) U.S. Cl.
CPC .......... *A61K 39/215* (2013.01); *A61K 39/385* (2013.01); *A61K 39/39* (2013.01); *A61P 31/14* (2018.01); *A61P 37/04* (2018.01); *C07K 14/165* (2013.01); *A61K 2039/5258* (2013.01); *A61K 2039/53* (2013.01); *A61K 2039/55505* (2013.01); *A61K 2039/55555* (2013.01); *A61K 2039/70* (2013.01); *C12N 2770/20022* (2013.01); *C12N 2770/20034* (2013.01)

(58) Field of Classification Search
CPC .................................................. A61K 39/215
See application file for complete search history.

(56) References Cited

U.S. PATENT DOCUMENTS

| 11,964,012 B2 * | 4/2024 | Rauch ..................... A61K 39/12 |
| 2004/0022840 A1 * | 2/2004 | Nagy ..................... A61K 9/1273 |
| | | 424/185.1 |
| 2006/0286124 A1 * | 12/2006 | Burt ..................... A61K 39/215 |
| | | 435/456 |
| 2018/0245052 A1 * | 8/2018 | Egorov ................ C07K 14/005 |

FOREIGN PATENT DOCUMENTS

WO   WO/2007/053188   5/2007

OTHER PUBLICATIONS

Arora, Kajal, et al. "Multi-Antigenic Virus-like Particle of SARS CoV-2 produced in *Saccharomyces cerevisiae* as a vaccine candidate." BioRxiv (2020): 2020-05.
Guo, Jingjing, et al. "Immunogenicity of a virus-like-particle vaccine containing multiple antigenic epitopes of toxoplasma gondii against acute and chronic toxoplasmosis in mice." Frontiers in immunology 10 (2019): 592.
International Preliminary Report on Patentability for International Application No. PCT/US2021/058856, mailed on May 16, 2023, 6 pages.
International Search Report and Written Opinion for Application No. PCT/US2021/058856 mailed on Mar. 8, 2022, 11 pages.
Shin, Matthew D., et al. "COVID-19 vaccine development and a potential nanomaterial path forward." Nature nanotechnology 15.8 (2020): 646-655.
Xu, Ruodan, et al. "Construction of SARS-CoV-2 virus-like particles by mammalian expression system." Frontiers in bioengineering and biotechnology 8 (2020): 862.
Altschul et al., "Basic Local Alignment Search Tool," Journal of Molecular Biology 1990, 215, 403-410.
Andersen et al., "The proximal origin of SARS-CoV-2," Nature Medicine 2020, 26, 450-455.
Angeletti et al., "Defining B Cell Immunodominance to Viruses," Nature Immunology 2017, 18(4), 456-463.
Baker et al., "Structures of bovine and human papillomaviruses," Biophysical Journal 1991, 60, 1445-1456.
Barnes et al., "SARS-CoV-2 neutralizing antibody structures inform therapeutic strategies," Nature 2020, 588, 682-703.
Barnes et al., "Structures of Human Antibodies Bound to SARSCoV-2 Spike Reveal Common Epitopes and Recurrent Features of Antibodies," Cell 2020, 182, 828-842.
Brouwer et al., "Potent neutralizing antibodies from COVID-19 patients define multiple targets of vulnerability," Science 2020, 369, 643-650.
Brune & Howarth, "New Routes and Opportunities for Modular Construction of Particulate vaccines: Stick, Click, and Glue," Frontiers in Immunology 2018, 9(1432), 1-15.
Brune et al., "Plug-and-Display: decoration of Virus-Like Particles via isopeptide bonds for modular immunization," Scientific Reports 2016, 6(19234), 1-13.
Bruun et al., "Engineering a Rugged Nanoscaffold to Enhance Plug-and-Display Vaccination," ACS Nano 2018, 12, 8855-8866.
Cao et al., "Potent Neutralizing Antibodies against SARS-CoV-2 Identified by High-Throughput Single-Cell Sequencing of Convalescent Patients' B Cells," Cell 2020, 182, 73-84.

(Continued)

*Primary Examiner* — Albert M Navarro
(74) *Attorney, Agent, or Firm* — Dickinson Wright PLLC

(57) ABSTRACT

Disclosed herein include multivalent carriers comprising a plurality of heterologous *coronavirus* proteins antigens derived from different *coronaviruses*. The multivalent carriers herein described can elicit heterologous binding and neutralization properties against *coronoviruses* that differ from the *coronoviruses* from which the *coronavirus* antigens are derived to produce the multivalent carriers. Also provided herein include vaccine compositions comprising the multivalent carriers and related methods using the vaccine compositions in various therapeutic and prophylactic applications.

29 Claims, 45 Drawing Sheets

Specification includes a Sequence Listing.

(56) References Cited

OTHER PUBLICATIONS

Cohen et al., "Construction, characterization, and immunization of nanoparticles that display a diverse array of influenza HA trimers," PloS One 2021, 16(3), e0247963, 1-24.
Cohen et al., "Mosaic nanoparticles elicit cross-reactive immune responses to zoonotic coronaviruses in mice," Science 2021, 371, 735-741.
Corpet, "Multiple sequence alignment with hierarchical clustering," Nucleic Acids Research 1988, 16(22), 10881-10890.
Crawford et al., "Protocol and Reagents for Pseudotyping Lentiviral Particles with SARS-CoV-2 Spike Protein for Neutralization Assay," Viruses 2020, 12(513), 1-15.
Fung & Liu, "Human Coronavirus: Host-Pathogen Interaction," Annual Review of Microbiology 2019, 73, 529-557.
Gristick et al., "Natively glycosylated HIV-1 Env structure reveals new mode for antibody recognition of the CD4-binding site," Nature Structural Biology 2016, 32(10), 906-915.
Hagensee et al., "Three-Dimensional Structure of Vaccinia Virus-Produced Human Papillomavirus Type 1 Capsids," Journal of Virology 1994, 68(7), 4503-4505.
Higgins & Sharp, "Clustal: a package for performing multiple sequence alignment on a microcomputer," Gene 1988, 73, 237-244.
Higgins & Sharp, "Fast and sensitive multiple sequence alignments on a microcomputer," Cabios Communications 1989, 5(2), 151-153.
Hoffman et al., "SARS-CoV-2 Cell Entry Depends on ACE2 and TMPRSS2 and is Blocked by a Clinically Proven Protease Inhibitor," Cell 2020, 181, 1-10.
Holmes. "Coronaviruses," Academic Press 1999, 291-298.
Hsieh et al., "Structure-based Design of Prefusion-stabilized SARS-CoV-2 Spikes," bioRxiv 2020, in 39 pages. https://doi.org/10.1101/2020.05.30.125484.
Hu et al., "Discovery of a rich gene pool of bat SARS-related coronaviruses provides new insights into the origin of SARS coronavirus," PLoS Pathogens 2017, 13(11), e1006698, 1-27.
Huang et al., "Human Coronavirus HKU1 Spike Protein Uses O-Acetylated Sialic Acid as an Attachment Receptor Determinant and Employs Hemagglutinin-Esterase Protein as a Receptor-Destroying Enzyme," Journal of Virology 2015, 89(14), 7202-7213.
Kanekiyo et al., "Mosaic nanoparticle display of diverse influenza virus hemagglutinins elicits broad B cell responses," Nature Immunology 2019, 20(3), 362-372.
Keeble et al., "Approaching infinite affinity through engineering of peptide-protein interaction," PNAS 2019, 116(52), 26523-26533.
Kreer et al., "Longitudinal Isolation of Potent Near-Germline SARS-CoV-2-Neutralizing Antibodies from COVID-19 Patients," Cell 2020, 182, 843-854.
Lam et al., "Identifying SARS-CoV-2-related coronaviruses in Malayan pangolins," Nature 2020, 583, 282-298.
Lan et al., "Structure of the SARS-CoV-2 spike receptor-binding domain bound to the ACE2 receptor," Nature 2020, 581, 215-220.
Landau et al., "ConSurf 2005: the projection of evolutionary conservation scores of residues on protein structures," Nucleic Acids Research 2005, 33, W299-W302.
Leist et al., "A Mouse-Adapted SARS-CoV-2 Induces Acute Lung Injury and Mortality in Standard Laboratory Mice," Cell 2020, 183, 1070-1085.
Letko et al., "Functional assessment of cell entry and receptor usage for SARS-CoV-2 and other lineage B betacoronaviruses," Nature Microbiology 2020, 5, 562-569.
Li et al., "Angiotensin-converting enzyme 2 is a functional receptor for the SARS coronavirus," Nature 2003, 426, 450-454.
Li et al., "Bats Are Natural Reservoirs of SARS-Like Coronaviruses," Science 2005, 310, 676-679.
Liu et al., "Potent neutralizing antibodies against multiple epitopes on SARS-CoV-2 spike," Nature 2020, 584, 450-475.
López-Sagaseta et al., "Self-assembling protein nanoparticles in the design of vaccines," Computational and Structural Biotechnology Journal 2016, 14, 58-68.
Menachery et al., "A SARS-like cluster of circulating bat coronaviruses shows potential for human emergence," Nature Medicine 2015, 21(12), 1508-1515.
Menachery et al., "SARS-like WIV1-CoV poised for human emergence," PNAS 2016, 113(11), 3048-3053.
Needleman & Wunsch, "A General Method Applicable to the Search for Similarities in the Amino Acid Sequence of Two Proteins," Journal of Molecular Biology 1970, 48, 443-453.
Pearson & Lipman, "Improved tools for biological sequence comparison," PNAS 1988, 85, 2444-2448.
Piccoli et al., "Mapping Neutralizing and Immunodominant Sites on the SARS-CoV-2 Spike Receptor-Binding Domain by Structure-Guided High-Resolution Serology," Cell 2020, 183, 1024-1042.
Pinto et al., "Cross-neutralization of SARS-CoV-2 by a human monoclonal SARS-CoV antibody," Nature 2020, 583, 290-312.
Rahikainen et al., "Overcoming Symmetry Mismatch in Vaccine Nanoassembly through Spontaneous Amidation," Angewandte Chemie International Edition 2021, 60, 321-330.
Raj et al., "Dipeptidyl peptidase 4 is a functional receptor for the emerging human coronavirus-EMC," Nature 2013, 495, 251-254.
Rambaut et al., "Preliminary genomic characterisation of an emergentSARS-CoV-2 lineage in the UK defined by a novel set of spike mutations," ARTIC Network 2020, in 9 pages.
Robbiani et al., "Convergent Antibody Responses to SARS-CoV-2 in Convalescent Individuals." Nature 2020, 584(7821), 437-442.
Rogers et al., "Rapid isolation of potent SARS-CoV-2 neutralizing antibodies and protection in a small animal model," bioRxiv 2020, in 10 pages. https://doi.org/10.1101/2020.05.11.088674.
Schmidt et al., "Measuring SARS-CoV-2 neutralizing antibody activity using pseudotyped and chimeric viruses," Journal of Experimental Medicine 2020, 217(11), e20201181, 1-18.
Seydoux et al., "Analysis of a SARS-CoV-2-Infected Individual Reveals Development of Potent Neutralizing Antibodies with Limited Somatic Mutation," Immunity 2020, 53, 98-105.
Shi et al., "A human neutralizing antibody targets the receptor-binding site of SARS-CoV-2," Nature 2020, 584, 120-142.
Slifka & Amanna, "Role of Multivalency and Antigenic Threshold in Generating Protective Antibody Responses," Frontiers in Immunology 2019, 10(956), 1-16.
Smith, "Comparison of Biosequences," Advances in Applied Mathematics 1981, 2, 482-489.
Tan et al., "A COVID-19 vaccine candidate using SpyCatcher multimerization of the SARS-CoV-2 spike protein receptor-binding domain induces potent neutralising antibody responses," Nature Communications 2021, 12(542), 1-16.
Tao & Tong, "Complete Genome Sequence of a Severe Acute Respiratory Syndrome-Related Coronavirus from Kenyan Bats," Microbiology Resource Announcements 2019, 8(28), e00548-19, 1-5.
Van Dorp et al., "Recurrent mutations in SARS-CoV-2 genomes isolated from mink point to rapid host-adaptation," bioRxiv 2020, preprint, 1-27. https://doi.org/10.1101/2020.11.16.384743.
Vlasak et al., "Human and bovine coronaviruses recognize sialic acid-containing receptors similar to those of influenza C viruses," PNAS 1988, 85, 4526-4529.
Walls et al., "Elicitation of Potent Neutralizing Antibody Responses by Designed Protein Nanoparticle Vaccines for SARS-CoV-2," Cell 2020, 183, 1367-1382.
Wang et al., "Serological Evidence of Bat SARS-Related Coronavirus Infection in Humans, China," Virologica Sinica 2018, in 4 pages.
West et al., "Computational analysis of anti-HIV-1 antibody neutralization panel data to identify potential functional epitope residues," PNAS 2013, 110(26), 10598-10603.
Wit et al., "SARS and MERS: recent insights into emerging coronaviruses," Nature Reviews 2016, 14, 523-534.
Wu et al., "A new coronavirus associated with human respiratory disease in China," Nature 2020, 579, 265-269.
Zakeri et al., "Peptide tag forming a rapid covalent bond to a protein, through engineering a bacterial adhesin," PNAS 2012, E690-E697.
Zhang et al., "A platform incorporating trimeric antigens into self-assembling nanoparticles reveals SARS-CoV-2-spike nanoparticles to elicit substantially higher neutralizing responses than spike alone," Scientific Reports 2020, 10(18149), 1-13.

(56) References Cited

OTHER PUBLICATIONS

Zhou et al., "A Novel Bat Coronavirus Closely Related to SARSCoV-2 Contains Natural Insertions at the S1/S2 Cleavage Site of the Spike Protein," Current Biology 2020, 30, 2196-2203.
Zhou et al., "A pneumonia outbreak associated with a new coronavirus of probable bat origin," Nature 2020, 579, 270-273.
Zost et al., "Potently neutralizing and protective human antibodies against SARS-CoV-2," Nature 2020, 584(7821), 443-449.
Zost et al., "Rapid isolation and profiling of a diverse panel of human monoclonal antibodies targeting the SARS-CoV-2 spike protein," Nature Medicine 2020, 26(9), 1422-1427.
Extended European Search Report dated Aug. 28, 2024 in European Patent Application No. 21892767.1.

* cited by examiner

| Group | Subgroup | Virus | Accession | Residue number | Clade | Host species | Location |
|---|---|---|---|---|---|---|---|
| 8 | 4a | SARS-CoV-2 | MN985325.1 | 319-539 | 1/2 | Human | Wuhan, Hubei, China |
| 8 | 4a | RaTG13 | QHR63300 | 319-541 | 1/2 | Rhinolophus affinis (bat) | Yunnan, China |
| 8 | 4a | SHC014 | KC881005 | 307-524 | 1 | Rhinolophus sinicus (bat) | Yunnan, China |
| 8 | 4a | Rs4081 | KY417143 | 310-515 | 2 | Rhinolophus sinicus (bat) | Kunming, Yunnan, China |
| 8 | 4b | Pang17 | QIA48632 | 317-539 | 1/2 | Manis javanica (pangolin) | Guanxi, China |
| 8 | 4b | RmYN02 | EPI_ISL_412977 | 298-503 | 2 | Rhinolophus malayanus (bat) | Yunnan, China |
| 8 | 4b | Rf1 | DQ412042 | 310-515 | 2 | Rhinolophus ferrumequium (bat) | Yichang, Hubei, China |
| 8 | 4b | WIV1 | KF367457 | 307-528 | 1 | Rhinolophus sinicus (bat) | Yunnan, China |
| Not included | | SARS-CoV | AAP13441.1 | 318-510 | 1 | Human | Guangdong, China |
| Not included | | Yun11 | JX993988 | 310-515 | 2 | Chaerephon plicata (bat) | Yunnan, China |
| Not included | | BM-4831 | NC014470 | 310-530 | 3 | Rhinolophus blasii (bat) | Strandja Nature Park, Bulgaria |
| Not included | | BtKY72 | KY352407 | 309-530 | 3 | Rhinolophus sp. (bat) | Kenya |

*FIG. 1B*

RBD Phylogenetic Tree

- MERS
- HCoV-OC43
- HCoV-HKU1
- HCoV-229E
- HCoV-NL63
- SARS
- WIV1
- SHC014
- Rf1
- RmYN02
- Yun11
- Rs4081
- pang17
- SARS-2
- RaTG13
- BM-4831
- BtKY72

Sarbecovirus

*FIG. 1C*

SARS-2 RBD ELISA

SARS-2 pseudovirus neutralization

WIV1 RBD

FIG. 4D

Pseudovirus Neutralization $IC_{50}$ (µg/mL)

| | COV7 | COV21 | COV134 | COV201 | COV37 | COV41 |
|---|---|---|---|---|---|---|
| SARS-2 | 2.4 | 1.7 | 1.8 | 1.1 | 155.0 | 83.0 |
| SARS | 11 | 127 | 149 | 151 | 1000 | >1000 |
| SHC014 | 1406 | >1500 | 171 | 179 | 638 | 638 |
| WIV1 | 1338 | 1212 | 396 | 611 | >1000 | >1000 |

| | COV47 | COV57 | COV67 | COV95 | COV72 | Mean | SD |
|---|---|---|---|---|---|---|---|
| SARS-2 | 2.3 | 8.9 | 46.0 | 19.7 | 2.5 | 29.5 | 49 |
| SARS | 1256 | 162 | 668 | >1000 | 35 | 505 | 480 |
| SHC014 | 427 | 159 | 353 | >1000 | 1025 | 681 | 487 |
| WIV1 | >1500 | 335 | >1000 | >1000 | 802 | 927 | 367 |

WIV1 RBD AUC vs WIV1 ID$_{50}$

Boost $r_s = 0.7835$
****, $p < 0.0001$

IgG titers (AUC x10$^6$) vs Neutralization ID$_{50}$ (Log$^{10}$)

*FIG. 8D*

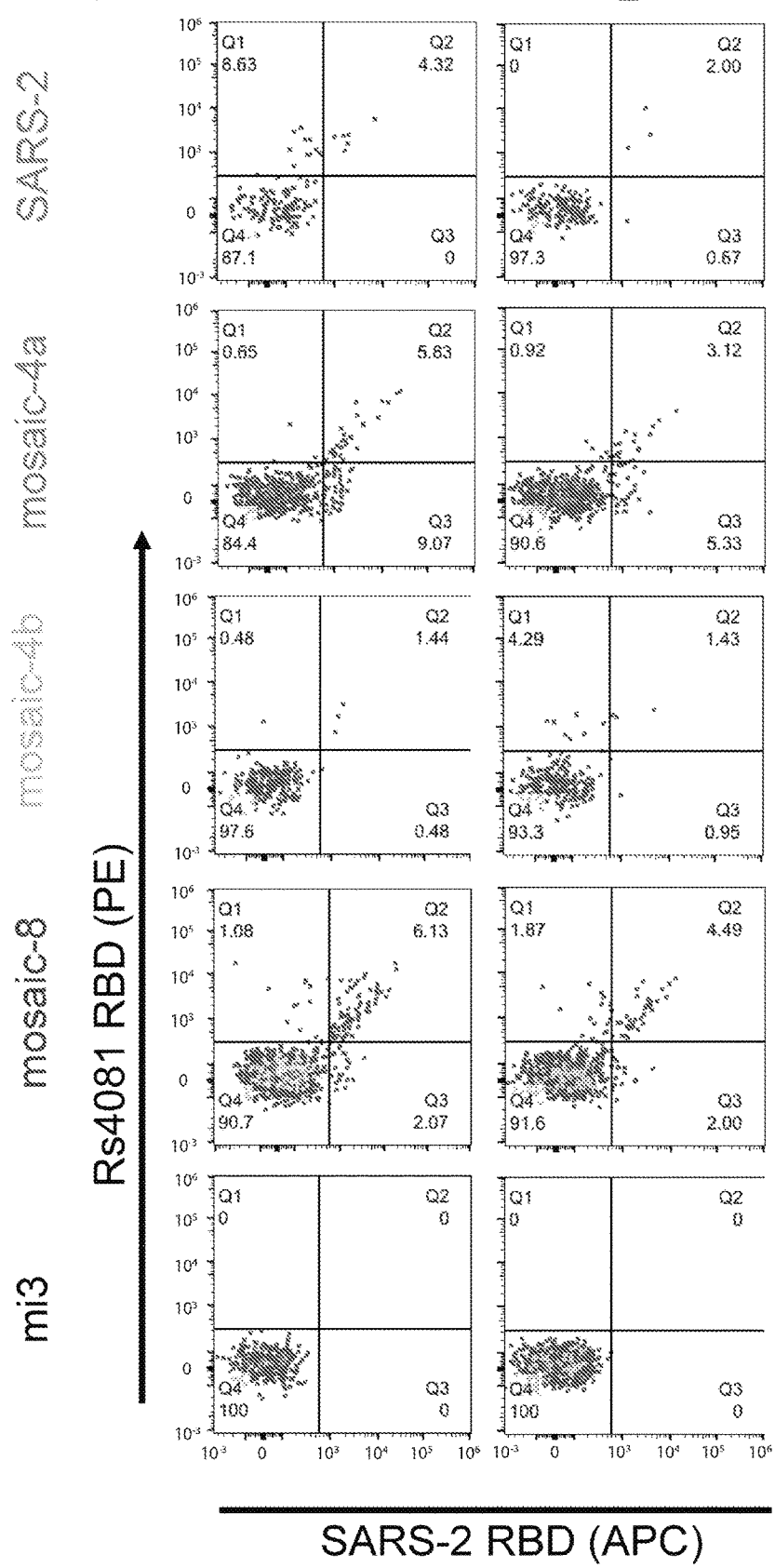
FIG. 9B (continued), Panel A

FIG. 9B (continued), Panel B
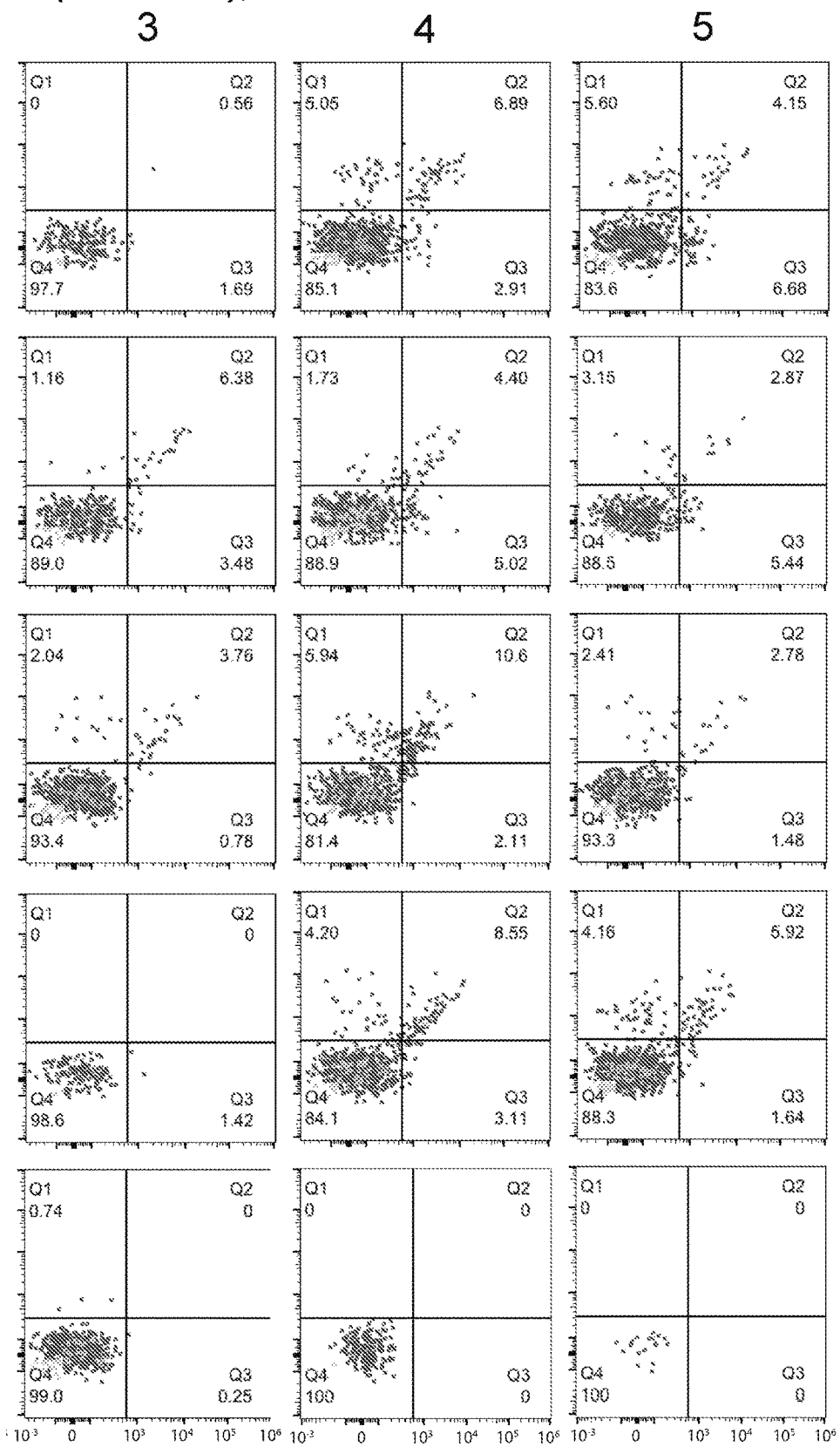

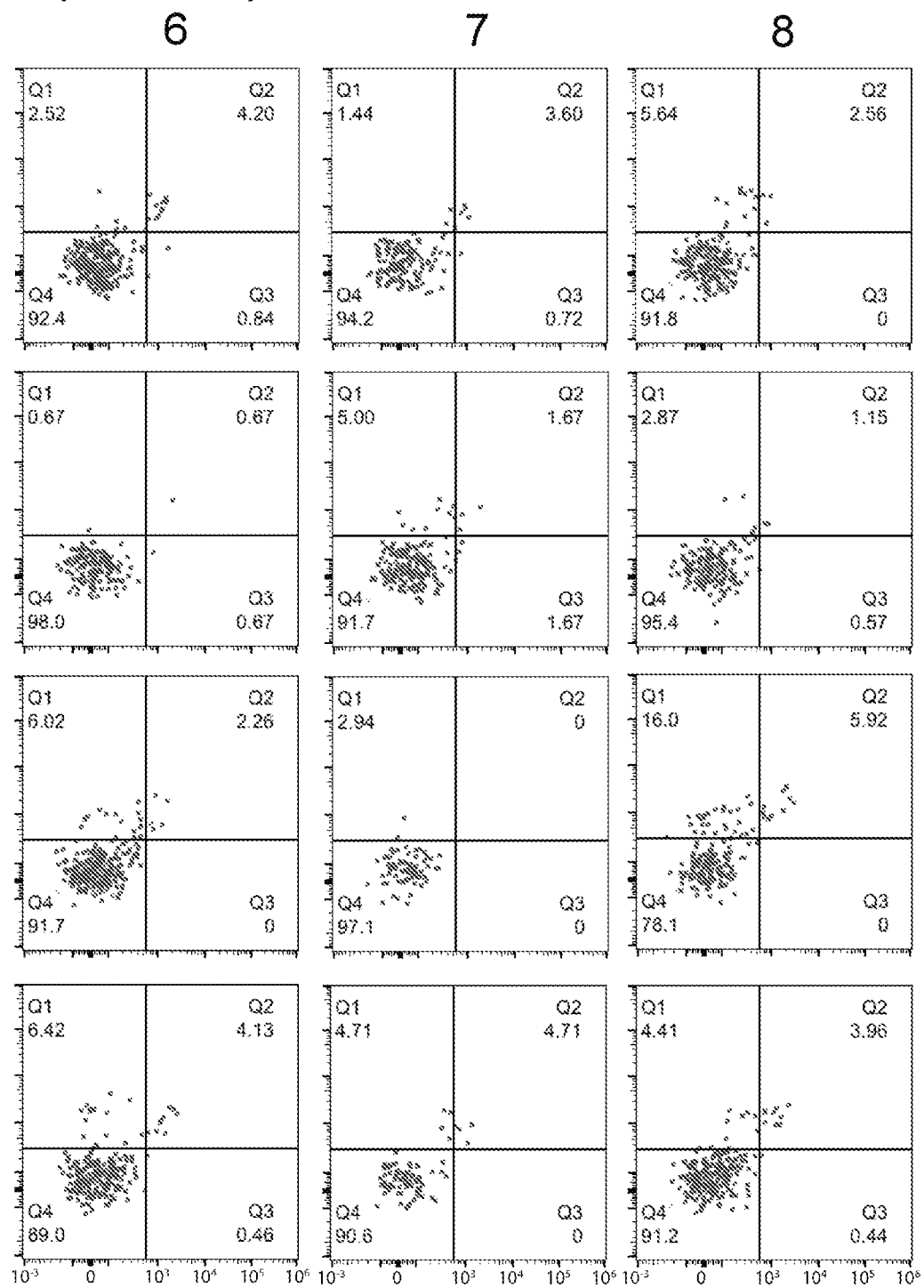
FIG. 9B (continued), Panel C

FIG. 9B (continued), Panel D
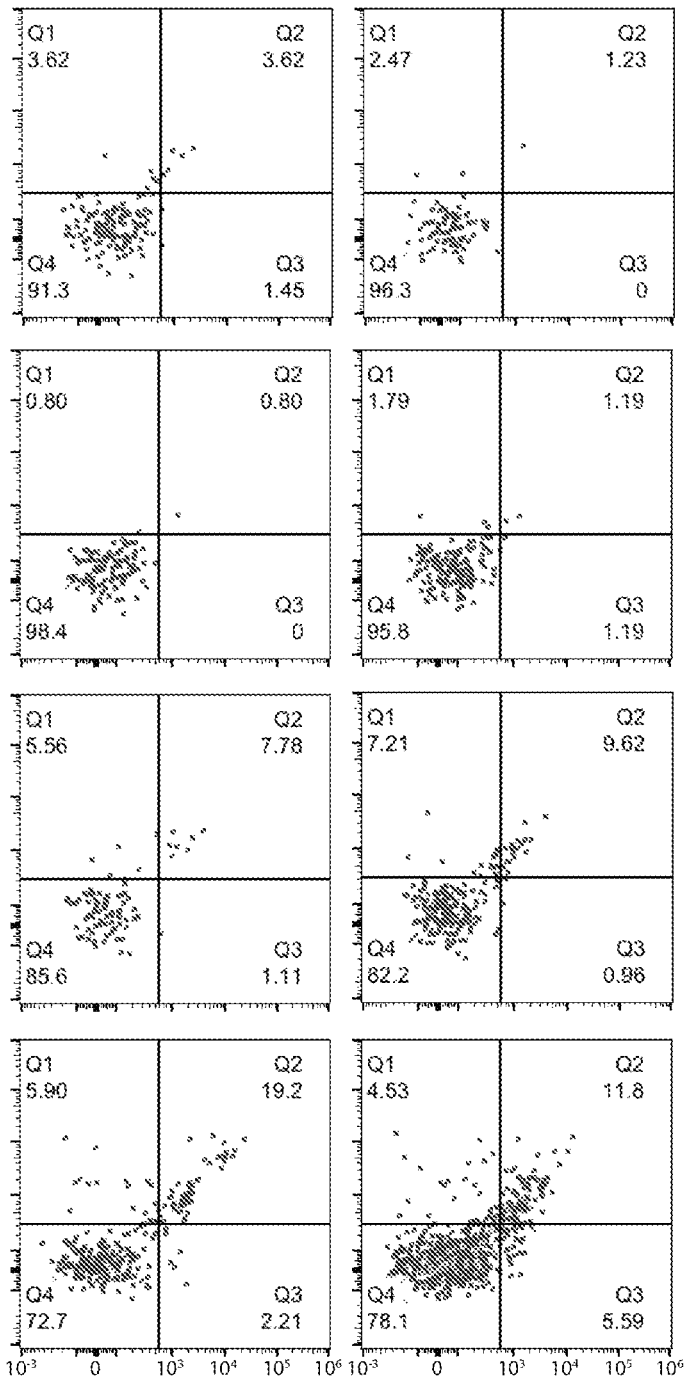

MULTIVALENT CARRIERS AND RELATED VACCINE COMPOSITIONS

RELATED APPLICATIONS

The present application claims priority to U.S. Provisional Application No. 63/112,495, filed Nov. 11, 2020. The content of this related application is hereby expressly incorporated by reference in its entirety.

STATEMENT REGARDING FEDERALLY SPONSORED R&D

This invention was made with government support under Grant No. AI138938 awarded by the National Institutes of Health. The government has certain rights in the invention.

REFERENCE TO SEQUENCE LISTING

The present application is being filed along with a Sequence Listing in electronic format. The Sequence Listing is provided as a file entitled Sequence_Listing_30KJ-302430-US, created Oct. 25, 2021, which is 47 kilobytes in size. The information in the electronic format of the Sequence Listing is incorporated herein by reference in its entirety.

BACKGROUND

Field

The present disclosure relates generally to the field of immune medicine, in particular, to vaccines against viral disorders.

Description of the Related Art

Severe acute respiratory syndrome (SARS) is a severe emerging viral disease caused by a *coronavirus* infection with high fatality characterized by fever, headache and severe respiratory symptoms including cough, dyspnea and pneumonia. Two zoonotic *Betacoronaviruses,* SARS-CoV and MERS-CoV, resulted in outbreaks within the last 20 years. A newly-emergent *Betacoronavirus,* SARS-CoV-2, resulted in a global pandemic in 2020, infecting millions and causing the respiratory disease COVID-19. Protection against SARS-CoV-2 and SARS-related emergent zoonotic *coronoviruses* is urgently needed.

SUMMARY

Provided herein include multivalent carriers and related vaccine compositions, methods for using the multivalent carriers and the vaccine compositions, and kits for protecting a subject against *coronavirus* infections.

Disclosed herein include a vaccine composition. The vaccine composition can, for example, comprise a multivalent carrier associated with a plurality of *coronavirus* antigens, wherein the plurality of *coronavirus* antigens comprises a first *coronavirus* antigen of a first *coronavirus* and a second *coronavirus* antigen of a second *coronavirus* that is different from the first *coronavirus*. The plurality of *coronavirus* antigens can be displayed on the surface of the multivalent carrier, or partially (e.g., substantially) embedded in the multivalent carrier. The plurality of *coronavirus* antigens can comprise a *coronavirus* spike protein (S protein) or a portion thereof, a *coronavirus* nucleocapsid protein (N protein) or a portion thereof, a *coronavirus* hemagglutinin-esterase protein (HE protein) or a portion thereof, a *coronavirus* papain-like protease or a portion thereof, a *coronavirus* 3CL protease or a portion thereof, a *coronavirus* membrane protein (M protein) or a portion thereof, or a combination thereof.

The plurality of *coronavirus* antigens can comprise *coronavirus* proteins of a same protein type. In some embodiments, the plurality of *coronavirus* antigens comprise *coronavirus* proteins of different protein types. The plurality of *coronavirus* antigens can, for example, comprise a *coronavirus* S protein or a portion thereof. In some embodiments, the plurality of *coronavirus* antigens comprise a *coronavirus* S protein receptor binding domain (RBD) or a portion thereof. In some embodiments, the first *coronavirus* antigen, the second *coronavirus* antigen, or both comprise a *coronavirus* S protein or a portion thereof. In some embodiments, the first *coronavirus* antigen, the second *coronavirus* antigen, or both comprise a *coronavirus* S protein RBD or a portion thereof. One or more of the plurality of *coronavirus* antigens, or each of the plurality of *coronavirus* antigens, can have a sequence identity of, of about, of at least, or of at least about, 65%, 70%, 75%, 80%, 85%, 90%, 95%, 98%, or 99% with one another. In some embodiments, the plurality of *coronavirus* antigens each comprises a *coronavirus* S protein RBD or a portion thereof, the *coronavirus* S protein RBDs or portions thereof having a sequence identity of about, at least, or at least about 65%, 70%, 75%, 80%, 85%, 90%, 95%, 98%, or 99% with one another. In some embodiments, one or more of the plurality of *coronavirus* antigens, or each of the plurality of *coronavirus* antigens, comprise (1) an amino acid sequence having at least 65%, 70%, 75%, 80%, 85%, 90%, 95%, 98%, or 99% sequence identity to an amino acid sequence selected from SEQ ID NOs: 1-12 and 15-26; or (2) an amino acid sequence selected from SEQ ID NOs: 1-12 and 15-26. For example, the first *coronavirus* antigen can comprise (1) an amino acid sequence having at least 65%, 70%, 75%, 80%, 85%, 90%, 95%, 98%, or 99% sequence identity to an amino acid sequence selected from SEQ ID NOs: 1-12 and 15-26; or (2) an amino acid sequence selected from SEQ ID NOs: 1-12 and 15-26. The second *coronavirus* antigen can comprise, for example, (1) an amino acid sequence having at least 65%, 70%, 75%, 80%, 85%, 90%, 95%, 98%, or 99% sequence identity to an amino acid sequence selected from SEQ ID NOs: 1-12 and 15-26; or (2) an amino acid sequence selected from SEQ ID NOs: 1-12 and 15-26. The number of the first *coronavirus* antigen molecules and the number of the second *coronavirus* antigen molecules can be, for example, in a ratio from 1:100 to 100:1.

In some embodiments, the plurality of *coronavirus* antigens comprise three, four, five, size seven, or eight *coronavirus* antigens, each of a *coronavirus* different from one another. In some embodiments, the plurality of *coronavirus* antigens further comprise at least a third *coronavirus* antigen of a third *coronavirus* and a fourth *coronavirus* antigen of a fourth *coronavirus,* and wherein the first, second, third and fourth *coronoviruses* are different from one another. In some embodiments, the plurality of *coronavirus* antigens further comprise one or more of a third *coronavirus* antigen of a third *coronavirus,* a fourth antigen *coronavirus* of a fourth *coronavirus, a* fifth *coronavirus* antigen of a fifth *coronavirus,* a sixth *coronavirus* antigen of a sixth *coronavirus,* a seventh *coronavirus* antigen of a seventh *coronavirus,* and an eighth *coronavirus* antigen of an eighth *coronavirus,* and wherein the first, second, third, fourth, fifth, sixth, seventh and eighth *coronoviruses* are different from one another. In some embodiments, the vaccine composition comprises three, four, five, six, seven, or eight coronavirus S protein RBDs, and wherein each of the plurality of coronavirus S protein RBDs is different from one another.

One or more of the plurality of coronavirus antigens can be of coronoviruses in the genus of Alpha-coronavirus and/or Beta-coronavirus. In some embodiments, each of the plurality of coronavirus antigens are of coronoviruses in the genus of Beta-coronavirus. In some embodiments, the plurality of coronavirus antigens are of coronoviruses in the subgenus of Sarbecovirus. In some embodiments, the first coronavirus and the second coronavirus are in the genus of Beta-coronavirus, optionally in the subgenus of Sarbecovirus. The plurality of coronavirus antigens can be of coronoviruses selected from: SARS, SARS-2, WIV1, SHC014, Rf1, RmYN02, pang17, RaTG13, and Rs4081. For example, the first coronavirus, the second coronavirus, or both can be selected from: SARS, SARS-2, WIV1, SHC014, Rf1, RmYN02, pang17, RaTG13, and Rs4081.

The plurality of coronavirus antigens can be covalently attached to the multivalent carrier, and optionally the plurality of coronavirus antigens are conjugated to the multivalent carrier. In some embodiments, the plurality of coronavirus antigens are attached to the multivalent carrier through click chemistry. In some embodiments, the plurality of coronavirus antigens are non-covalently attached to the multivalent carrier. Non-limiting examples of the multivalent carrier include nanoparticles, nanotubes, nanowires, dendrimers, liposomes, ethosomes and aquasomes, polymersomes and niosomes, foams, hydrogels, cubosomes, quantum dots, exosomes, macrophages, and combinations thereof. In some embodiments, the multivalent carrier comprises a nanoparticle selected from: lipid-based nanoparticles, polymeric nanoparticles, inorganic nanoparticles, surfactant-based emulsions, nanowires, silica nanoparticles, virus-like particles, peptide or protein-based particles, lipid-polymer particles, nanolipoprotein particles, and combinations thereof. The multivalent carrier can, for example comprise a virus-like particle (VLP), for example the virus-like particle can be Ap205 VLP. In some embodiments, the multivalent carrier comprises a self-assembling nanoparticle. The self-assembling nanoparticle can be, for example, an i301 nanoparticle or a variant thereof, or an a mi3 nanoparticle or a variant thereof.

In some embodiments, the vaccine composition comprises a plurality of particle-forming proteins. One or more of the plurality of particle-forming proteins can, for example, comprise a 2-dehydro-3-deoxy-phosphogluconate (KDPG) aldolase or a variant thereof. In some embodiments, a coronavirus antigen of the plurality of coronavirus antigens is attached to a particle-forming protein of the plurality of particle-forming proteins. For example, the coronavirus antigen of the plurality of coronavirus antigens can be attached to the particle-forming protein of the plurality of particle-forming proteins through a Spy tag/SpyCatcher binding pair.

In some embodiments, the coronavirus antigen of the plurality of coronavirus antigens comprises a Spy tag at the C-terminal of the coronavirus antigen and the particle-forming protein of a plurality of particle-forming proteins comprises a SpyCatcher at the N-terminal of the particle-forming protein. In some embodiments, the coronavirus antigen of the plurality of coronavirus antigens comprises a coronavirus S protein RBD, and the coronavirus S protein RBD comprises a Spy tag at the C-terminal of the coronavirus S protein RBD and the particle-forming protein of a plurality of particle-forming proteins comprises a Spy-Catcher at the N-terminal of the particle-forming protein. In some embodiments, the vaccine composition can further comprises an adjuvant. Non-limiting examples of adjuvant include: aluminum hydroxide, alhydrogel, AddaVax, MF59, AS03, Freund's adjuvant, Montanide ISA51, CpG, Poly I:C, glucopyranosyl lipid A, flagellin, resiquimod, and a combination thereof.

Disclosed herein includes a method of stimulating an immune response in a subject in need thereof. The method comprises, for example, administering to the subject a pharmaceutically effective amount of any one of the vaccine compositions disclosed herein, thereby stimulating an immune response in the subject. Disclosed herein includes a method for treating or preventing a coronavirus infection in a subject in need thereof. The method can, for example, comprises: administering to the subject a pharmaceutically effective amount of any one of the vaccine compositions disclosed herein, thereby treating or preventing the coronavirus infection in the subject. Also disclosed herein includes a method for treating or preventing a disease or disorder caused by a coronavirus infection in a subject in need thereof. The method can, for example, comprise: administering to the subject a pharmaceutically effective amount of any one of the vaccine compositions disclosed herein, thereby treating or preventing the disease or disorder caused by the coronavirus infection in the subject. The vaccine composition can be administered to the subject, for example, once, two, three, four, or more times within two weeks, four weeks, one month, two months, three months, six months, a year, two years, three years, or more. The vaccine composition can be administered to the subject, for example, once, two, three, four, or more times at least two weeks, four weeks, one month, two months, three months, six months, a year, two years, three years, or more, apart.

In some embodiments, administering the vaccine composition induces neutralizing responses against coronoviruses different from the first coronavirus and the second coronavirus. In some embodiments, administering the vaccine composition induces neutralizing responses against additional coronoviruses different from the coronoviruses the plurality of coronavirus antigens are of. In some embodiments, administering the vaccine composition induces neutralizing responses against the coronoviruses the plurality of coronavirus antigens are of In some embodiments, administering the vaccine composition results in treating or preventing infection caused by a coronavirus different from the first coronavirus and the second coronavirus. In some embodiments, administering the vaccine composition results in treating or preventing infection caused by additional coronaviruses different from the coronaviruses the plurality of coronavirus antigens are of. In some embodiments, administering the vaccine composition results in treating or preventing infection caused by the coronoviruses the plurality of coronavirus antigens are of.

In some embodiments, administering the vaccine composition results in treating or preventing the disease or disorder caused by a coronavirus different from the first coronavirus and the second coronavirus. In some embodiments, administering the vaccine composition results in treating or preventing the disease or disorder caused by additional coronoviruses different from the coronoviruses the plurality of coronavirus antigens are of In some embodiments, administering the vaccine composition results in treating or preventing the disease or disorder caused by the coronoviruses the plurality of coronavirus antigens are of.

Administering the vaccine composition can, for example, comprise administering to the subject a first vaccine composition and administering to the subject a second vaccine composition. In some embodiments, administering to the subject the second vaccine composition occurs about two, three, four weeks, or more, after administering to the subject the first vaccine composition.

Also disclosed herein include a kit comprising any of the vaccine compositions disclosed herein. In some embodiments, the kit comprises a manual providing instructions for one or more of (1) stimulating an immune response in a subject in need thereof, (2) treating or preventing a *coronavirus* infection in a subject in need thereof, and (3) treating or preventing a disease or disorder caused by a *coronavirus* infection in a subject in need thereof.

BRIEF DESCRIPTION OF THE DRAWINGS

FIG. 1A-FIG. 1D depict non-limiting exemplary embodiments of RBDs chosen for this study. FIG. 1A left shows an exemplary structure of SARS-CoV-2 S trimer (PDB 6VXX) with one RBD (dashed circle) in an "up" position. FIG. 1A middle and right shows non-limiting exemplary data related to sequence conservation of 12 RBDs calculated by the ConSurf Database plotted on a surface representation of the RBD structure (PDB 7BZ5). Epitopes for representatives from defined classes of RBD-binding antibodies (class 1-class 4) indicated by dashed lines. FIG. 1B depicts non-limiting exemplary embodiments of the viral strains from which the 12 *Sarbecovirus* RBDs were derived. FIG. 1C shows a non-limiting exemplary phylogenetic tree of human and selected other *coronoviruses* based on RBD protein sequences. Red shading indicates strains known to use ACE2 as a receptor. FIG. 1D depicts a non-limiting exemplary heat map showing percent amino acid sequence identities between 12 *Sarbecovirus* RBDs.

FIG. 2A depicts non-limiting exemplary embodiments of SpyTagged RBDs attached to SpyCatcher003-mi3 to make a homotypic particle and three mosaic particles. 10 of 60 potential coupling sites on mi3 are shown for clarity. FIG. 2B shows non-limiting exemplary data of a SEC profile showing separation of RBD nanoparticles and free RBD proteins. FIG. 2C shows non-limiting exemplary data of coomassie-stained SDS-PAGE of RBD-coupled nanoparticles, free RBD proteins, and uncoupled SpyCatcher003-mi3 particles (SC3-mi3).

FIG. 3A depicts a nonlimiting exemplary embodiment of the immunization schedule. Adjuvant=AddaVax (Invivogen). FIG. 3B-FIG. 3F depict non-limiting exemplary data showing mice that were immunized with soluble SARS-CoV-2 S trimer (SARS-2 S; brown bars), or the following nanoparticles: homotypic SARS-2 (red), mosaic-4a (green), mosaic-4b (yellow), mosaic-8 (blue), or unconjugated SpyCatcher003-mi3 (mi3; black). ELISA data from serum IgG responses to SARS-2 spike trimer (FIG. 3B) or RBDs (FIG. 3C-FIG. 3F) shown as area under the curve (AUC). For FIG. 3C-FIG. 3E, neutralization potencies are presented as half-maximal inhibitory dilutions ($ID_{50}$ values) of sera against the pseudoviruses from the indicated *coronavirus* strains. Dashed horizontal lines correspond to the lowest dilution representing the limit of detection. Each dot represents serum from one animal, with means and standard deviations for vaccinated cohorts represented by rectangles (mean) and horizontal lines (SD). Significant differences between groups linked by horizontal lines are indicated by asterisks and p-values. NS=not significant. (FIG. 3B-FIG. 3F) Neutralization and/or binding data for serum IgGs for recognition of (FIG. 3B) SARS-2 spike trimer, (FIG. 3C) SARS-2 RBD and SARS-2 pseudovirus, (FIG. 3D) SHC014 and WIV1 RBDs and corresponding pseudoviruses, (FIG. 3E) SARS RBD and SARS pseudovirus, (FIG. 3F) Yun11, BM-4831, and BtKY72 RBDs.

FIG. 4A-FIG. 4H depict non-limiting exemplary data showing IgGs from convalescent COVID-19 plasma show little to no cross-reactive responses. FIG. 4A-FIG. 4F show non-limiting exemplary data related to plasma IgG responses evaluated by ELISA (data shown as binding curves with plasma names listed) against RBDs from (FIG. 4A) SARS-2, (FIG. 4B) RaTG13, (FIG. 4C) SHC014, (FIG. 4D) WIV1, (FIG. 4E) Rs4081, and (FIG. 4F) BM-4831. Data points are plotted as the mean and standard deviation of duplicate measurements. IOMA, an anti-HIV-1 IgG, was used as a control. FIG. 4G shows non-limiting exemplary data related to ELISA results from FIG. 4A-FIG. 4F presented as area under the curve (AUC), where each dot represents one plasma sample, with means and standard deviations represented by rectangles (mean) and horizontal lines (SD). Significant differences between groups linked by horizontal lines are indicated by asterisks and p-values. FIG. 4H shows non-limiting exemplary data related to $IC_{50}$ values for pseudotyped neutralization assays using IgGs from COV7, COV21, and COV72 plasmas (evaluated at top concentrations of 1500 µg/mL) against the indicated strains. Mean=arithmetic mean $IC_{50}$; SD=standard deviation.

FIG. 6A depicts non-limiting exemplary data of SEC profiles showing separation of RBD nanoparticles and free RBD proteins. FIG. 6B depicts non-limiting exemplary data showing coomassie-stained SDS-PAGE of RBD-coupled nanoparticles, free RBD proteins, and uncoupled SpyCatcher003-mi3 particles (SC3-mi3).

FIG. 7A-FIG. 7B depict non-limiting exemplary data related to binding of serum IgGs to (FIG. 7A) Rs4081 and (FIG. 7B) RaTG13 RBDs. FIG. 7C shows non-limiting exemplary data related to binding of serum IgGs to SARS-2 RBD (top left), a triple RBD mutant in a mouse-adapted SARS-CoV-2 that includes substitutions adjacent to the N501Y RBD mutation in an emergent UK SARS-CoV-2 lineage (https://virological.org/t/preliminary-genomic-characterisation-of-an-emergent-sars-cov-2-lineage-in-the-uk-defined-by-a-novel-set-of-spike-mutations/563) (top right), and Y453F, the "Danish mink variant" (bottom left). FIG. 7D depicts non-limiting exemplary data related to binding of serum IgGs to RBD from MERS-CoV (a non-ACE2-binding *Merbecovirus*, representing a different subgenus from *Sarbecoviruses*). FIG. 7E-FIG. 7F show non-limiting exemplary data related to comparison of ELISA data for serum binding to selected RBDs presented as AUC, endpoint titers, midpoint titers, or binding curves. Day 14 serum IgG responses to (FIG. 7E) SARS-2 or (FIG. 7F) SARS RBDs evaluated by ELISA shown as AUC (top left), endpoint titers (top middle), midpoint ($EC_{50}$) titers (top right), or binding curves (bottom left). For AUC, each dot represents serum from one animal, with means and standard deviations represented by rectangles (mean) and horizontal lines (SD). For endpoint and midpoint titers, each dot represents serum from one animal, with geometric means and geometric standard deviations represented by rectangles (mean) and horizontal lines (SD). Binding curves are shown with data points representing the mean and SD of duplicate measurements fit to a binding model (see Materials and Methods of Example 1 below) for animals immunized with mosaic-8 and homotypic SARS-2.

FIG. 8A-FIG. 8D depict non-limiting exemplary data related to the correlation of ELISA and neutralization titers. Spearman correlation coefficients ($r_S$) and p-values shown for graphs of anti-RBD ELISA titers (AUC) versus pseudovirus neutralization $ID_{50}$ values; significance indicated as asterisks. (FIG. 8A) SARS-2. (FIG. 8B) SARS. (FIG. 8C) SHC014. (FIG. 8D) WIV1.

FIG. 9A depicts non-limiting exemplary embodiments of a flow cytometry gating strategy for characterizing RBD-specific IgG$^+$ B-cells isolated from splenocytes. Anti-CD4, anti-CD8, anti-F4/80, anti-Ly6G, and anti-IgM were used in the dump to remove T-cells, macrophages, and IgM$^+$ B-cells. Antigen-specific IgG$^+$ B-cells were isolated using labeled anti-CD19 and anti-IgG antibodies, and probed for binding RBD with a pair of fluorophore-conjugated RBD tetramers (SARS-2 RBD and Rs4081 RBD). FIG. 9B depicts non-limiting exemplary data related to flow cytometry analysis for antigen-specific IgG$^+$ splenocytes isolated from animals immunized with mosaic-RBD particles. The 4-way gate shown for each animal separates each population of RBD single-positive and double-positive cells and was used for the % antigen-specific populations shown in FIG. 9C-FIG. 9E. Q1 represents the Rs4081 RBD$^+$ population, Q2 represents the Rs4081 RBD$^+$/SARS-2 RBD$^+$ population, Q3 represents the SARS-2 RBD$^+$ population, and Q4 represents the RBD$^-$ population. FIG. 9C-FIG. 9E show non-limiting exemplary data related to the percent single-positive (SP) and double-positive (DP) cells for the indicated groups. Significant differences between groups linked by horizontal lines are indicated by asterisks and p-values. NS=not significant. (FIG. 9C) Percent SARS-2 RBD$^+$ B-cells within the IgG$^+$ B-cell population. (FIG. 9D) Percent Rs4081 RBD$^+$ B-cells within the IgG$^+$ B-cell population. (FIG. 9E) Percent SARS-2 RBD$^+$/Rs4081 RBD$^+$ B-cells within the IgG$^+$ B-cell population.

DETAILED DESCRIPTION

Figure 1A:
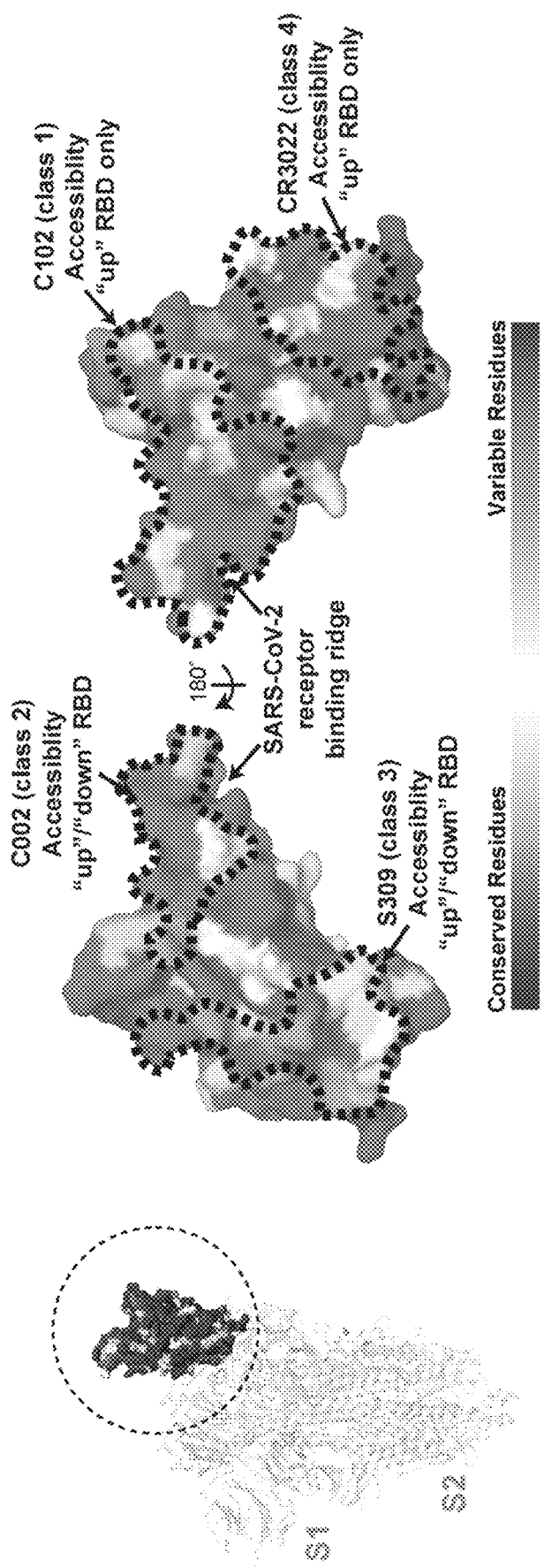

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

SARS-CoV-2, a newly-emergent *Betacoronavirus*, resulted in a global pandemic in 2020, infecting millions and causing the respiratory disease COVID-19. Two other zoonotic *Betacoronaviruses*, SARS-CoV and MERS-CoV, also resulted in outbreaks within the last 20 years. All three viruses presumably originated in bats, with SARS-CoV and MERS-CoV adapting to intermediary animal hosts before jumping to humans. SARS-like viruses circulate in bats and serological surveillance of people living near caves where bats carry diverse *coronaviruses* demonstrates direct transmission of SARS-like viruses with pandemic potential, suggesting a pan-*coronavirus* vaccine is needed to protect against future outbreaks and pandemics. In particular, the bat WIV1 and SHC014 strains are thought to represent an ongoing threat to humans.

Although existing vaccines may offer protection against one type of *coronavirus* such as SARS-CoV-2, *coronavirus* reservoirs in bats suggest future cross-species transmission, necessitating a vaccine that protects against emerging *coronoviruses* as well as SARS-CoV-2. There is a strong and urgent need for effective and longer-lasting vaccines that can elicit higher tiers of neutralizing antibodies and induce heterologous binding and neutralizing responses against a broad spectrum of *coronaviruses*. In addition to the need for a vaccine against SARS-CoV-2, there is an also urgent need to protect against related zoonotic *coronaviruses* that could spill-over into humans to cause future pandemics. Disclosed herein includes immunization compositions and method for protecting against infection from potentially emerging animal *coronoviruses* as well as against SARS-CoV-2.

As described herein, using for example a "plug and display" approach, a series of nanoparticles were made displaying the receptor-binding domain (RBD) of either SARS-CoV-2 alone (homotypic nanoparticles) or co-displaying the SARS-CoV-2 RBD along with a diverse set of RBDs from bat and pangolin *Betacoronaviruses* that represent threats to humans (mosaic nanoparticles). Going beyond recent reports describing autologous responses to SARS-CoV-2 homotypic nanoparticles (e.g., responses against SARS-CoV-2 virus after injection of SARS-CoV-2 nanoparticles), homotypic nanoparticle immunization produces responses that both bind and neutralize heterologous *coronoviruses* after boosting. Co-display of other RBDs along with the SARS-CoV-2 RBD does not diminish reactivity compared with responses to a homotypic nanoparticle, thereby showing there would be no disadvantages in using mosaic nanoparticles to protect against SARS-CoV-2. The advantage of mosaic RBD over homotypic SARS-CoV-2 nanoparticles is mosaic nanoparticles elicited antibodies with superior cross-reactive recognition of heterologous RBDs compared to immunizations with homotypic SARS-CoV-2-RBD-nanoparticles; in particular because cross-reactive responses were observed after only a prime with mosaic nanoparticles, whereas cross-reactive responses to the homotypic particle required both prime and boost injections. Inducing neutralizing responses after only a single injection would be a great advantage for a vaccine that needs to be delivered to millions/billions of people. In some embodiments, the type of mosaic nanoparticle described here can be adapted to present RBDs from new zoonotic *coronoviruses* as they are discovered, such that vaccine-induced recognition of zoonotic *Sarbecoviruses* provides protection from future *coronavirus*-related pandemic(s) while also being used for protection against SARS-CoV-2.

As described herein, IgGs from COVID-19 convalescent human plasmas were evaluated, showing that they exhibited little to no recognition of *coronoviruses* other than SARS-CoV-2. Thus infection-induced immunity in humans would unlikely to be protective against an outbreak of a new zoonotic *coronavirus*, another indication for the need to develop a vaccine to protect against emerging *Sarbecoviruses*.

Disclosed herein include a multivalent carrier and related vaccine composition, methods and kits. The multivalent carrier and the vaccine composition thereof can simultaneously present *coronavirus* antigens from human and animal *coronoviruses* of different taxonomical groups and elicit cross-reactive antibody responses. The multivalent carrier and the vaccine composition thereof can elicit substantially enhanced and broad binding and neutralizing responses, in contrast to plasma antibodies elicited in humans by, for example, SARS-CoV-2 infection. The multivalent carrier and the vaccine composition thereof also demonstrate enhanced heterologous binding and neutralization properties against human and bat *Beta-coronaviruses* (e.g., *Sarbecoviruses*) compared with homotypic nanoparticles (e.g., homotypic SARS-CoV-2 nanoparticles).

Disclosed herein includes a multivalent carrier. The multivalent carrier comprises a plurality of *coronavirus* antigens, the plurality of *coronavirus* antigens comprising at least a first *coronavirus* antigen of a first *coronavirus* and a second *coronavirus* antigen of a second *coronavirus* that is different from the first *coronavirus*. Disclosed herein also includes a vaccine composition comprising the multivalent carrier herein described.

Disclosed herein includes a method of stimulating an immune response in a subject in need thereof. In some embodiments, the method comprises administering to the subject a pharmaceutically effective amount of the vaccine composition described herein, thereby stimulating an immune response in the subject. Disclosed herein also includes a method of treating or preventing a *coronavirus* infection in a subject in need thereof. In some embodiments, the method comprises administering to the subject a pharmaceutically effective amount of the vaccine composition described herein, thereby treating or preventing the *coronavirus* infection in the subject. In addition, a method of treating or preventing a disease or disorder caused by a *coronavirus* infection in a subject in need thereof is disclosed herein. In some embodiments, the method comprises administering to the subject a pharmaceutically effective amount of the vaccine composition described herein, thereby treating or preventing the disease or disorder caused by the *coronavirus* infection in the subject.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

As used herein, the terms "antigen" or "immunogen" are used interchangeably to refer to a substance, typically a protein, which is capable of inducing an immune response in a subject (e.g. a mammal, such as a human). The term also refers to proteins that are immunologically active in the sense that once administered to a subject, either directly or in the form of a nucleotide sequence or vector that encodes the protein, is able to evoke an immune response of the humoral and/or cellular type directed against that protein or a variant thereof.

As used herein, "sequence identity" or "identity" in the context of two nucleic acid or polypeptide sequences makes reference to the nucleotide bases or residues in the two sequences that are the same when aligned for maximum correspondence over a specified comparison window. Methods of alignment of sequences for comparison are well known in the art. Various programs and alignment algorithms are described in: Smith & Waterman, Adv. Appl. Math. 2:482, 1981; Needleman & Wunsch, J. Mol. Biol. 48:443, 1970; Pearson & Lipman, Proc. Natl. Acad. Sci. USA 85:2444, 1988; Higgins & Sharp, Gene, 73:237-44, 1988; Higgins & Sharp, CABIOS 5:151-3, 1989; Corpet et al., Nuc. Acids Res. 16:10881-90, 1988; Huang et al. Computer Appls. in the Biosciences 8, 155-65, 1992; Pearson et al., Meth. Mol. Bio. 24:307-31, 1994; and Altschul et al., J. Mol. Biol. 215:403-10, 1990 (the content of each of these references is incorporated herein in its entirety).

When percentage of sequence identity or similarity is used in reference to proteins, it is recognized that residue positions which are not identical often differ by conservative amino acid substitutions, where amino acid residues are substituted with a functionally equivalent residue of the amino acid residues with similar physiochemical properties and therefore do not change the functional properties of the molecule. A functionally equivalent residue of an amino acid used herein typically can refer to other amino acid residues having physiochemical and stereochemical characteristics substantially similar to the original amino acid. The physiochemical properties include water solubility (hydrophobicity or hydrophilicity), dielectric and electrochemical properties, physiological pH, partial charge of side chains (positive, negative or neutral) and other properties identifiable to one of skill in the art. The stereochemical characteristics include spatial and conformational arrangement of the amino acids and their chirality. For example, glutamic acid is considered to be a functionally equivalent residue to aspartic acid in the sense of the current disclosure. Tyrosine and tryptophan are considered as functionally equivalent residues to phenylalanine. Arginine and lysine are considered as functionally equivalent residues to histidine.

The term "substantially identical" as used herein in the context of two or more sequences refers to a specified percentage of amino acid residues or nucleotides that are identical or functionally equivalent, such as about, at least or at least about 65% identity, optionally, about, at least or at least about 70%, 75%, 80%, 85%, 90%, 95%, or 99% identity over a specified region or over the entire sequence.

As used herein, the term "variant" refers to a polynucleotide or polypeptide having a sequence substantially similar or identical to a reference (e.g., the parent) polynucleotide or polypeptide. In the case of a polynucleotide, a variant can have deletions, substitutions, additions of one or more nucleotides at the 5' end, 3' end, and/or one or more internal sites in comparison to the reference polynucleotide. Similarities and/or differences in sequences between a variant and the reference polynucleotide can be detected using conventional techniques known in the art, for example polymerase chain reaction (PCR) and hybridization techniques. Variant polynucleotides also include synthetically derived polynucleotides, such as those generated, for example, by using site-directed mutagenesis. Generally, a variant of a polynucleotide, including, but not limited to, a DNA, can have at least, or at least about, 50%, 55%, 60%, 65%, 70%, 75%, 80%, 85%, 90%, 91%, 92%, 93%, 94%, 95%, 96%, 97%, 98%, 99%, or more sequence identity to the reference polynucleotide as determined by sequence alignment programs known in the art. In the case of a polypeptide, a variant can have deletions, substitutions, additions of one or more amino acids in comparison to the reference polypeptide. Similarities and/or differences in sequences between a variant and the reference polypeptide can be detected using conventional techniques known in the art, for example Western blot. A variant of a polypeptide can have, for example, at least, or at least about, 60%, 65%, 70%, 75%, 80%, 85%, 90%, 91%, 92%, 93%, 94%, 95%, 96%, 97%, 98%, 99%, or more sequence identity to the reference polypeptide as determined by sequence alignment programs known in the art.

Standard techniques can be used for recombinant DNA, oligonucleotide synthesis, and tissue culture and transformation (e.g., electroporation, lipofection). Enzymatic reactions and purification techniques can be performed according to manufacturer's specifications or as commonly accomplished in the art or as described herein. The foregoing techniques and procedures can be generally performed according to conventional methods well known in the art and as described in various general and more specific references that are cited and discussed throughout the present specification. See, e.g., Sambrook et al., Molecular Cloning: A Laboratory Manual (2d ed., Cold Spring Harbor Laboratory Press, Cold Spring Harbor, NY (1989)), which is incorporated herein by reference for any purpose. Unless specific definitions are provided, the nomenclatures utilized in connection with, and the laboratory procedures and techniques of, analytical chemistry, synthetic organic chemistry, and medicinal and pharmaceutical chemistry described herein are those commonly known and used in the art. Standard techniques can be used for chemical syntheses, chemical analyses, pharmaceutical preparation, formulation, and delivery, and treatment of patients.

Coronaviruses and Coronavirus Antigens

The multivalent carriers, and related vaccine composition, methods and kits herein described comprise a plurality of heterologous *coronavirus* antigens. The term "heterologous antigens" means that the antigens are of different origins, such as derived from pathogens of different taxonomic groups such as different strains, species, subgenera, genera, subfamilies or families and/or from antigenically divergent pathogens (e.g., variants thereof). Multivalent carriers can also be referred to as mosaic carriers. Classification of viruses into various taxonomic groups is well understood by those skilled in the art. In the embodiments herein described, the heterologous *coronavirus* antigens of the multivalent carriers herein described are derived from *coronoviruses* of different strains, species, subgenera, genera, and/or subfamilies in the *Coronaviridae* family.

The term "*coronavirus*" as used herein refers to a virus in the family *Coronaviridae*, which is in turn classified within the order *Nidovirales*. The *coronoviruses* are large, enveloped, positive-stranded RNA viruses. The *coronoviruses* have the largest genomes of the RNA viruses known in the art and replicate by a unique mechanism that results in a high frequency of recombination. The *coronoviruses* include antigenic groups I, II, and III. Nonlimiting examples of *coronoviruses* include SARS *coronavirus* (e.g., SARS-CoV and SARS-CoV-2), MERS *coronavirus,* transmissible gastroenteritis virus (TGEV), human respiratory *coronavirus,* porcine respiratory *coronavirus,* canine *coronavirus,* feline enteric *coronavirus,* feline infectious peritonitis virus, rabbit *coronavirus,* murine hepatitis virus, sialodacryoadenitis virus, porcine hemagglutinating encephalomyelitis virus, bovine *coronavirus,* avian infectious bronchitis virus, and turkey *coronavirus,* as well as chimeras thereof. Additional information related to *coronavirus* including classification, virion structure, genome structure, genetics and pathology is described, for example, in K V Holmes, Encyclopedia of Virology, 1999: 291-298, the content of which is incorporated herein by reference.

In some embodiments, a *coronavirus* described herein is in the genus of *Alpha-coronavirus* and the *coronavirus* antigens can be of or derived from any species or strains in the genus of *Alpha-coronavirus*. In some embodiments, a *coronavirus* described herein is in the genus of *Beta-coronavirus* and the *coronavirus* antigens can be of or derived from any species or strains in the genus of *Beta-coronavirus*. Member viruses in the genus of *Alpha-coronavirus* and *Beta-coronavirus* are enveloped, positive-strand RNA viruses that can infect mammals.

A *coronavirus* described herein can be of any subgenus of *Alpha-coronavirus* genus, including but not limited to *Colacovirus* (e.g. *Bat coronavirus* CDPHE15), *Decacovirus* (e.g. *Bat coronavirus* HKU10 and *Rhinolophus ferrumequinum alphacoronavirus* HuB-2013), *Duvinacovirus* (*Human coronavirus* 229E), *Luchacovirus* (e.g. *Lucheng Rn rat coronavirus*), *Minacovirus* (e.g. *Mink coronavirus* 1), *Minunacovirus* (e.g. *Miniopterus bat coronavirus* 1 and *Miniopterus bat coronavirus* HKU8), *Myotacovirus* (e.g. *Myotis ricketti alphacoronavirus Sax*-2011), *Nyctacovirus* (e.g. *Nyctalus velutinus alphacoronavirus* SC-2013 and *Pipistrellus kuhlii* coronavirus 3398), *Pedacovirus* (e.g. *Porcine epidemic diarrhea virus* and *Scotophilus bat coronavirus* 512), *Rhinacovirus* (e.g. *Rhinolophus bat coronavirus* HKU2), *Setracovirus* (e.g. *Human coronavirus* NL63 and NL63-related *Bat coronavirus* strain BtKYNL63-9b), *Soracovirus* (e.g. *Sorex araneus coronavirus* T14), *Sunacovirus* (e.g. *Suncus murinus coronavirus* X74), and *Tegacovirus* (e.g. *Alphacoronavirus* 1).

Within the genus *Beta-coronavirus*, five subgenera or lineages have been recognized, including *Embecovirus* (lineage A), *Sarbecovirus* (lineage B), *Merbecovirus* (lineage C), *Nobecovirus* (lineage D), and *Hibecovirus*. Accordingly, in some embodiments, a *coronavirus* described herein can be any strain or species in any of the subgenera or lineages of *Beta-coronavirus*.

For example, a *coronavirus* antigen can be of or derived from any species or strains in the subgenus of *Embecovirus*, including but not limited to *Beta-coronavirus* 1 (e.g. *Bovine coronavirus* and *human coronavirus* OC43), *China Rattus coronavirus* HKU24, *Human coronavirus* HKU1, *Murine coronavirus* (e.g. mouse heptatitis virus), and *Myodes coronavirus* 2JL14. The *coronavirus* antigen can be of or derived from any species or strains in the subgenus of *Sarbecovirus,* including but not limited to SARS-CoV, SARS-CoV2, 16BO133, Bat SARS CoV Rf1, *Bat coronavirus* HKU3 (BtCoV HKU3), LYRa11, Bat SARS-CoV/Rp3, Bat SL-CoV YNLF_31C, Bat SL-CoV YNLF_34C, SHC014-CoV, WIV1, WIV16, Civet SARS-CoV, Rc-o319, SL-ZXC21, SL-ZC45, Pangolin SARSr-COV-GX, Pangolin SARSr-COV-GD, RshSTT182, RshSTT200, RacCS203, RmYN02, RpYN06, RaTG13, Bat CoV BtKY72, and Bat CoV BM48-31. The *coronavirus* antigen can be of any species or strains in the subgenus of *Merbecovirus,* including but not limited to *Hedgehog coronavirus* 1, MERS-CoV, *Pipistrellus bat coronavirus* HKU5, and *Tylonycteris bat coronavirus* HKU4. The *coronavirus* antigen can be of any species or strains in the subgenus of *Nobecovirus,* including but not limited to *Eidolon bat coronavirus* C704, *Rousettus bat coronavirus* GCCDC1, and *Rousettus bat coronavirus* HKU9. The *coronavirus* antigen can be of any species or strains in the subgenus of *Hibecovirus,* including but not limited to *Bat Hp-betacoronavirus Zhejiang* 2013.

The *coronoviruses* described herein can be, for example, phylogenetically clustered in functionally distinct clades. For example, the *coronoviruses* of lineage B *Beta-coronavirus* (*Sarbecovirus*) can be clustered into clade 1, clade 2, clade 1/2, or clade 3 using the nucleotide sequences of nonstructural protein gene ORF1a and ORF1b (see, for example, Hu et al., PLoS Pathog 13(11): e1006698). Accordingly, the *coronavirus* antigens can be of or derived from any species or strain in any one of these clades. For example, the *coronavirus* antigens can be of any species or strain in clade 1, including but not limited to SARS-CoV, WIV1, LYRa11, Rs7327, Rs4231, Rs4084, and SHC014. The *coronavirus* antigens can be of any species or strain in clade 2, including but not limited to As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, and 273-2005. The *coronavirus* antigens can be of any species or strain in clade 1/2, including but not limited to SARS-CoV2. The *coronavirus* antigens can be of any species or strain in clade 3, including but not limited to BM48-31. The *coronavirus* antigen described herein can be of a *coronavirus,* for example, SARS, SARS-2, WIV1, SHC014, Rf1, RmYN02, pang17, RaTG13, and Rs4081.

As exemplified herein, SARS virus (e.g., SARS-CoV and SARS-CoV-2) is an enveloped *coronavirus* carrying a single-stranded positive-sense RNA genome (~30 kb), belonging to the genus *Betacoronavirus* from the *Coronaviridae* family. The virus RNA encodes four structural proteins including spike (S), envelope (E), membrane (M), and nucleocapsid (N) proteins, 16 non-structural proteins, and nine accessory proteins. The S glycoprotein contains an ectodomain that can be processed into S1 and S2 subunits, a transmembrane domain, and an intracellular domain. Both SARS-CoV and SARS-CoV-2 bind the human ACE2 via the receptor binding domain within the S1 subunit to facilitate entry into host cells, followed by membrane fusion mediated by the S2 subunit.

A *coronavirus* antigen of a *coronavirus* herein described can be any of a variety of *coronavirus* proteins capable of inducing an immune response against a *coronavirus.* Suitable *coronavirus* antigens are those that can elicit a protective immune response, such as producing broadly neutralizing antibodies. For example, the *coronavirus* antigen can comprise a *coronavirus* spike (S) protein, spike receptor binding domain (RBD), S1 subunit, S2 subunit, spike full ectodomain proteins, papain-like proteases, 3CL proteases, nucleocapsid proteins, envelope proteins, membrane proteins, or any of the structural, non-structural or accessory proteins that form a *coronavirus.*

In some embodiments, a *coronavirus* antigen used herein comprises a spike (S) protein or a portion thereof. A S protein is one of four major structural proteins covering the surface of each virion. The S protein, comprising a S1 subunit and a S2 subunit, is a highly glycosylated, type I transmembrane protein capable of binding to a host-cell receptor and mediates viral entry. The S protein comprises a domain referred to as the RBD that mediates the interaction with the host-cell receptor to enter the host cell after one or more RBDs adopts an "up" position to bind the host receptor. It is believed that after binding the receptor, a nearby host protease cleaves the spike, which releases the spike fusion peptide, facilitating virus entry. Known host receptors for *coronoviruses* (e.g., *Beta-coronaviruses*) include antiotensin-converting enzyme 2 (ACE2), dipeptidyl peptidase-4 (DPP4) or sialic acids. For example, the RBDs of *human coronaviruses* SARS-CoV-2, SARS-CoV, HCoV-NL63, and related *animal coronaviruses* (WIV1 and SCH014) use ACE2 as their host receptor, while MERS-CoV uses DPP4 as its host receptor.

The *coronavirus* antigen used herein can, for example, comprise a *coronavirus* nucleocapsid protein (N protein) or a portion thereof. The N protein is a multifunctional RNA-binding protein required for viral RNA transcription, replication, and packaging. The N protein consists of three domains, an N-terminal RNA-binding domain, a central intrinsically disordered region, followed by a C-terminal dimerization domain. The RNA-binding domain contains multiple positively charged binding surfaces that form charged interactions with RNA promoting its helical arrangement. The *coronavirus* antigen used herein can comprise any of these N protein domains or a portion thereof.

In some embodiments, the *coronavirus* antigen used herein comprises a *coronavirus* membrane protein (M protein) or a portion thereof. The M protein is the most abundant structural protein and defines the shape of the viral envelope. The M protein is regarded as the central organizer of the viral assembly, interacting with other major coronaviral structural proteins.

In some embodiments, the *coronavirus* antigen used herein comprises a *coronavirus* envelope protein (E protein)

or a portion thereof. The E protein is a small membrane protein and minor component of the virus particles. Without being bound to any theory, it is believed that the E protein plays roles in virion assembly and morphogenesis, alteration of the membrane of host cells and virus-host cell interaction.

In some embodiments, the *coronavirus* antigen used herein comprises a *coronavirus* hemagglutinin-esterase protein (HE protein) or a portion thereof. The HE protein, which is another envelope protein, mediates reversible attachment to O-acetylated sialic acids by acting both as lectins and receptor-destroying enzymes.

In some embodiments, the *coronavirus* antigen used herein comprises a *coronavirus* papain-like protease or a portion thereof. The *coronavirus* papain-like protease is one of several nonstructural proteins, and is responsible for processing of viral proteins into functional, mature subunits during maturation. For example, the *coronavirus* papain-like protease can cleave a site at the amino-terminal end of the viral replicase region. In addition to its role in viral protein maturation, papain-like protease exhibits both a deubiquitinating and deISG15ylating activity. In vivo, this protease antagonizes innate immunity by acting on IFN beta and NF-kappa B signaling pathways.

In some embodiments, the *coronavirus* antigen used herein comprises a *coronavirus* 3CL protease or a portion thereof. The 3CL protease is another main protease in addition to the papain-like protease and is required for processing of viral polypeptides into distinct, functional proteins. In some embodiments, the 3CL protease is a SARS-CoV-2 3CL Protease, which is a C30-type cysteine protease located within the non-structural proteins 3 (NS3) region of the viral polypeptide. Analysis of the Coronavirus genome reveals at least 11 sites of cleavage for the 3CL protease, many containing the amino acid sequence LQ[S/A/G].

The *coronavirus* antigen disclosed herein can, in some embodiments, comprise a S protein or a portion thereof, a N protein or a portion thereof, a HE protein or a portion thereof, a papain-like protease or a portion thereof, a *coronavirus* 3CL protease or a portion thereof, a M protein or a portion thereof, or a combination thereof.

In some embodiments, the *coronavirus* antigen can be an immunogenic portion of a *coronavirus* protein herein described. It will be appreciated by those skilled in the art that an immunogenic portion of a *coronavirus* antigen can be fragments of the S protein (e.g., spike protein RBD), N protein, HE protein, papain-like protease, 3CL protease, or M protein capable of eliciting an immune response against one or more *coronaviruses*. The immunogenic portion can comprise about, at least or at least about, at most or at most about, 50, 60, 70, 80, 90, 100, 110, 120, 130, 140, 150, 160, 170, 180, 190, 200, 210, 220, 230, 240, 250, or a number or a range between any two of these values, contiguous amino acid residues from the *coronavirus* proteins. In some embodiments, the immunogenic portion comprises a S protein RBD or a portion thereof. The portion of the S protein RBD can comprise the receptor binding motif of the S protein RBD.

In some embodiments, the *coronavirus* antigen is a S protein or a portion thereof comprising or consisting of an amino acid sequence having, having about, having at least, or having at least about, 80%, 85%, 90%, 95%, 98%, 99%, or more sequence identity to the amino acid sequence of any of the *coronavirus* S proteins from one or more *coronoviruses* selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, the *coronavirus* antigen is a N protein or a portion thereof comprising or consisting of an amino acid sequence having, having about, having at least, or having at least about, 80%, 85%, 90%, 95%, 98%, 99% or more, sequence identity to the amino acid sequence of any of the *coronavirus* N proteins from one or more *coronoviruses* selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, the *coronavirus* antigen is a HE protein or a portion thereof comprising or consisting of an amino acid sequence having, having about, having at least, having at least about, 80%, 85%, 90%, 95%, 98%, 99% or more, sequence identity to the amino acid sequence of any of the *coronavirus* HE proteins from one or more *coronoviruses* selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, the *coronavirus* antigen is a papain-like protease or a portion thereof comprising or consisting of an amino acid sequence having, having about, having at least, having at least about, 80%, 85%, 90%, 95%, 98%, 99% or more, sequence identity to the amino acid sequence of any of the *coronavirus* papain-like proteases from one or more *coronoviruses* selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, the *coronavirus* antigen is a 3CL protease or a portion thereof comprising or consisting of an amino acid sequence having, having about, having at least, having at least about, 80%, 85%, 90%, 95%, 98%, 99% or more, sequence identity to the amino acid sequence of any of the *coronavirus* 3CL proteases from one or more *coronoviruses* selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, the *coronavirus* antigen is a M protein or a portion thereof comprising or consisting of an amino acid sequence having, having about, having at least, having at least about, 80%, 85%, 90%, 95%, 98%, 99% or more, sequence identity to the amino acid sequence of any of the *coronavirus* M proteins from one or more *coronovi*- ruses selected from SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31, optionally selected from SARS, SARS-2, WIV1, SHC014, Rf1, RmYN02, pang17, RaTG13, and Rs4081.

In some embodiments, a *coronavirus* antigen comprises a *coronavirus* spike RBD or a portion or a variant thereof. The *coronavirus* spike RBD is known to have a three-dimensional structure of a twisted five-stranded antiparallel β sheet (e.g. β1, β2, β3, β4 and β7 in SARS-CoV-2) with short connecting helices and loops that form a core. Between two β strands (e.g. β4 and β7 strands in SARS-CoV-2) in the core, there is an extended insertion containing two short β strands (e.g. β5 and β6 in SARS-CoV-2), two α helices (e.g., α4 and α5 in SARS-CoV-2) and loops connecting the two β strands and/or the two α helices. This extended insertion is referred to as receptor binding motif (RBM), which contains residues that are capable of binding to host-cell receptors (e.g., ACE2). In the embodiments herein described, the *coronavirus* spike RBD, and particularly RBM, is capable of recognizing and binding to a host-cell receptor in order to initiate the spike protein-mediated viral entry. Detailed information of the *coronavirus* spike RBD and the host-cell receptor (e.g., ACE2) interface and related contacting residues is described, for example, in Lan et al., *Nature* volume 581, pages 215-220 (2020), the content of which is incorporated by reference it its entirety.

The *coronavirus* spike RBD or a portion thereof used herein can be of, or derived from, any viral species or strains in the family of *Coronaviridae*. The *coronavirus* spike RBD or a portion thereof used herein can be of any species or strains in the genus of *Alpha-coronavirus*. The *coronavirus* spike RBD or a portion thereof used herein can be of any species or strains in the genus of *Beta-coronavirus*. The *coronavirus* spike RBD or a portion thereof used herein can be of any viral species or strains in the subgenera *Embecovirus* (lineage A), *Sarbecovirus* (lineage B), *Merbecovirus* (lineage C), *Nobecovirus* (lineage D), and *Hibecovirus* of *Beta-coronavirus*.

For example, the *coronavirus* spike RBD protein or a portion thereof can be of any species or strains in the subgenus of *Embecovirus*, including but not limited to *Beta-coronavirus* 1 (e.g., *Bovine coronavirus* and *human coronavirus* OC43), *China Rattus coronavirus* HKU24, *Human coronavirus* HKU1, *Murine coronavirus* (e.g., mouse heptatitis virus), and *Myodes coronavirus* 2JL14. The *coronavirus* spike RBD protein or a portion thereof can be of any viral species or strains in the subgenus of *Sarbecovirus*, including but not limited to SARS-CoV, SARS-CoV2, 16BO133, Bat SARS CoV Rf1, *Bat coronavirus* HKU3 (BtCoV HKU3), LYRa11, Bat SARS-CoV/Rp3, Bat SL-CoV YNLF_31C, Bat SL-CoV YNLF_34C, SHC014-CoV, WIV1, WIV16, Civet SARS-CoV, Rc-o319, SL-ZXC21, SL-ZC45, Pangolin SARSr-COV-GX, Pangolin SARSr-COV-GD, RshSTT182, RshSTT200, RacCS203, RmYN02, RpYN06, RaTG13, Bat CoV BtKY72, and Bat CoV BM48-31. The *coronavirus* spike RBD protein or a portion thereof can be of any viral species or strains in the subgenus of *Merbecovirus*, including but not limited to *Hedgehog coronavirus* 1, MERS-CoV, *Pipistrellus bat coronavirus* HKU5, and *Tylonycteris bat coronavirus* HKU4. The *coronavirus* spike RBD protein or a portion thereof can be of any viral species or strains in the subgenus of *Nobecovirus*, including but not limited to, *Eidolon bat coronavirus* C704, *Rousettus bat coronavirus* GCCDC1, and *Rousettus bat coronavirus* HKU9. The *coronavirus* spike RBD protein or a portion thereof can be of any viral species or strains in the subgenus of *Hibecovirus*, including but not limited to *Bat Hp-betacoronavirus Zhejiang* 2013.

The *coronavirus* spike RBD protein or a portion thereof can be of any viral species or strain in any one of the phylogenetically clustered clades of lineage B *coronavirus* (*Sarbecovirus*). For example, the *coronavirus* spike RBD protein or a portion thereof can be of any species or strain in clade 1, including but not limited to SARS-CoV, WIV1, LYRa11, Rs7327, Rs4231, Rs4084, and SHC014. The *coronavirus* spike RBD protein or a portion thereof can be of any species or strain in clade 2, including but not limited to As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, and 273-2005. The *coronavirus* spike RBD protein or a portion thereof can be of any species or strain in clade 1/2, including but not limited to SARS-CoV2. The *coronavirus* spike RBD protein or a portion thereof can be of any species or strain in clade 3, including but not limited to BM48-31.

In some embodiments, the *coronavirus* spike RBD protein or a portion thereof can be from a *coronavirus* selected from: SARS-CoV, SARS-CoV2, WIV1, LYRa11, Rs7327, Rs4231, Rs4084, SHC014, As6526, Yunnan 2011, Shaanxi 2011, 279-2005, Rs4237, Rs4081, Rp3, Rs4247, HKU3-8, HKU3-13, GX2013, Longquan-140, YN2013, Rf4092, ZXC21, ZC45, JL2012, HuB2013, Rf1, HeB2013, 273-2005, and BM48-31. In some embodiments, the *coronavirus* spike RBD protein or a portion thereof is from a *coronavirus* selected from SARS, SARS-2, WIV1, SHC014, Rf1, RmYN02, pang17, RaTG13, and Rs4081.

The *coronavirus* spike RBD protein or a portion or a variant thereof can, for example, comprise, or consist of, an amino acid sequence having at least 65% sequence identity to an amino acid sequence of any of the *coronavirus* spike protein RBDs disclosed herein (e.g., the *coronavirus* spike protein RBD of any one of SEQ ID NOs: 1-12 and 15-26). In some embodiments, the *coronavirus* spike protein RBD or a variant thereof comprises, or consists of, an amino acid sequence having, having about, having at least, having at least about, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values, sequence identity to an amino acid sequence selected from SEQ ID NOs: 1-12 and 15-26. In some embodiments, the *coronavirus* spike protein RBD or a variant thereof comprises, or consists of, an amino acid sequence having at least, or having at least about 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a range between any two of these values, sequence identity to an amino acid sequence selected from SEQ ID NOs: 1-12 and 15-26. In some embodiments, the *coronavirus* spike protein RBD or a variant thereof comprises, or consists of, an amino acid sequence having, having about, having at least, or having at least about, 90%, 91%, 92%, 93%, 94%, 95%, 96%, 97%, 98%, 99%, 100%, or a range between any two of these values, sequence identity to an amino acid sequence selected from SEQ ID NOs: 1-12 and 15-26. In some embodiments, the *coronavirus* spike protein RBD herein described comprises or consists of an amino acid sequence selected from the group consisting of one of SEQ ID NOs: 1-12 and 15-26. In some embodiments, the amino acid sequence of the *coronavirus* spike protein RBD is selected from SEQ ID NOs: 1-12 and 15-26.

The *coronavirus* spike RBD or a variant thereof can, for example, comprise, or consist of, an amino acid sequence having, or having about, one, two, three, four, five, six, seven, eight, nine, ten, eleven, twelve, thirteen, fourteen, fifteen, sixteen, seventeen, eighteen, nineteen, twenty, twenty-two, twenty-three, twenty-four, twenty-five, twenty-six, twenty-seven, twenty-eight, twenty-nine, thirty, or a range between any two of these values, mismatch compared to an amino acid sequence of any of the *coronavirus* spike RBDs disclosed herein (e.g., the *coronavirus* spike RBDs having an amino acid sequence of any one of SEQ ID NOs: 1-12 and 15-26). In some embodiments, the *coronavirus* spike RBD or a variant thereof comprises, or consists of, an amino acid sequence having at most, or having at most about, one, two, three, four, five, six, seven, eight, nine, ten, eleven, twelve, thirteen, fourteen, fifteen, sixteen, seventeen, eighteen, nineteen, twenty, twenty-two, twenty-three, twenty-four, twenty-five, twenty-six, twenty-seven, twenty-eight, twenty-nine, thirty mismatches compared to an amino acid sequence selected from SEQ ID NOs: 1-12 and 15-26. In some embodiments, the mismatch(es) herein described occurs in the RBM of the *coronavirus* spike RBD.

The *coronavirus* spike RBD or a variant thereof can, for example, comprise, or consist of, an amino acid sequence having, having about, having at most, or having at most about one, two, three, four, five, six, seven, eight, nine, ten, eleven, twelve, thirteen, fourteen, fifteen, sixteen, seventeen, eighteen, nineteen, twenty, twenty-two, twenty-three, twenty-four, twenty-five, twenty-six, twenty-seven, twenty-eight, twenty-nine, thirty, or a range between any two of these values, deletions or insertions compared to an amino acid sequence of any of the *coronavirus* spike RBDs disclosed herein (e.g., the *coronavirus* spike RBDs having an amino acid sequence of any one of SEQ ID NOs: 1-12 and 15-26).

Accordingly, the *coronavirus* antigens in the context of the present disclosure can contain amino acid substitutions relative to the *coronavirus* proteins disclosed herein. Any amino acid substitution is permissible so long as the immunogenic activity of the protein is not significantly altered (e.g., at most 10%, 20%, 30%, 40% or 50% decrease relative to the *coronavirus* protein antigens disclosed herein) and the variants retain the desired activity. Preferred variants typically contains substitutions with one or more amino acids substituted with their functional equivalents.

Carriers

A carrier as used herein can be generally referred to a biocompatible molecular system having the capability of incorporating and transporting molecules (e.g., therapeutic agents such as *coronavirus* antigens) to enhance their selectivity, bioavailability and efficiency. The carriers used in the methods, compositions, and systems herein described can be a biocompatible molecular system, either naturally occurring or synthetic, that can be functionalized or conjugated for coupling (e.g., covalently or non-covalently) to a plurality of protein antigens or immunogen polypeptides described herein. The carriers can comprise nanoparticles, nanotubes, nanowires, dendrimers, liposomes, ethosomes and aquasomes, polymersomes and niosomes, foams, hydrogels, cubosomes, quantum dots, exosomes, macrophages, and others identifiable to a person skilled in the art.

In some embodiments, the carrier used herein can be a nanosized carrier such as a nanoparticle. As used herein, the term "nanoparticle" can refer to a nanoscopic particle having a size measured in nanometers (nm). Size of the nanoparticles may be characterized by their maximal dimension. The term "maximal dimension" as used herein nanoparticle can refer to the maximal length of a straight line segment passing through the center of a nanoparticle and terminating at the periphery. In the case of nanospheres, the maximal dimension of a nanosphere corresponds to its diameter. The term "mean maximal dimension" can refer to an average or mean maximal dimension of the nanoparticles, and may be calculated by dividing the sum of the maximal dimension of each nanoparticle by the total number of nanoparticles. Accordingly, value of maximal dimension may be calculated for nanoparticles of any shape, such as nanoparticles having a regular shape such as a sphere, a hemispherical, a cube, a prism, or a diamond, or an irregular shape. The nanoparticles provided herein can need not be spherical and can comprise, for example, a shape such as a cube, cylinder, tube, block, film, and/or sheet. In some embodiments, the maximal dimension of the nanoparticles is in the range from about 1 nm to about 5000 nm, such as between about 20 nm to about 1000 nm, about 20 nm to about 500 nm, about 50 nm to about 300 nm, or about 100 nm to about 200 nm.

The nanoparticle can be, but is not limited to, any one of lipid-based nanoparticles (nanoparticles where the majority of the material that makes up their structure are lipids, e.g., liposomes or lipid vesicles), polymeric nanoparticles, inorganic nanoparticles (e.g., magnetic, ceramic and metallic nanoparticles), surfactant-based emulsions, silica nanoparticles, virus-like particles (particles primarily made up of viral structural proteins that are not infectious or have low infectivity), peptide or protein-based particles (particles where the majority of the material that makes up their structure are peptides or proteins) and/or nanoparticles that are developed using a combination of nanomaterials such as lipid-polymer hybrid nanoparticles formed by polymer cores and lipid shells or nanolipoprotein particles formed by a membrane forming lipid arranged in a membrane lipid bilayer stabilized by a scaffold protein as will be understood by a person skilled in the art.

In some embodiments, a carrier is made up of a plurality of monomeric subunits which assemble with one another through covalent and/or non-covalent forces to form the carrier. In some embodiments, the carrier described herein is a protein nanoparticle comprising a plurality of particle-forming proteins, which are the monomeric subunit proteins that form the protein nanoparticle. Protein nanoparticles can be categorized into non-viral protein nanoparticles and viral-like particles. Examples of non-viral protein nanoparticles include but are not limited to ferritins, vaults, heat-shock proteins, chaperonins, lumazine synthase, encapsulins, and bacterial microcompartments. Viral-like particles can be derived from viruses including but not limited to adenovirus, cowpea mosaic virus, cowpea chlorotic mottle virus, brome mosaic virus, broad bean mottle virus, bacteriophage lambda (e.g., bacteriophage lambda procapsid), MS2 bacteriophage, Qβ bacteriophage, P22 phage capsid, and others identifiable to a person skilled in the art.

In some embodiments, the nanoparticles described herein comprise a virus-like particle (VLP). VLP refers to a non-replicating, viral shell, derived from any of several viruses. VLPs can be naturally occurring or synthesized through the individual expression of viral structural proteins, which can then self-assemble into the virus-like structure. VLPs are generally composed of one or more viral proteins, such as particle-forming proteins referred to as capsid, coat, shell, surface and/or envelope proteins, or particle-forming polypeptides derived from these proteins. In some embodiments, VLPs can form spontaneously upon recombinant expression of the protein in an appropriate expression system. VLPs can differ in morphology, size and number of subunits. Methods for producing particular VLPs are known in the art. The presence of VLPs following recombinant expression of viral proteins can be detected using conventional techniques also known in the art, such as by electron microscopy, biophysical characterization, and the like (See e.g., Baker et al. (1991) Biophys. J. 60:1445-1456; and Hagensee et al. (1994) J. Virol. 68:4503-4505). For example, VLPs can be isolated by density gradient centrifugation and/or identified by characteristic density banding. Alternatively, cryoelectron microscopy can be performed on vitrified aqueous samples of the VLP preparation in question, and images recorded under appropriate exposure conditions. Any of a variety of VLPs known in the art can be used herein, including but not limited to, *Aquifex aeolicus* lumazine synthase, *Thermotoga maritima* encapsulin, *Myxococcus xanthus* encapsulin, bacteriophage Qbeta virus particle, Flock House Virus (FHV) particle, ORSAY virus particle, and infectious bursal disease virus (IBDV) particle. In some embodiments, the nanoparticle used herein can be a bacteriophage VLP, such as Ap205 VLP.

In some embodiments, the nanoparticles described herein comprise a self-assembling nanoparticle. A self-assembling nanoparticle typically refers to a ball-shape protein shell with a diameter of tens of nanometers and well-defined surface geometry that is formed by identical copies of a non-viral protein capable of automatically assembling into a nanoparticle with a similar appearance to VLPs. Examples of self-assembling nanoparticles include but are not limited to ferritin (FR) (e.g., *Helicobacter pylori* ferritin), which is conserved across species and forms a 24-mer, as well as *B. stearothermophilus* dihydrolipoyl acyltransferase (E2p), *Aquifex aeolicus* lumazine synthase (LuS), and *Thermotoga maritima* encapsulin, which all form 60-mers.

In some embodiments, the self-assembling nanoparticles comprise a plurality of particle-forming proteins of 2-keto-3-deoxy-phosphogluconate (KDPG) aldolase from the Entner-Doudoroff pathway of the hyperthermophilic bacterium *Theremotoga Maritima* or a variant thereof. In some embodiments, mutations are introduced to the KDPG aldolase for improved particle yields, stability, and uniformity. For example, in some embodiments mutations can introduced to alter the interface between the wild-type protein trimer of KDPG aldolase. In some embodiments, the nanoparticle used herein is an i301 nanoparticle or a variant thereof. In some embodiments, the nanoparticle used herein is a mutated i301 nanoparticle (for example, mi3 nanoparticle). The self-assembling nanoparticles can form spontaneously upon recombinant expression of the protein in an appropriate expression system. Methods for nanoparticle production, detection, and characterization can be conducted using the same techniques developed for VLPs.

In some embodiments, the multivalent carriers and the related vaccine composition, methods and kits disclosed herein can employ any of a variety of known nanoparticles, their conservatively modified variants in which some amino acid residues are substituted with a functionally equivalent residue, as well as variants with substantially identical sequences (e.g., at least 90%, 95%, or 99% identical).

In some embodiments herein described, the carriers used herein are multivalent carriers. As opposed to a monovalent carrier which presents a single species of a *coronavirus* antigen, a multivalent nanoparticle presents a heterologous population of immunogens, comprising at least two *coronavirus* antigens of or derived from different *coronavirus* strains or species in the family of *Coronaviridae* including subfamilies, genera, or subgenera described herein. Accordingly, the heterologous immunogens presented on a multivalent carrier herein described have different protein sequences.

The term "present" as used herein with reference to a compound (e.g., an antigen) or functional group indicates attachment performed to maintain the chemical reactivity of the compound or functional group attached. Accordingly, a functional group presented on a carrier is able to perform under the appropriate conditions the one or more chemical reactions that chemically characterize the functional group. A compound presented on a carrier is able to perform under the appropriate conditions the one or more chemical reactions that chemically characterize the compound. For example, where the compound is, or comprises, a *coronavirus* antigen, the *coronavirus* antigen presented by a carrier maintains the complex of reactions that are associated with the immunological activity characterizing the *coronavirus* antigen. Accordingly, presentation of a *coronavirus* antigen indicates an attachment such that the immunological activity associated to the *coronavirus* antigen attached is maintained.

The heterologous *coronavirus* antigens presented on the multivalent carrier herein described can be displayed on its surface. Alternatively, the heterologous *coronavirus* antigens presented on the multivalent carrier herein described can be partially encapsulated or embedded such that at least an immunogenic portion of the *coronavirus* antigen is exposed and accessible by a host cell receptor so as to induce an immune response.

Coupling of Coronavirus Antigens and Carriers

The *coronavirus* antigens can be covalently or non-covalently attached to a carrier. The terms "attach", "attached", "couple" and "coupled" are used interchangeably to refer to a chemical association of one entity (e.g., a chemical moiety) with another. The attachment can be direct or indirect such that for example where a first entity is directly bound to a second entity or where a first entity is bound to a second entity via one or more intermediate entity. In some embodiments, the C-terminus of a *coronavirus* antigens is attached to the N-terminus of a subunit forming the carrier.

In some embodiments, the attachment or coupling is covalent such that the attachment occurs in the context of the presence of a covalent bond between two entities. In some embodiments, the attachment or coupling is mediated by non-covalent interactions including but not limited to charge interactions, affinity interactions, metal coordination, hydrophobic interactions, hydrogen bonding interactions, van der Waals interactions, magnetic interactions, electrostatic interactions, dipole-dipole interactions, or combinations thereof. In some embodiments, encapsulation is a form of attachment. In some embodiments, the plurality of *coronavirus* antigens are conjugated to the multivalent carrier.

The carrier herein described can, for example, be functionalized with a functional group or a reactive moiety that is presented for binding with a corresponding functional group or a corresponding reactive moiety of a *coronavirus* antigen. Accordingly, the attachment between the *coronavirus* antigen and the multivalent carrier can occur through the binding between the functional group pair or reactive moiety pair. Exemplary functional group pairs or reactive moiety pairs include but are not limited to avidin (e.g., streptavidin, NeutrAvidin, CaptAvidin) and biotin pair, Strep-Tactin and Strep-tag pair, a thiol and a thiol-reactive moiety (e.g., maleimide, haloacetamide, iodoacetamid, benzylic halides and bromomethylketones) pair, and an amine and an amine-reactive moiety (e.g., active esters such as succinimidyl, tetrafluorophenyl, Carbodiimide, isothiocyanates, sulfonyl chlorides, dichlorotriazines, acryl halides, acyl azides).

In some embodiments, the *coronavirus* antigen can be attached to the multivalent carrier via chemical and/or photoreactive crosslinkers (e.g., crosslinking reagents) that contain two reactive groups, thereby providing a means of covalently linking the antigen and the carrier. The reactive groups in a chemical crosslinking reagent typically belong to the classes of functional groups, including succinimidyl esters, maleimides and iodoacetamides and others identifiable to a skilled person. Additional examples of crosslinking and photoactivatable reagents are described, for example, in thermofisher.com/us/en/home/references/molecular-probes-the-handbook/crosslinking-and-photoactivatable-reagents.html, the content of which is incorporated by reference.

In some embodiments, the *coronavirus* antigen can be attached to the multivalent carrier via a click chemistry moiety. The term "click chemistry," as used herein, can refer to a chemical philosophy introduced by K. Barry Sharpless of The Scripps Research Institute, describing chemistry tailored to generate covalent bonds quickly and reliably by joining small units comprising reactive groups together. Click chemistry does not refer to a specific reaction, but to a concept including reactions that mimic reactions found in nature. In some embodiments, click chemistry reactions are modular, wide in scope, give high chemical yields, generate non-toxic byproducts, are stereospecific, exhibit a large thermodynamic driving force >84 kJ/mol to favor a reaction with a single reaction product, and/or can be carried out under physiological conditions. In particular, click chemistry reactions that can be carried out under physiological conditions and that do not produce toxic or otherwise harmful side products are suitable for the generation of hydrogels in situ. Reactive moieties that can partake in a click chemistry reaction are well known to those of skill in the art, and include, but are not limited to alkyne and azide, alkene and tetrazole or tetrazine, or diene and dithioester. Other suitable reactive click chemistry moieties suitable for use in the context of antigen binding are known to those of skill in the art.

In some embodiments, the *coronavirus* antigen is attached to the multivalent carrier (e.g., particle-forming proteins of the multivalent carrier) through a Spy tag/SpyCatcher binding pair. The Spy tag/SpyCatcher binding pair refers to a protein ligation system that is based on the internal isopeptide bond of the CnaB2 domain of FbaB from *Streptococcus pyogenes* (see, e.g., Zakeri et al., Proc. Natl. Acad. Sci. USA. 2012; 109:E690-E697). CnaB2 is split and engineered into two complementary fragments, such that the first fragment (SpyCatcher) is able to bind and form a covalent isopeptide bond with the second fragment (SpyTag) through the side chains of a lysine in SpyCatcher and an aspartate in SpyTag. Multivalent carriers presenting a plurality of *coronavirus* antigens can then be generated as a result of SpyTag/SpyCatcher mediated conjugation of the antigens to the carriers. The SpyTag/SpyCather binding system can in some embodiments provide improved stability and specificity of the interaction between the *coronavirus* antigens and the particle-forming proteins of the multivalent carrier.

In some embodiments, the particle-forming protein of the multivalent carrier is a fusion protein containing amino acid sequences from at least two unrelated proteins that have been joined together, via peptide bond, to make a single protein. For example, the *coronavirus* protein antigen can be fused to a SpyTag motif and the carrier subunit sequence can be fused to a SpyCatcher motif. Alternatively, the *coronavirus* protein antigen can be fused to a SpyCatcher motif and the carrier subunit sequence can be fused to s SpyTag motif. The *coronavirus* antigen of the plurality of *coronavirus* antigens can comprise a SpyTag at the C-terminal of the *coronavirus* antigen and the particle-forming protein of a plurality of particle-forming proteins comprises a SpyCatcher at the N-terminal of the particle-forming protein.

In some embodiments, the particle-forming protein can be a fusion protein containing a mi3 monomeric subunit protein at the C-terminal of the particle-forming protein and a SpyCatcher protein at the N-terminal of the particle-forming protein or a fusion protein containing a AP205-CP3 monomeric subunit protein at the C-terminal of the particle-forming protein and a SpyCatcher protein at the N-terminal of the particle forming protein such that the SpyCatcher proteins are presented or displayed for binding to the SpyTag of a *coronavirus* antigen.

In some embodiments, the *coronavirus* antigen of the plurality of *coronavirus* antigens comprises a *coronavirus* S protein RBD, and the *coronavirus* S protein RBD comprises a Spy tag at the C-terminal of the *coronavirus* S protein RBD and the particle-forming protein of a plurality of particle-forming proteins comprises a SpyCatcher at the N-terminal of the particle-forming protein.

Multivalent Carriers

In some embodiments herein described, the multivalent carrier used herein can comprise a plurality of *coronavirus* antigens derived from a plurality of *coronaviruses*, the plurality of *coronoviruses* being different from one another. The plurality of *coronavirus* antigens can comprise at least a first *coronavirus* antigen of a first *coronavirus* and a second *coronavirus* antigen of a second *coronavirus* that is different from the first *coronavirus*.

One *coronavirus* is considered being different from another *coronavirus* when the two *coronoviruses* are from different taxonomic groups, including from different strains, species, subgenera, genera, subfamilies in the *Coronaviridae* family. One *coronavirus* is also considered being different from another *coronavirus* when the two *coronoviruses* are antigenically divergent viruses. The term "antigenically divergent *coronavirus*" refers to a strain of *coronavirus* that has a tendency to mutate or has developed mutations over time, thus changing the amino acids that are displayed to the immune system. Such mutation over time can also be referred to as "antigenic drift".

In some embodiments, the at least first *coronavirus* and second *coronavirus* are from different genera within the *Coronaviridae* family. In some embodiments, the at least first *coronavirus* and second *coronavirus* are from different subgenera within the same Coronaviridae family. In some embodiments, the at least first *coronavirus* and second *coronavirus* are from different species within the same *Coronaviridae* family. In some embodiments, the at least first *coronavirus* and second *coronavirus* are different strains within the same *Coronaviridae* family.

In some embodiments, the multivalent carrier comprises a plurality of *coronavirus* antigens, the plurality of *coronavirus* antigens comprising at least two, three, four, five, six, seven, or eight heterologous *coronavirus* antigens, each of which is of or derived from a *coronavirus* different from one another.

For example, the multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, and a third *coronavirus* antigen of a third *coronavirus*, in which the first *coronavirus*, the second *coronavirus* and the third *coronavirus* are different from one another.

The multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, a third *coronavirus* antigen of a third *coronavirus*, and a fourth *coronavirus* antigen of a fourth *coronavirus*, in which the first *coronavirus*, the second *coronavirus*, the third *coronavirus*, and the four *coronavirus* are different from one another.

The multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, a third *coronavirus* antigen of a third *coronavirus*, a fourth *coronavirus* antigen of a fourth *coronavirus*, and a fifth *coronavirus* antigen of a fifth *coronavirus*, in which the first *coronavirus*, the second *coronavirus*, the third *coronavirus*, the four *coronavirus*, and the fifth *coronavirus* are different from one another.

The multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, a third *coronavirus* antigen of a third *coronavirus*, a fourth *coronavirus* antigen of a fourth *coronavirus*, a fifth *coronavirus* antigen of a fifth *coronavirus*, and a sixth *coronavirus* antigen of a sixth *coronavirus*, in which the first *coronavirus*, the second *coronavirus*, the third *coronavirus*, the four *coronavirus*, the fifth *coronavirus*, and the sixth *coronavirus* are different from one another.

The multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, a third *coronavirus* antigen of a third *coronavirus*, a fourth *coronavirus* antigen of a fourth *coronavirus*, a fifth *coronavirus* antigen of a fifth *coronavirus*, a sixth *coronavirus* antigen of a sixth *coronavirus*, and a seventh *coronavirus* antigen of a seventh *coronavirus*, in which the first *coronavirus*, the second *coronavirus*, the third *coronavirus*, the four *coronavirus*, the fifth *coronavirus*, the sixth *coronavirus*, and the seventh *coronavirus* are different from one another.

The multivalent carrier can comprise a plurality of heterologous *coronavirus* antigens, the plurality of *coronavirus* antigens comprising at least a first *coronavirus* antigen of a first *coronavirus*, a second *coronavirus* antigen of a second *coronavirus*, a third *coronavirus* antigen of a third *coronavirus*, a fourth *coronavirus* antigen of a fourth *coronavirus*, a fifth *coronavirus* antigen of a fifth *coronavirus*, a sixth *coronavirus* antigen of a sixth *coronavirus*, a seventh *coronavirus* antigen of a seventh *coronavirus*, and an eighth *coronavirus* antigen of an eight *coronavirus*, in which the first *coronavirus*, the second *coronavirus*, the third *coronavirus*, the four *coronavirus*, the fifth *coronavirus*, the sixth *coronavirus*, the seventh *coronavirus*, and the eighth *coronavirus* are different from one another.

In some embodiments, the multivalent carrier can comprise a plurality of *coronavirus* antigens, the plurality of *coronavirus* antigens comprising more than eight heterologous *coronavirus* antigens, each of which is of or derived from a *coronavirus* different from one another (i.e. *coronaviruses* of different taxonomic groups and/or antigenically divergent viruses).

The number of heterologous *coronavirus* antigens presented by a multivalent carrier can be different in different embodiments. In some embodiments, the multivalent carrier herein described can present at least 2, 3, 4, 5, 6, 7, 8, 9, 10, 11, 12, 13, 14, 15, 16, 17, 18, 19, 20, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, heterologous *coronavirus* antigens.

The total number of *coronavirus* antigens presented by a multivalent carrier can be different in different embodiments. In some embodiments, the multivalent carrier can comprise a total number of *coronavirus* antigens about, at least, at least about, at most, or at most about 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 200, 300, 400, 500, or a number or a range between any two of these values.

It should be understood that in some embodiments the total number of *coronavirus* antigens presented by a nanoparticle is limited by the number of particle-forming subunits that make up the nanoparticle, such as the number of particle-forming lipids in lipid-based nanoparticles and the number of particle-forming proteins in protein-based nanoparticles. For example, encapsulin proteins from *Thermotoga maritima* form nanoparticles having 60-mers. Therefore, encapsulin-based nanoparticles (e.g., mi3 nanoparticle and i301 nanoparticle) can present a maximum of 60 protein antigens. In some embodiments, a particle-forming subunit of a carrier can be attached with more than one *coronavirus* antigen.

The plurality of *coronavirus* antigens attached to a multivalent carrier can be of a same protein type or corresponding proteins. Coronavirus antigens of a same protein type may or may not have identical amino acid sequences, but generally share some sequence homology. For example, the *coronavirus* S proteins of different *coronoviruses* are of a same protein type or corresponding proteins. As another example, envelope proteins from different *coronoviruses* are considered the same protein type or corresponding proteins. In some embodiments, proteins of different *coronavirus* taxonomic groups having the same function are considered the same protein type or corresponding proteins. In some embodiments, *coronavirus* antigens of a same protein type have at least 50% sequence identity, for example at least 65%, 70%, 80%, 90%, 95%, 98%, 99%, or more sequence identity.

Alternatively, in some embodiments the plurality of *coronavirus* antigens attached to a multivalent carrier can comprise *coronavirus* proteins of different protein types. Coronavirus proteins of different protein types typically have different functions. For example, the plurality of *coronavirus* antigens attached to a multivalent carrier can comprise *coronavirus* S proteins or portions thereof as well as other *coronavirus* proteins such as a *coronavirus* N protein or a portion thereof, a *coronavirus* HE protein or a portion thereof, a *coronavirus* papain-like protease or a portion thereof, a *coronavirus* 3CL protease or a portion thereof, and/or a *coronavirus* M protein or a portion thereof.

One or more of the plurality of *coronavirus* antigens, or each of the plurality of *coronavirus* antigens, can a sequence identity of about, at least, or at least about 65%, 70%, 75%, 80%, 85%, 90%, 95%, 98%, or 99% with one another. In some embodiments, the plurality of *coronavirus* antigens each comprise a *coronavirus* S protein RBD or a portion thereof, the *coronavirus* S protein RBDs or portions thereof having a sequence identity of about, at least, or at least about, 65%, 70%, 75%, 80%, 85%, 90%, 95%, 98%, or 99% with one another. In some embodiments, the plurality of *coronavirus* antigens each comprise an amino acid sequence having at least 65%, 70%, 75%, 80%, 85%, 90%, 95%, or 98% sequence identity to an amino acid sequence selected from SEQ ID NOs: 1-12 and 15-26. In some embodiments, the plurality of *coronavirus* antigens each comprise an amino acid sequence selected from SEQ ID NOs: 1-12 and 15-26.

The number of attached *coronavirus* antigens of different *coronoviruses* can be the same or different. For example, the number of the first *coronavirus* antigens of the first *coronavirus* and the number of the second *coronavirus* antigens of the second *coronavirus* can be in a ratio from 1:50 to 50:1. In some embodiments, the ratio can be, be about, be at least, be at least about, be at most, be at most about, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, 100:1, or a number or a range between any two of the values. In some embodiments, the ratio can be, be about, be at least, be at least about, be at most, be at most about, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, 100:1, or a number or a range between any two of the values.

In some embodiments, the number of the *coronavirus* antigens of a *coronavirus* and the number of the *coronavirus* antigens of another *coronavirus* can be in a ratio from 1:50 to 50:1. In some embodiments, the ratio can be, be about, be at least, be at least about, be at most, be at most about, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, 100:1, or a number or a range between any two of the values.

The multivalent carrier herein described can induce broadly protective anti-*coronavirus* responses by eliciting broadly neutralizing antibodies. Broadly neutralizing antibodies are antibodies that can neutralize *coronoviruses* from a taxonomic group that is not only the same as but also differs from the taxonomic groups of the *coronoviruses* from which the *coronavirus* antigens used to elicit the antibodies are derived. Broadly neutralizing response can also be referred to as heterologously neutralizing response. In some embodiments, the multivalent carriers herein described can elicit broadly neutralizing antibodies that neutralize one or more *coronoviruses* from a subfamily, genus, subgenus, species, and/or strain that differ from the subfamily, genus, subgenus, species, and/or strain of the *coronoviruses* from which the *coronavirus* antigens are derived to produce the multivalent carriers.

In some embodiments, the multivalent carrier comprising heterologous *coronavirus* antigens from a plurality of *coronoviruses* including a first *coronavirus* and a second *coronavirus* can induce heterologous binding and neutralizing responses against not only the first *coronavirus* and the second *coronavirus*, but also against one or more *coronaviruses* different from the first *coronavirus* and the second *coronavirus* (e.g., a third *coronavirus*, a fourth *coronavirus*, etc.). In particular, the multivalent carrier comprising heterologous *coronavirus* antigens from a plurality of *coronoviruses* not including one or more particular *coronoviruses* can induce heterologous binding and neutralizing responses against the one or more particular *coronoviruses*.

For example, if a multivalent carrier is constructed using *coronavirus* antigens from SARS-CoV2 and SHC014-CoV, antibodies elicited by such multivalent carrier are able to neutralize one or more *coronoviruses* of genera, subgenera, species and/or strains other than SARS-CoV2 and SHC014-CoV. As another example, a multivalent carrier constructed using *coronavirus* antigens from WIV1, Rf1, RmYN02 and pang17 can elicit heterologous binding and neutralizing responses against not only WIV1, Rf1, RmYN02 and pang17, but also other *coronoviruses* such as SARS-CoV2, SHC014, SARS-CoV, Yun 11, BM-4831 and BtKY72 (see, for example, FIGS. 3C-F). In yet another example, a multivalent carrier constructed using *coronavirus* antigens from SARS-CoV-2, SHC014, RaTG13, and Rs4081 can elicit heterologous binding and neutralizing responses against not only SARS-CoV-2, SHC014, RaTG13, and Rs4081, but also other *coronoviruses* such as WIV1, SARS-CoV, Yun 11, BM-4831 and BtKY72 (see, for example, FIGS. 3C-F).

In some embodiments, the multivalent carrier comprising heterologous *coronavirus* antigens from a plurality of *coronoviruses* including a first *coronavirus* and a second *coronavirus* can induce about the same or comparable magnitude (e.g., about, at least, at least about 80%, 85%, 90%, 95%, 100%, 105%, 110%, 115%, 120%, 125%, 130%, 140%, 150%, or a number or a range between any two of these values, relative to one another) of immune response against the first *coronavirus* and/or the second *coronavirus* when compared to a monovalent carrier (also referred to as a "homotypic nanoparticle") comprising a homologous population of a single *coronavirus* antigen from the first *coronavirus* or the second *coronavirus*. In other words, co-display of *coronavirus* antigens from *coronoviruses* of different taxonomic groups does not diminish the immune response against a *coronavirus* (e.g., SARS-CoV2) relative to homotypic carriers presenting antigens from the *coronavirus* (e.g., homotypic SARS-CoV2 nanoparticle). In a nonlimiting example, in terms of the magnitude of immune response against SARS-CoV2, it can be advantageous for conducting immunization with a mosaic nanoparticle that includes SARS-CoV2 protein antigen as well as other *coronavirus* protein antigens versus a homotypic SARS-CoV2 nanoparticle (see e.g., FIG. 3C).

In some embodiments, the multivalent carrier comprising heterologous *coronavirus* antigens from a plurality of *coronoviruses* including a first *coronavirus* and a second *coronavirus* can induce an increased magnitude of immune response against the first *coronavirus* and/or the second *coronavirus* when compared to a monovalent carrier comprising a homologous population of a single *coronavirus* antigen from the first *coronavirus* or the second *coronavirus*. The magnitude of immune response induced by the multivalent carrier can be about, at least, or at least about 0.2, 0.5, 0.9, 1.1, 1.5, 1.7, 2, 3, 4, 5, 6, 7, 8, 9, 10, fold(s), or a number or a range between any of these values, greater than by the monovalent carrier. In some embodiments, the magnitude of immune response induced by the multivalent carrier can be increased by about, at least, or at least about 5%, 10%, 20%, 30%, 50%, 75%, 100%, 110%, 120%, 150%, 200%, 250%, 300%, 400%, 500%, 600%, 700%, 800%, 900%, 1000%, or a number or a range between any of these values, as compared to that by the monovalent carrier.

In some embodiments, the multivalent carrier does not present a *coronavirus* antigen from a particular *coronavirus*, but can still produce broadly neutralizing antibodies against that particular *coronavirus*, for example, at a comparable or even enhanced magnitude as compared to a monovalent carrier presenting *coronavirus* antigens from that particular *coronavirus*. For example, the multivalent carrier comprising heterologous *coronavirus* antigens from a plurality of *coronoviruses* not including a first *coronavirus* can induce about the same or comparable magnitude (e.g., about, at least, at least about 80%, 85%, 90%, 95%, 100%, 105%, 110%, 115%, 120%, 125%, 130%, 140%, 150%, or a number or a range between any of these values, relative to one another) of immune response against the first *coronavirus* when compared to a monovalent carrier comprising a homologous population of a single *coronavirus* antigen from the first *coronavirus*.

In some embodiments, the multivalent carrier comprising heterologous *coronavirus* antigens from a plurality of *coronoviruses* not including a first *coronavirus* can elicit an enhanced heterologous binding and neutralizing response against the first *coronavirus* when compared to a monovalent carrier comprising a homologous population of a single *coronavirus* antigen from a second *coronavirus*. The first and second *coronaviruses* are different from one another. The magnitude of neutralizing response induced by the multivalent carrier can be about, at least, or at least about 0.2, 0.5, 0.9, 1.1, 1.5, 1.7, 2, 3, 4, 5, 6, 7, 8, 9, 10 fold, or a number or a range between any of these values, greater than by the monovalent carrier. In some embodiments, the magnitude of immune response induced by the multivalent carrier can be increased by about, at least, or at least about 5%, 10%, 20%, 30%, 50%, 75%, 100%, 110%, 120%, 150%, 200%, 250%, 300%, 400%, 500%, 600%, 700%, 800%, 900%, 1000%, or a number or a range between any of these values, as compared to that by the monovalent carrier.

In some embodiments, the multivalent carrier comprising heterologous *coronavirus* antigens from a plurality of *coronoviruses* including a first *coronavirus* and a second *coronavirus* can elicit a substantially enhanced neutralizing response against the first *coronavirus* and/or the second *coronavirus* when compared to a soluble *coronavirus* antigen from the first *coronavirus* or the second *coronavirus*. The magnitude of neutralizing response induced by the multivalent carrier can be about, at least, or at least about 1, 2, 3, 4, 5, 6, 7, 8, 9, 10, 50, 100, 200, 300, 400, 500, 600, 700, 800, 900, 1000 fold, or a number or a range between any of these values, greater than by the soluble *coronavirus* antigen.

The multivalent carriers herein described can be prepared using any standard molecular biology procedures known to the person skilled in the art as well as the protocols exemplified herein (see e.g., Example 2). In some embodiments, particle-forming subunits and/or the *coronavirus* protein antigens can be produced by liquid-phase or solid-phase chemical protein synthetic methods known to those of skill in the art.

Production of the particle-forming subunits and/or the *coronavirus* protein antigens can use recombinant DNA technology well known in the art. For example, a tagged *coronavirus* protein antigen or a *coronavirus* protein antigen functionalized with a protein tag can be synthesized using biosynthetic methods such as cell-based or cell-free methods known to the person skilled in the art. A tagged *coronavirus* protein antigen can be produced using an expression vector comprising a nucleic acid molecule encoding the *coronavirus* protein antigen. The nucleic acid molecule can be operably linked to appropriate regulatory elements including, but not limited to, a promoter, enhancer, transcription initiation site, termination site, and translation initiation site. The vector can also comprise a nucleic acid molecule encoding one or more protein tags (e.g., a poly(His) tag, SpyTag). In some embodiments, the vector can additionally include a nucleic acid molecule encoding a trimerization motif (e.g., a foldon trimerization domain from T4 fibritin or viral capsid protein SHP). The vector can also comprise a nucleic acid molecule encoding a signal peptide that directs the protein into the proper cellular pathway, such as a signal peptide for secretion of the expressed protein into supernatant medium. The vector may comprise one or more selectable marker genes such as gene providing ampicillin resistance or kanamycin resistance. Methods for the construction of nucleic acid constructs are well known. See, for example, *Molecular Cloning: a Laboratory Manual*, $3^{rd}$ edition, Sambrook et al. 2001 Cold Spring Harbor Laboratory Press, and *Current Protocols in Molecular Biology*, Ausubel et al. eds., John Wiley & Sons, 1994. Protein biosynthesis of tagged *coronavirus* protein antigens can be performed by providing cell-based or cell-free protein translation systems with the expression vectors encoding the tagged *coronavirus* protein antigens. Similarly, a tagged particle-forming protein can be produced using an expression vector comprising a nucleic acid molecule encoding a particle-forming subunit and a nucleic acid molecule encoding a protein tag (e.g., SpyCatcher). In an exemplary embodiment, the multivalent carriers are produced following the protocols described in Cohen A A et al, 2021, PLoS ONE 16(3): e0247963, the content of which is incorporated herein by reference.

In some embodiments, constructs expressing the carrier subunit and the *coronavirus* antigens can be introduced together into a host or transformation-competent cell. Multivalent carriers can be generated as a result of conjugation of the expressed *coronavirus* antigens to the self-assembled nanoparticles through a functional group pair or a reactive moiety pair described herein (e.g., SpyTag/SpyCatcher).

Carriers (e.g., nanoparticles with SpyCatcher) and *coronavirus* antigens (e.g., SpyTagged protein antigens) can, for example, be prepared separately and then incubated under a condition (e.g., in a TBS buffer at room temperature) for a certain time period (e.g., about, at least, or at least about 1 hour, 2 hours, 5 hours, 10 hours, 12 hours, 15 hours) to allow for the conjugation of the carriers and the *coronavirus* antigens. In some embodiments, the *coronavirus* protein antigens are provided in an excess amount as compared to the particle-forming subunits of the carriers, such as 1-fold, 2-fold, 3-fold, 4-fold, 5-fold or greater than the particle-forming subunits.

Pharmaceutical Compositions and Therapeutic Applications

Vaccine Compositions

Also provided herein include a vaccine composition comprising the multivalent carrier as herein described, in combination with one or more compatible and pharmaceutically acceptable carriers. A vaccine composition is a pharmaceutical composition that can elicit a prophylactic (e.g., to prevent or delay the onset of a disease, or to prevent the manifestation of clinical or subclinical symptoms thereof) or therapeutic (e.g., suppression or alleviation of symptoms) immune response in a subject.

The phrase "pharmaceutically acceptable" is employed herein to refer to those agents, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically-acceptable material, composition or vehicle, such as a liquid or solid filler, diluent, excipient, solvent or encapsulating material, involved in carrying or transporting the subject chemical from one organ, or portion of the body, to another organ, or portion of the body. Each carrier must be "acceptable" in the sense of being compatible with the other ingredients of the formulation and not injurious to the subject. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth: (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

In some embodiments, pharmaceutically acceptable carrier comprise a pharmaceutical acceptable salt. As used herein, a "pharmaceutical acceptable salt" includes a salt of an acid form of one of the components of the compositions herein described. These include organic or inorganic acid salts of the amines. Preferred acid salts are the hydrochlorides, acetates, salicylates, nitrates and phosphates. Other suitable pharmaceutically acceptable salts are well known to those skilled in the art and include basic salts of a variety of inorganic and organic acids.

The vaccine composition can further comprise appropriate adjuvants. Adjuvant refers to any immunomodulating substance capable of being combined with the protein antigens herein described to enhance, improve or otherwise modulate an immune response in a subject. The adjuvants can be covalently or non-covalently attached or coupled to the surface of the multivalent carrier via any of a variety approaches known in the art. Exemplary adjuvants that can be attached to the carrier include, but are not limited to, immunostimulatory peptides, oligonucleotide CpG motifs, immunostimulatory carbohydrates and polysaccharides, and immunostimulatory protein or peptide molecules (e.g. cytokines, chemokines, flagellin, and derivatives thereof), Freund's adjuvant, sapanin (e.g., Matrix M1), lecithin, aluminum hydroxide, monophosphoryl lipid A, interleukin-12, STING agonist, Advax, and AS01B, STING agonist (e.g., bis-(3',5')-cyclic dimeric guanosine monophosphate (c-di-GMP or cdGMP)).

In some embodiments herein described, the vaccine composition comprises one or more adjuvant selected from the group comprising, or consisting of, aluminum salt-based adjuvants (e.g., aluminum hydroxide, alhydrogel), emulsion adjuvants (e.g., AddaVax™, MF59®, AS03, Freund's adjuvant, Montanide ISA51), and toll-like receptor agonists (e.g., CpG, Poly I:C, glucopyranosyl lipid A (GLA), flagellin, and resiquimod (R848)). As a skilled person will understand, both MF58® and AddaVax™ are squalene-based oil-in-water nano-emulsion.

The vaccine composition can be formulated for a variety of modes of administration. Techniques for formulation and administration can be found, for example, in "Remington's Pharmaceutical Sciences", $18^{th}$ ed., 1990, Mack Publishing Co., Easton, Pa. In some embodiments, the vaccine compositions of the present disclosure may be specially formulated for administration in solid or liquid form, including those adapted for the following: (1) oral administration, for example, drenches (aqueous or non-aqueous solutions or suspensions), tablets, boluses, powders, granules, pastes; (2) parenteral administration, for example, by subcutaneous, intramuscular or intravenous injection as, for example, a sterile solution or suspension: (3) topical application, for example, as a cream, ointment or spray applied to the skin; (4) intravaginally or intrarectally, for example, as a pessary, cream or foam; or (5) aerosol, for example, as an aqueous aerosol, liposomal preparation or solid particles containing the hydrogel composition. The pharmaceutical compositions can comprise one or more pharmaceutically-acceptable carriers.

Formulations useful in the methods of the present disclosure include those suitable for oral, nasal, topical (including buccal and sublingual), rectal, vaginal, aerosol and/or parenteral administration. The formulations may conveniently be presented in unit dosage form and may be prepared by any methods well known in the art of pharmacy. The amount of active ingredient which can be combined with a pharmaceutically acceptable carrier to produce a single dosage form will vary depending upon the host being treated, the particular mode of administration. The amount of active ingredient, which can be combined with a pharmaceutically acceptable carrier to produce a single dosage form will generally be that amount of the multivalent carrier which produces a therapeutic effect or an immune response. Generally, out of one hundred percent, this amount will range from about 1% to about 99% of active ingredient, preferably from about 5% to about 70%, most preferably from about 10% to about 30%.

Formulations suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like.

In solid dosage forms for oral administration (capsules, tablets, pills, dragees, powders, granules and the like), the multivalent carrier is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, acetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof and (10) coloring agents. In the case of capsules, tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

Liquid dosage forms for oral administration include pharmaceutically acceptable emulsions, microemulsions, solutions, suspensions, syrups and elixirs. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

The vaccine composition can be formulated for parenteral administration by injection, e.g. by bolus injection or continuous infusion. Formulations for injection can be presented in a unit dosage form, e.g. in ampoules or in multi-dose containers, with an optionally added preservative. The pharmaceutical compositions can further be formulated as suspensions, solutions or emulsions in oily or aqueous vehicles, and may contain other agents including suspending, stabilizing and/or dispersing agents.

Applications

The vaccine compositions disclosed herein can be employed in a variety of therapeutic or prophylactic applications to stimulate an immune response in a subject in need, to treat or prevent a *coronavirus* infection in a subject in need, and/or to treat or prevent a disease or disorder caused by a *coronavirus* in a subject in need.

As used herein, the term "treatment" or "treat" refers to an intervention made in response to a disease, disorder or physiological condition (e.g., a *coronavirus* infection) manifested by a patient. The aim of treatment may include, but is not limited to, one or more of the alleviation or prevention of symptoms, slowing or stopping the progression or worsening of a disease, disorder, or condition and the remission of the disease, disorder or condition. The term "treat" and "treatment" includes, for example, therapeutic treatments, prophylactic treatments, and applications in which one reduces the risk that a subject will develop a disorder or other risk factor. Treatment does not require the complete curing of a disorder and encompasses embodiments in which one reduces symptoms or underlying risk factors. In some embodiments, "treatment" refers to both therapeutic treatment and prophylactic or preventative measures. Those in need of treatment include those already affected by a disease or disorder or undesired physiological condition as well as those in which the disease or disorder or undesired physiological condition is to be prevented. As used herein, the term "prevention" refers to any activity that reduces the burden of the individual later expressing those symptoms. This can take place at primary, secondary and/or tertiary prevention levels, wherein: a) primary prevention avoids the development of symptoms/disorder/condition; b) secondary prevention activities are aimed at early stages of the condition/disorder/symptom treatment, thereby increasing opportunities for interventions to prevent progression of the condition/disorder/symptom and emergence of symptoms; and c) tertiary prevention reduces the negative impact of an already established condition/disorder/symptom by, for example, restoring function and/or reducing any condition/disorder/symptom or related complications. The term "prevent" does not require the 100% elimination of the possibility of an event. Rather, it denotes that the likelihood of the occurrence of the event has been reduced in the presence of the compound or method.

The term "condition" as used herein indicates a physical status of the body of an individual (as a whole or as one or more of its parts), that does not conform to a standard physical status associated with a state of complete physical, mental and social well-being for the individual. Conditions herein described include but are not limited disorders and diseases wherein the term "disorder" indicates a condition of the living individual that is associated to a functional abnormality of the body or of any of its parts, and the term "disease" indicates a condition of the living individual that impairs normal functioning of the body or of any of its parts and is typically manifested by distinguishing signs and symptoms.

Signs and symptoms manifesting a disease or disorder caused by a *coronavirus* infection can include, but not limited to, fever, cough, tiredness, a loss of taste or smell, shortness of breath or difficulty breathing, muscle aches, chills, sore throat, runny nose, headache, chest pain, pink eye (conjunctivitis), nausea, vomiting, diarrhea, rash, pneumonia and acute respiratory distress syndrome. Diseases or disorders caused by a *coronavirus* infection may also include severe complications including but not limited to heart disorders including arrhythmias, cardiomyopathy, acute cardiac injury, coagulation disorders including thromboembolism and pulmonary emboli, disseminated intravascular coagulation (DIC), hemorrhage, and arterial clot formation, Guillain-Barré syndrome, sepsis, shock, multiorgan failure, and multi system inflammatory syndrome, and any combination thereof.

The terms "subject", "subject in need", and "individual" as used herein refer to an animal and in particular higher animals and in particular vertebrates such as mammals and more particularly human beings. In some embodiments, the subject or individual has been exposed to a *coronavirus*. The term "exposed" indicates the subject has come in contact with a person or an animal that is known to be infected with a *coronavirus*. In some embodiments, a subject in need can be a healthy subject exposed to or at risk of being exposed to a *coronavirus*. In some embodiments, subjects in need include those already suffering from the disease or disorder caused by a *coronavirus* infection or those diagnosed with a *coronavirus* infection.

Accordingly, the vaccine composition can be administered in advance of any symptom, for example, in advance of a *coronavirus* infection. The vaccine composition can also be administered at or after the onset of a symptom of disease or infection, for example, after development of a symptom of infection or after diagnosis of the infection.

The phrase "therapeutically effective amount" as used herein means that amount of multivalent carriers disclosed herein which is effective for producing some desired therapeutic effect and/or generating a desired response, such as reduce or eliminate a sign or symptom of a condition or disease, such as pneumonia, at a reasonable benefit/risk ratio. The therapeutically effective amount also varies depending on the structure and antigens of the multivalent carrier, the route of administration utilized, and the specific diseases or disorders to be treated as will be understood to a person skilled in the art. For example, if a given clinical treatment is considered effective when there is at least a 20% reduction in a measurable parameter associated with a disease or disorder, a therapeutically effective amount of the multivalent carriers for the treatment of that disease or disorder is the amount necessary to achieve at least a 20% reduction in that measurable parameter.

In some embodiments, a therapeutically effective amount is necessary to inhibit *coronavirus* replication or to measurably alleviate outward symptoms of the viral infection or inhibiting further development of the disease, condition, or disorder. In some embodiments, a therapeutically effective amount is an amount that prevents one or more signs or symptoms that can be caused by a *coronavirus* infection. In some embodiments, a therapeutically effective amount can be an amount that prevents one or more signs or symptoms of a particular disease or condition from developing, such as one or more signs or symptoms associated with *coronavirus* infections.

A therapeutically effective amount of the vaccine composition herein described can be estimated from data obtained from cell culture assays and further determined from data obtained in animal studies, followed up by human clinical trials. For example, toxicity and therapeutic efficacy of the vaccine compositions described herein can be determined by standard pharmaceutical procedures in cell cultures or experimental animals, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Compositions that exhibit large therapeutic indices are preferred.

In some embodiments, the determination of a therapeutically effective amount of the vaccine composition can be measured by measuring the titer of antibodies produced against a *coronavirus*. Methods of determining antibody titers and methods of performing virus neutralization arrays are known to those skilled in the art as well as exemplified in the example section of the present disclosure (see, for example, Example 2).

In some embodiments, a method of stimulating an immune response in a subject in need is disclosed herein, the method comprising administering to the subject a pharmaceutically effective amount of the vaccine composition, thereby stimulating an immune response in the subject in need. In some embodiments, administering the vaccine composition induces neutralizing responses against *corono-viruses* different from the first *coronavirus* and the second *coronavirus*. In some embodiments, administering the vaccine composition induces neutralizing responses against additional *coronoviruses* different from the *coronoviruses* from which the plurality of *coronavirus* antigens are derived to produce the vaccine composition. In some embodiments, administering the vaccine composition induces neutralizing responses against the *coronoviruses* from which the plurality of *coronavirus* antigens are derived to produce the vaccine composition.

In some embodiments, a method for treating or preventing a *coronavirus* infection in a subject in need thereof is disclosed, the method comprising administering to the subject a pharmaceutically effective amount of the vaccine composition herein described, thereby treating or preventing the *coronavirus* infection in the subject. In some embodiments, administering the vaccine composition results in treating or preventing infection caused by a *coronavirus* different from the first *coronavirus* and the second *coronavirus*. In some embodiments, administering the vaccine composition results in treating or preventing infection caused by additional *coronoviruses* different from the *coronoviruses* from which the plurality of *coronavirus* antigens are derived to produce the vaccine composition. In some embodiments, administering the vaccine composition results in treating or preventing infection caused by the *coronaviruses* from which the plurality of *coronavirus* antigens are derived to produce the vaccine composition.

In some embodiments, a method of treating or preventing a disease or disorder caused by a *coronavirus* infection in a subject in need thereof is disclosed, the method comprising administering to the subject a pharmaceutically effective amount of the vaccine composition herein described, thereby treating or preventing the disease or disorder caused by the *coronavirus* infection in the subject. In some embodiments, administering the vaccine composition results in treating or preventing the disease or disorder caused by a *coronavirus* different from the first *coronavirus* and the second *coronavirus*. In some embodiments, administering the vaccine composition results in treating or preventing the disease or disorder caused by additional *coronoviruses* different from the *coronoviruses* from which the plurality of *coronavirus* antigens are derived to produce the vaccine composition. In some embodiments, administering the vaccine composition results in treating or preventing the disease or disorder caused by the *coronoviruses* from which the plurality of *coronavirus* antigens are derived to produce the vaccine composition.

In some embodiments, the vaccine composition can be used for treating and preventing a broad spectrum of *coronavirus* infections or a disease and disorder caused by such infections by inducing broadly protective anti-*coronavirus* responses. For example, the vaccine composition herein described can elicit broadly neutralizing antibodies that neutralize one or more *coronaviruses* from a subfamily, genus, subgenus, species, and/or strain that differ from the subfamily, genus, subgenus, species, and/or strain of the *coronaviruses* from which the *coronavirus* antigens are derived to produce the vaccine composition.

The vaccine compositions herein described can be administered using techniques well known to those skilled in the art, such as injection, inhalation or insulation or by oral, parenteral or rectal administration. The vaccine composition can be administered by means including, but not limited to, traditional syringes and needleless injection devices. Suitable routes of administration include, but are not limited to, parenteral delivery, such as intramuscular, intradermal, subcutaneous, intramedullary injections, as well as, intrathecal, direct intraventricular, intravenous, intraperitoneal, intranasal, or intraocular injections. For injection, the vaccine composition herein described can be formulated in aqueous solutions, preferably in physiologically compatible buffers such as Hanks' solution, Ringer's solution, or physiological saline buffer.

In some embodiments, the multivalent carriers and vaccine compositions thereof can be administered to a subject systematically. The wording "systemic administration" as used herein indicates any route of administration by which a vaccine composition is brought in contact with the body of the individual, so that the resulting composition location in the body is systemic (i.e. non limited to a specific tissue, organ or other body part where the vaccine is administered). Systemic administration includes enteral and parenteral administration. Enteral administration is a systemic route of administration where the substance is given via the digestive tract, and includes but is not limited to oral administration, administration by gastric feeding tube, administration by duodenal feeding tube, gastrostomy, enteral nutrition, and rectal administration. Parenteral administration is a systemic route of administration where the substance is given by route other than the digestive tract and includes but is not limited to intravenous administration, intra-arterial administration, intramuscular administration, subcutaneous administration, intradermal, administration, intraperitoneal administration, and intravesical infusion.

The vaccine composition herein disclosed can be administered to a subject using a prime/boost protocol. In such protocol, a first vaccine composition is administered to the subject (prime) and then after a period of time, a second vaccine composition can be administered to the subject (boost). Administration of the second composition (boost composition) can occur days, weeks or months after administration of the first composition (prime composition). For example, the boost composition can be administered about three days, 1 week, 2 weeks, 3 weeks, 4 weeks, 5 weeks, 6 weeks, 7 weeks, 8 weeks, 12 weeks, 16 weeks, 20 weeks, 24 weeks, or 28 weeks, or a number or a range between any two of these values, after the prime composition is administered. In some embodiments, the boost composition can be administered about 4 weeks after administration of the prime composition.

Therefore, the vaccine composition can be administered to the subject in need two or more times. For example, the methods herein described can comprise administering to the subject a first vaccine composition, and after a period of time, administering to the subject a second vaccine composition.

The prime vaccine composition and the boost vaccine composition can be, but need not be, the same composition. In some embodiments, the prime vaccine composition and the boost vaccine composition can contain same or different *coronavirus* antigens attached to the multivalent carrier. In some embodiments, the prime vaccine composition and the boost vaccine composition can contain the same *coronavirus* antigens attached to the multivalent carrier, but with the multivalent carrier in different pharmaceutically effective amounts. In some embodiments, the prime vaccine composition and the boost vaccine composition can contain different adjuvants. In some embodiments, the prime vaccine composition comprises the multivalent carrier disclosed herein.

The multivalent carrier and the vaccine composition thereof can be used to protect a subject against infection by heterologous *coronoviruses* (e.g., *coronoviruses* of different taxonomic groups). In other words, a vaccine composition made using *coronavirus* antigens of a first *coronavirus* and a second *coronavirus* is capable of protecting an individual against infection by not only the first and second *coronoviruses* (i.e., the matched strains), but also *coronoviruses* from different taxonomic groups (i.e., mismatched strains or *coronavirus* strains different from the first and second *coronaviruses*). For example, a vaccine composition made using *coronavirus* antigens from WIV1, Rf1, RmYN02 and pang17 can elicit broadly neutralizing antibodies, thereby protecting the subject against infection by not only WIV1, Rf1, RmYN02 and pang17 at a comparable magnitude, but also *coronavirus* SARS-CoV2, SHC014, SARS-CoV, Yun 11, BM-4831 and BtKY72 (see e.g., FIGS. 3C-F).

In some embodiments, the multivalent carrier and the vaccine composition thereof can protect an individual against infection by an antigenically divergent *coronavirus*. Therefore, in some embodiments, a vaccine composition made using *coronavirus* antigens of a first *coronavirus* and a second *coronavirus* is also capable of protecting an individual against infection by emerging *coronavirus* variants of the first and second *coronaviruses*. For example, a vaccine composition made using *coronavirus* antigens of SARS-CoV2 and SHC014 can protect an individual against infection by antigenically divergent *coronavirus* strains of *Sarbecovirus* and by diverging *coronavirus* strains of the future.

Kits

The multivalent carrier and the vaccine composition containing the multivalent carrier as described herein can be provided as components of a kit.

Kits can include multivalent carriers or vaccines of the present disclosure as well components for making such multivalent carriers and vaccines. As such, kits can include, for example, primers, nucleic acid molecules, expression vectors, nucleic acid constructs encoding protein antigens and/or particle-forming subunits described herein, cells, buffers, substrates, reagents, administration means (e.g., syringes), and instructions for using any of said components. Kits can also include pre-formed carriers and *coronavirus* protein antigens herein described. It should be appreciated that a kit may comprise more than one container comprising any of the aforementioned, or related, components. For example, certain parts of the kit may require refrigeration, whereas other parts can be stored at room temperature. Thus, as used herein, a kit can comprise components sold in separate containers by one or more entity, with the intention that the components contained therein be used together.

EXAMPLES

Some aspects of the embodiments discussed above are disclosed in further detail in the following examples, which are not in any way intended to limit the scope of the present disclosure.

Example 1

Exemplary Embodiments of Mosaic Nanoparticles Elicit Cross-Reactive Immune Responses to Zoonotic Coronaviruses in Mice Most current SARS-CoV-2 vaccine candidates include the spike trimer (S), the viral protein that mediates target cell entry after one or more of its RBDs adopt an "up" position to bind a host receptor (FIG. 1A). The RBDs of *human coronaviruses* SARS-CoV-2, SARS-CoV, HCoV-NL63, and related *animal coronaviruses* (WIV1 and SCH014) use angiotensin-converting enzyme 2 (ACE2) as their host receptor, while other *coronoviruses* use receptors such as dipeptidyl peptidase 4 or sialic acids. Consistent with its function in viral entry, S is the primary target of neutralizing antibodies, with many targeting the RBD.

Without being bound by any particular theory, multivalent display of antigen enhances B-cell responses and can provide longer-lasting immunity than monovalent antigens, thus protein-based vaccine candidates often involve a nanoparticle that enables antigen multimerization. Many nanoparticles and coupling strategies have been explored for vaccine design, with "plug and display" strategies being especially useful. In one such approach, multiple copies of an engineered protein domain called SpyCatcher fused to subunits of a virus-like particle form spontaneous isopeptide bonds to purified antigens tagged with a 13-residue SpyTag. The SpyCatcher-SpyTag system was used to prepare multimerized SARS-CoV-2 RBD or S trimer that elicited high titers of neutralizing antibodies. Although promising for protection against SARS-CoV-2, *coronavirus* reservoirs in bats suggest future cross-species transmission, necessitating a vaccine that protects against emerging *coronoviruses* as well as SARS-CoV-2. Here SpyCatcher003-mi3 nanoparticles were prepared simultaneously displaying SpyTagged RBDs from human and animal *coronoviruses* to evaluate whether mosaic particles can elicit cross-reactive antibody responses, as previously demonstrated for influenza head domain mosaic particles. Mice immunized with homotypic or mosaic nanoparticles produced broad binding and neutralizing responses, in contrast to plasma antibodies elicited in humans by SARS-CoV-2 infection. Moreover, mosaic nanoparticles showed enhanced heterologous binding and neutralization properties against human and bat SARS-like *Betacoronaviruses* (*Sarbecoviruses*) compared with homotypic SARS-CoV-2 nanoparticles.

Protection against SARS-CoV-2 and SARS-related emergent zoonotic *coronoviruses* is urgently needed. In this example, homotypic nanoparticles displaying the RBD of SARS-CoV-2 or co-displaying SARS-CoV-2 RBD were made along with RBDs from animal *Betacoronaviruses* that represent threats to humans (mosaic nanoparticles; 4-8 distinct RBDs). Mice immunized with RBD-nanoparticles, but not soluble antigen, elicited cross-reactive binding and neutralization responses. Mosaic-RBD-nanoparticles elicited antibodies with superior cross-reactive recognition of heterologous RBDs compared to sera from immunizations with homotypic SARS-CoV-2-RBD-nanoparticles or COVID-19 convalescent human plasmas. Moreover, sera from mosaic-RBD-immunized mice neutralized heterologous pseudotyped *coronoviruses* equivalently or better after priming than sera from homotypic SARS-CoV-2-RBD-nanoparticle immunizations, demonstrating no immunogenicity loss against particular RBDs resulting from co-display. As shown in this example, a single immunization with mosaic-RBD-nanoparticles provides a potential strategy to simultaneously protect against SARS-CoV-2 and emerging zoonotic *coronaviruses*.

Figure 5:
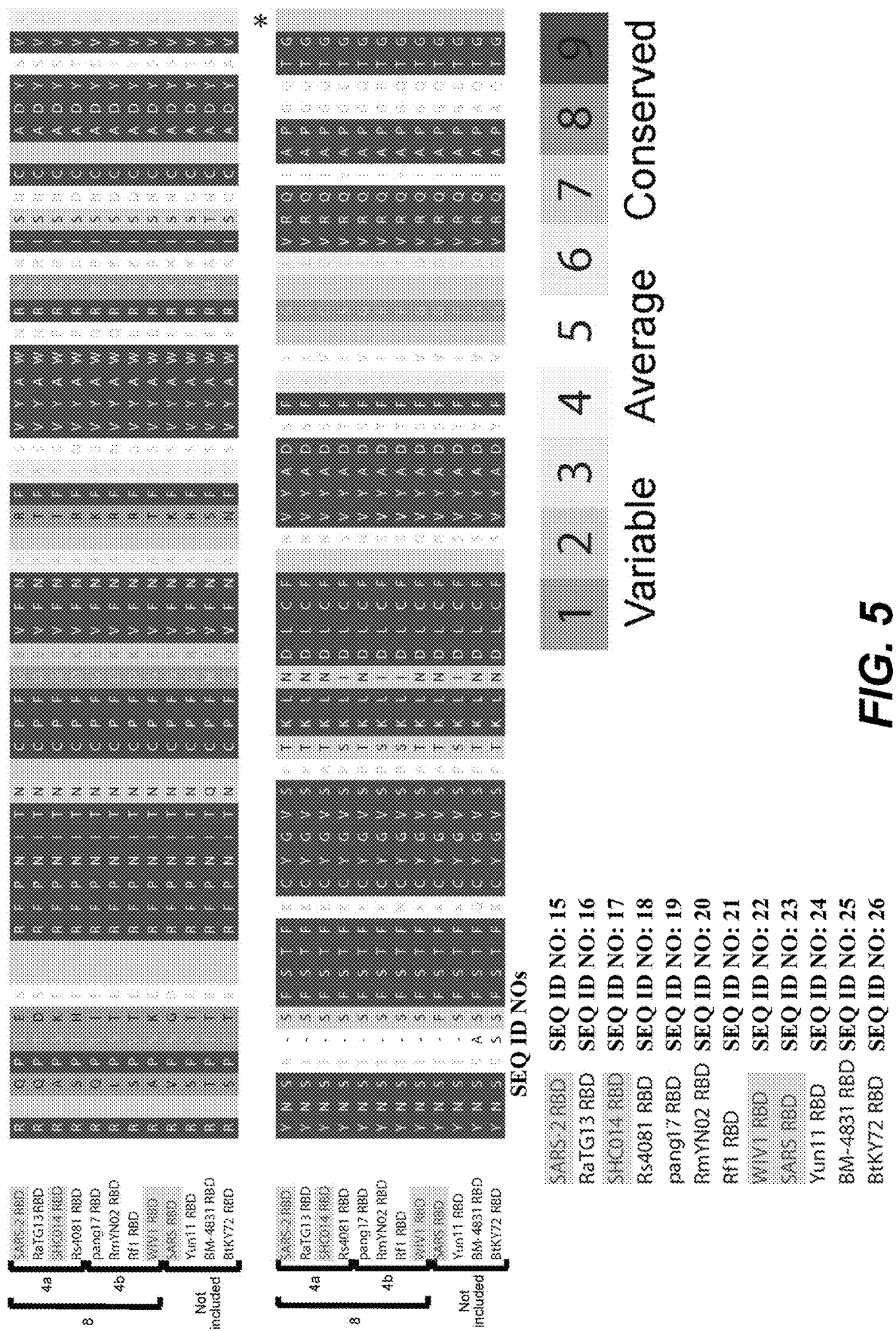
FIG. 5 shows non-limiting exemplary data related to alignment of RBD sequences used for making mosaic particles. Sequences shown are for the RBDs of SARS-CoV-2 (SARS-2, GenBank: MN985325.1, SEQ ID NO: 15), RaTG13 (QHR63300, SEQ ID NO: 16), SHC014 (RsSHC014, KC881005, SEQ ID NO: 17), Rs4081 (KY417143, SEQ ID NO: 18), PCoV_GX-P5L (pang17) (QIA48632, SEQ ID NO: 19), RmYN02 (GSAID EPI_ISL_412977, SEQ ID NO: 20), Rf1 (DQ412042, SEQ ID NO: 21), WIV1 (KF367457, SEQ ID NO: 22), SARS-CoV (AAP13441.1, SEQ ID NO: 23), Yun11 (Cp/Yunnan2011, JX993988, SEQ ID NO: 24), BM-4831 (BM48-31/BGR/2008, NC014470, SEQ ID NO: 25), and BtKY72 (KY352407, SEQ ID NO: 26). SARS-2 RBD residues that interact directly with ACE2 are indicated by an asterisk. Note that antibody neutralization by direct binding of ACE2-binding residues does not represent the only mechanism of neutralization for ACE2-tropic viruses. This has been shown for monoclonal human antibodies derived from COVID-19 patients: in some embodiments, neutralizing antibodies do not directly interact with the ACE2-binding site on RBD (for example, class 3 anti-SARS-CoV-2 neutralizing antibodies). Red shading indicates strains known to use ACE2 as a receptor.
Figure 5:
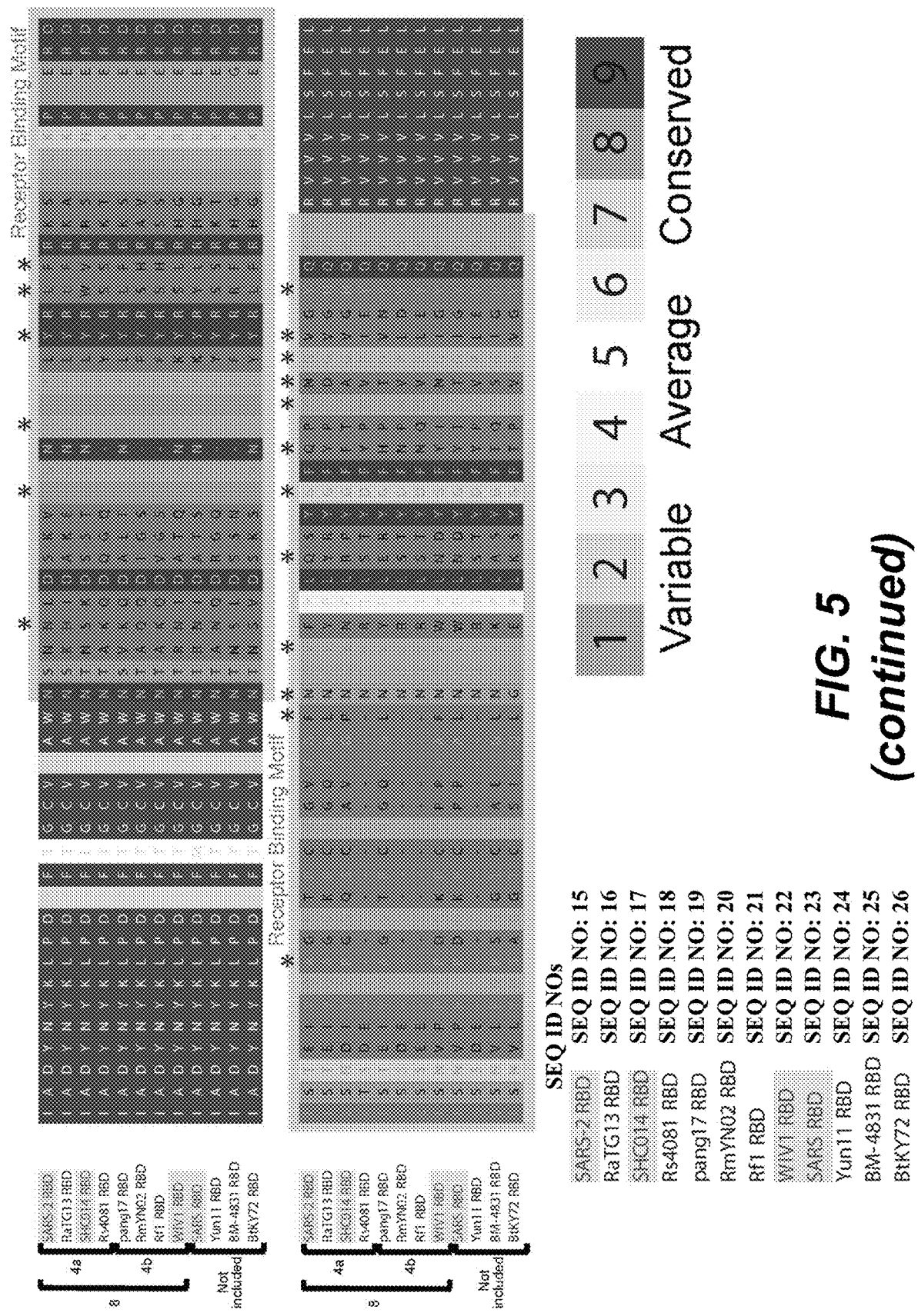
Figure 5:
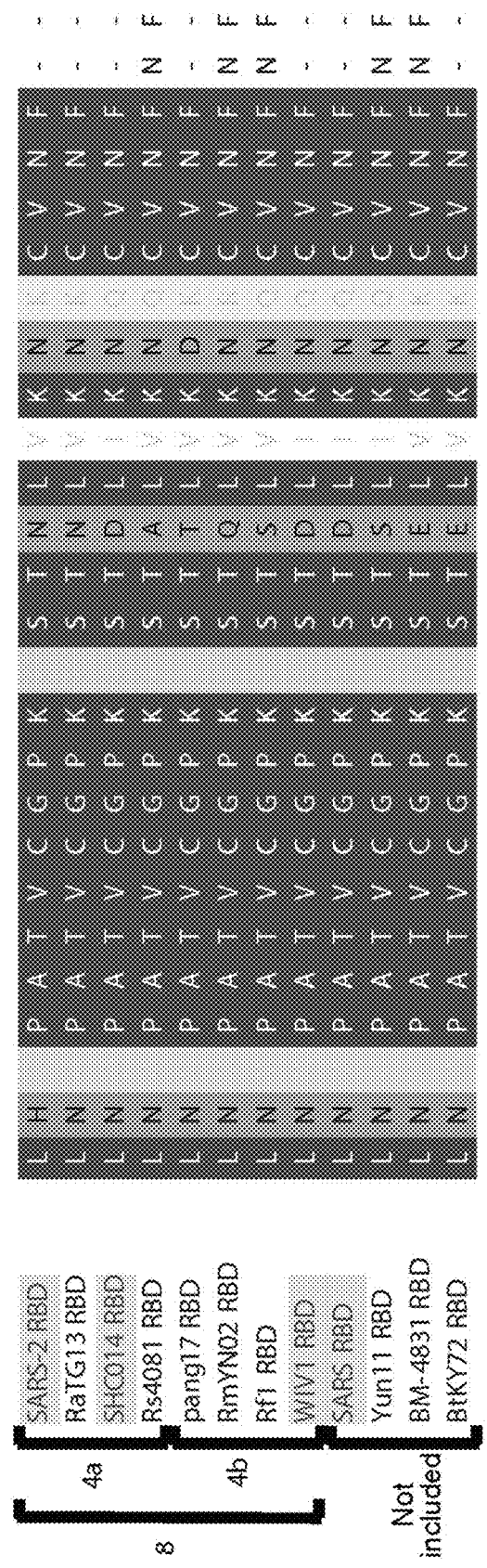
Figure 5:
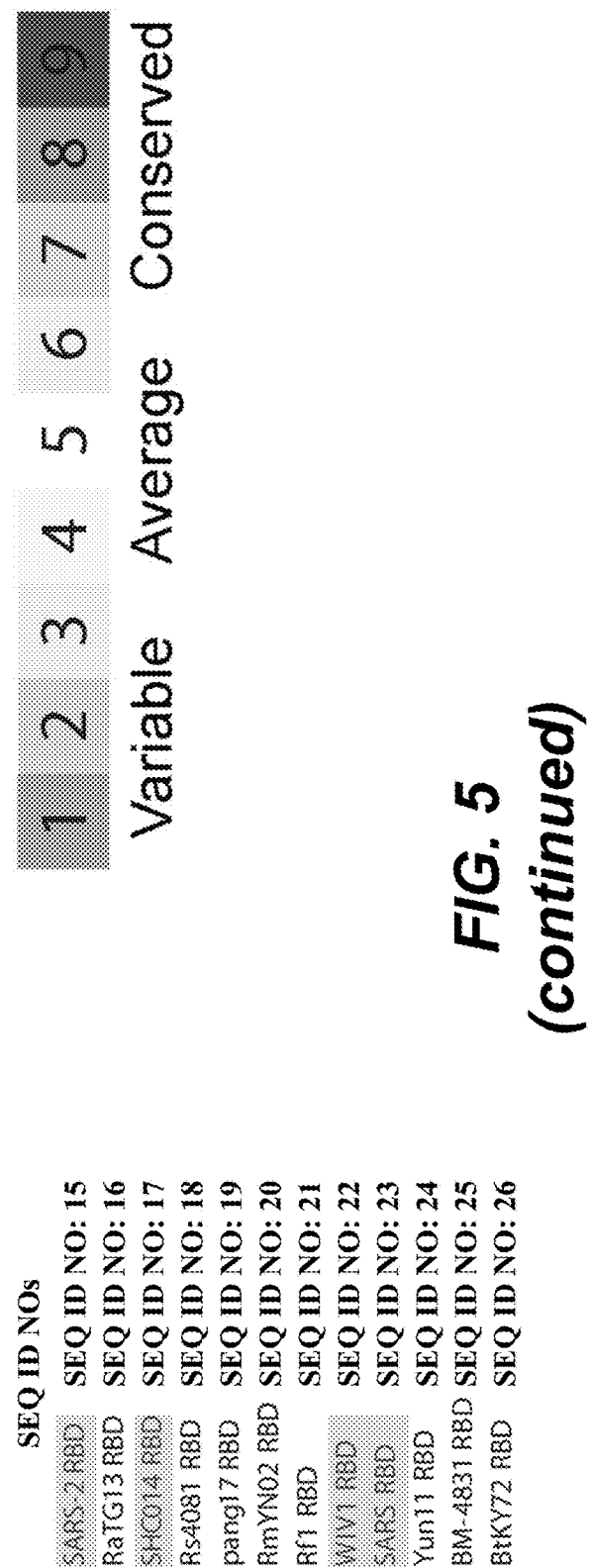

A study of *Sarbecovirus* RBD receptor usage and cell tropism described in Letko M et al., *Nature Microbiology* 5, 562-569 (2020) was used to guide the choice of RBDs for co-display on mosaic particles. From 29 RBDs that were classified into distinct clades (clades 1, 2, 1/2, and 3), diverse RBDs were identified from SARS-CoV, WIV1, and SHC014 (clade 1), SARS-CoV-2 (clade 1/2), Rs4081, Yunnan 2011 (Yun11), and Rf1 (clade 2), and BM48-31 (clade 3), of which SARS-CoV-2 and SARS-CoV are *human coronaviruses* and the rest are bat viruses originating in China or Bulgaria (BM48-31). Also included were RBDs from the GX pangolin clade 1/2 *coronavirus* (referred to here as pang17), RaTG13, the bat clade 1/2 virus most closely related to SARS-CoV-2, RmYN02, a clade 2 bat virus from China, and BtKY72, a Kenyan bat clade 3 virus. Mapping of the sequence conservation across selected RBDs showed varying degrees of sequence identity (68-95%), with highest sequence variability in residues corresponding to the SARS-CoV-2 ACE2 receptor-binding motif (FIG. 1A-FIG. 1D; FIG. 5A-FIG. 5C). 8 of the 12 RBDs were chosen for making three types of mosaic nanoparticles: mosaic-4a (coupled to SARS-2, RaTG13, SHC014, and Rs4081 RBDs), mosaic-4b (coupled to pang17, RmYN02, RF1, and WIV1 RBDs), and mosaic-8 (coupled to all eight RBDs), and they were compared with homotypic mi3 particles constructed from SARS-CoV-2 RBD alone (homotypic SARS-2). RBDs from SARS, Yun11, BM-4831, and BtKY72, which were not coupled to mosaic particles, were used to evaluate sera for cross-reactive responses.

Figure 2A:
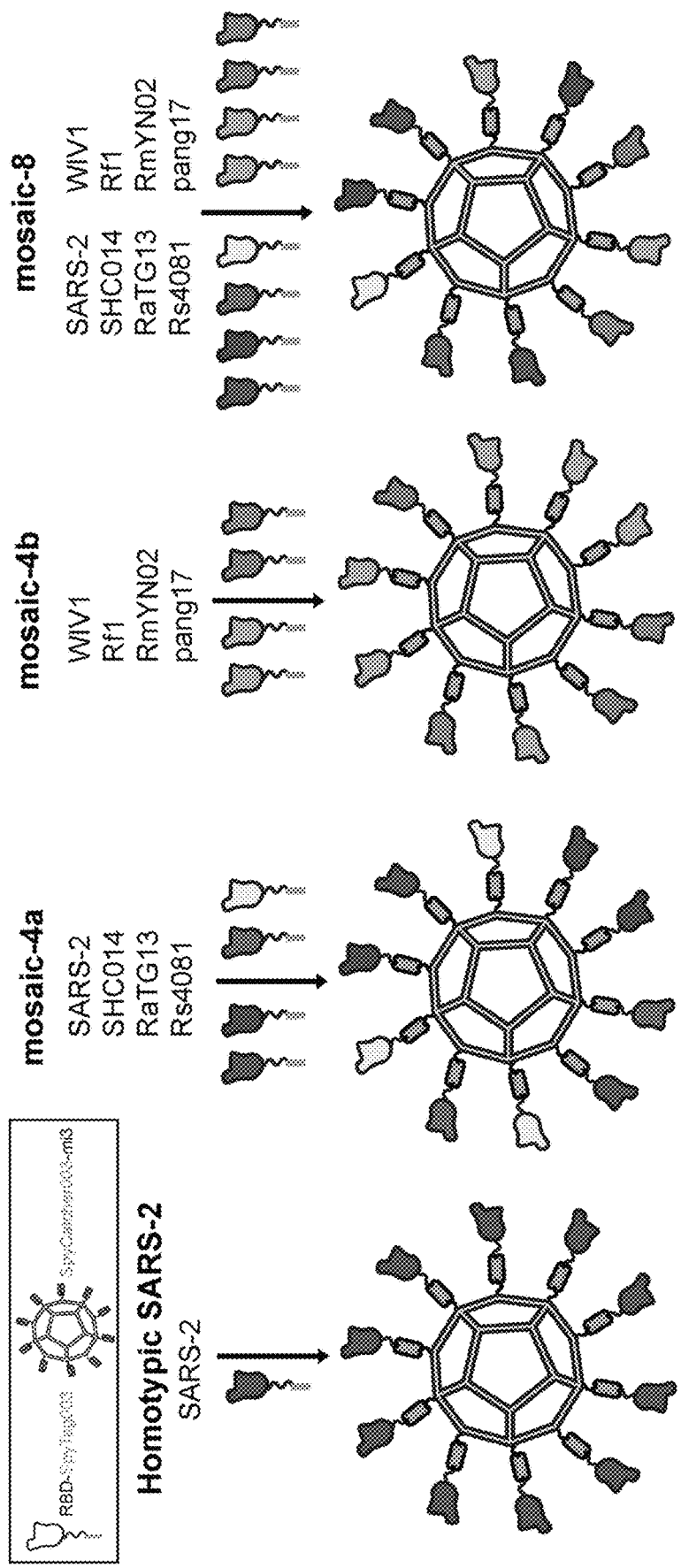
FIG. 2A-FIG. 2C depict non-limiting exemplary embodiments of construction of RBD nanoparticles.
Figure 2B:
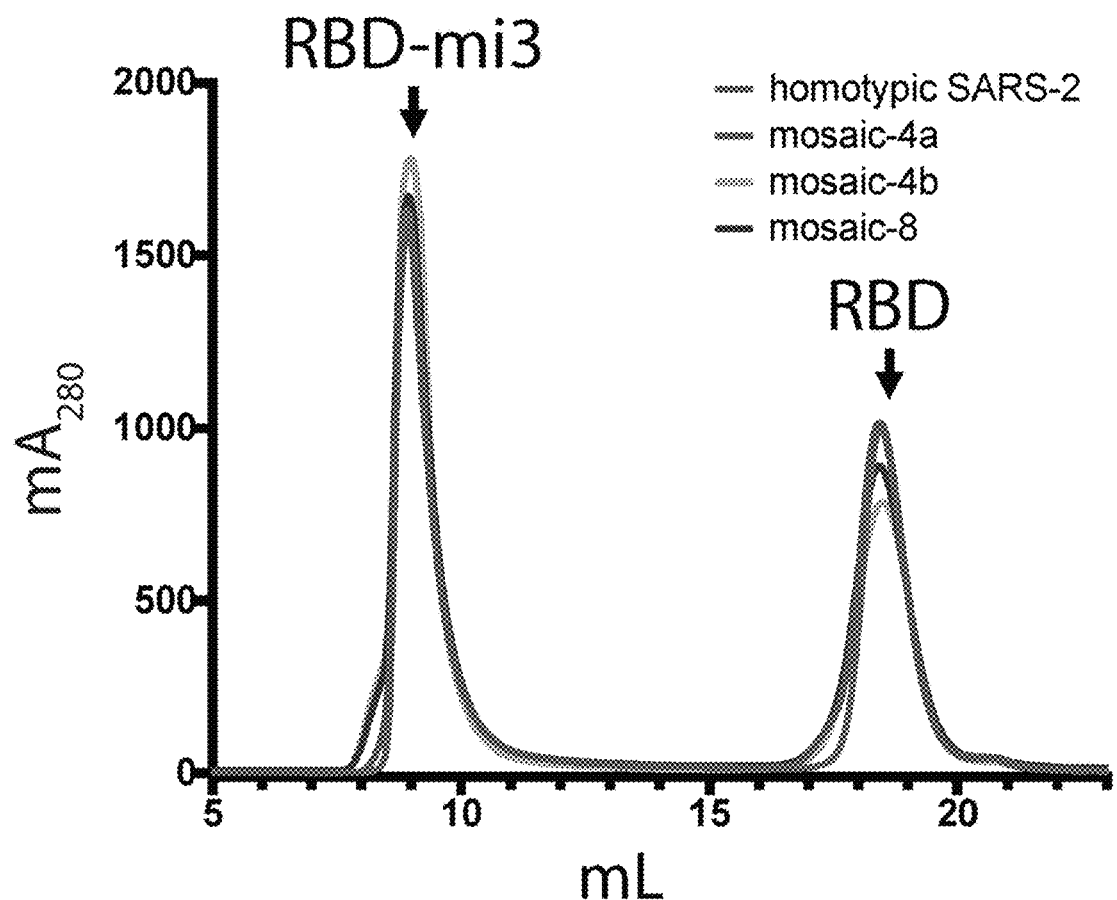
Figure 2C:
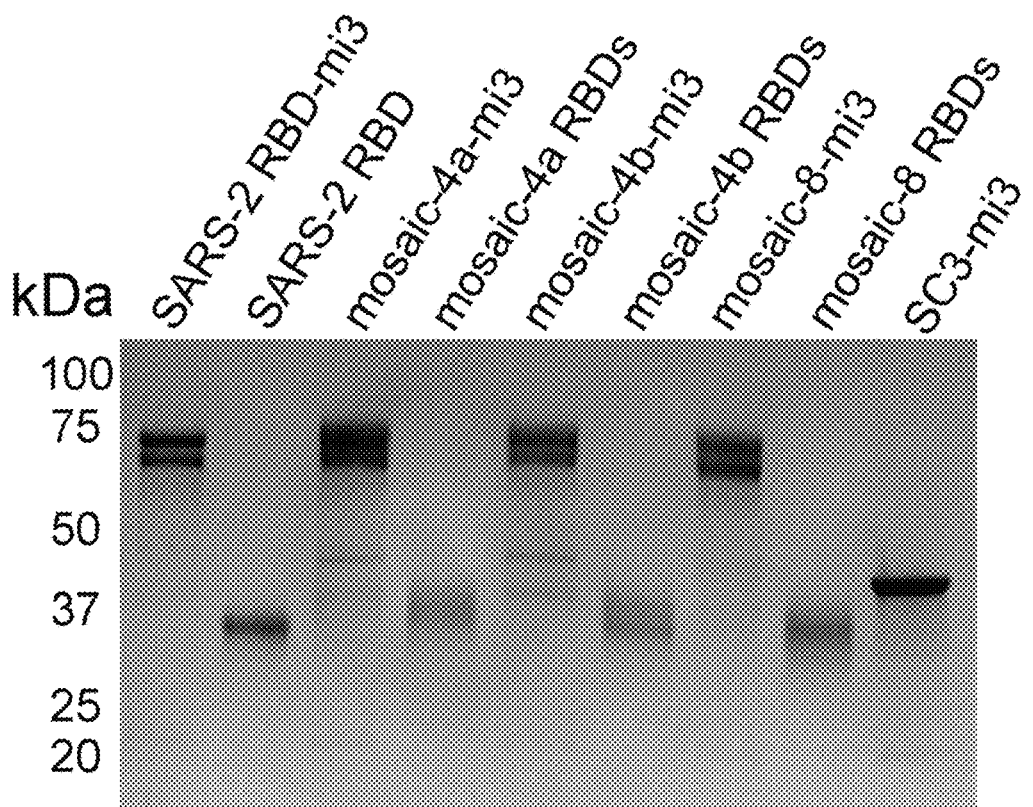
Figure 6A:
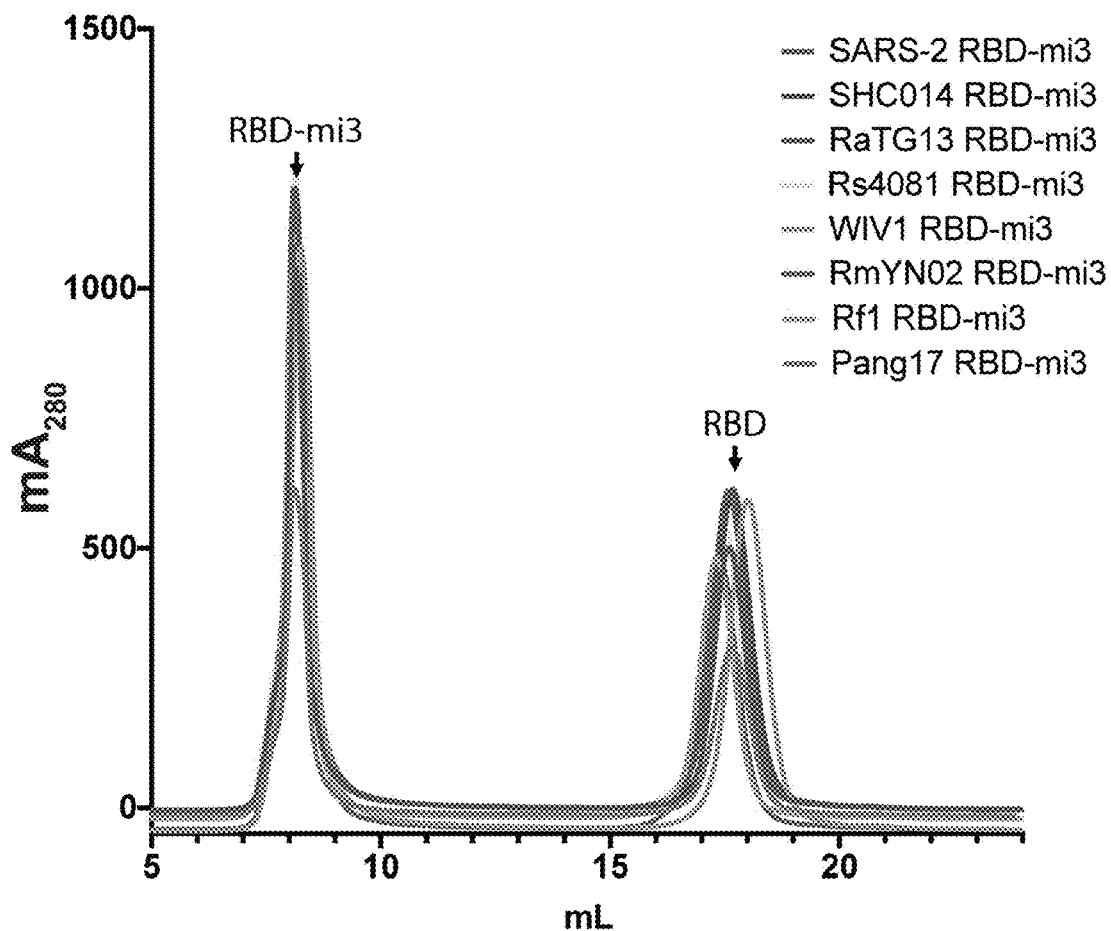
FIG. 6A-FIG. 6B depict non-limiting exemplary data showing RBDs from the eight *Sarbecovirus* S proteins conjugate equivalently to SpyCatcher003-mi3, suggesting a statistical mixture of RBDs on mosaic particles.
Figure 6B:
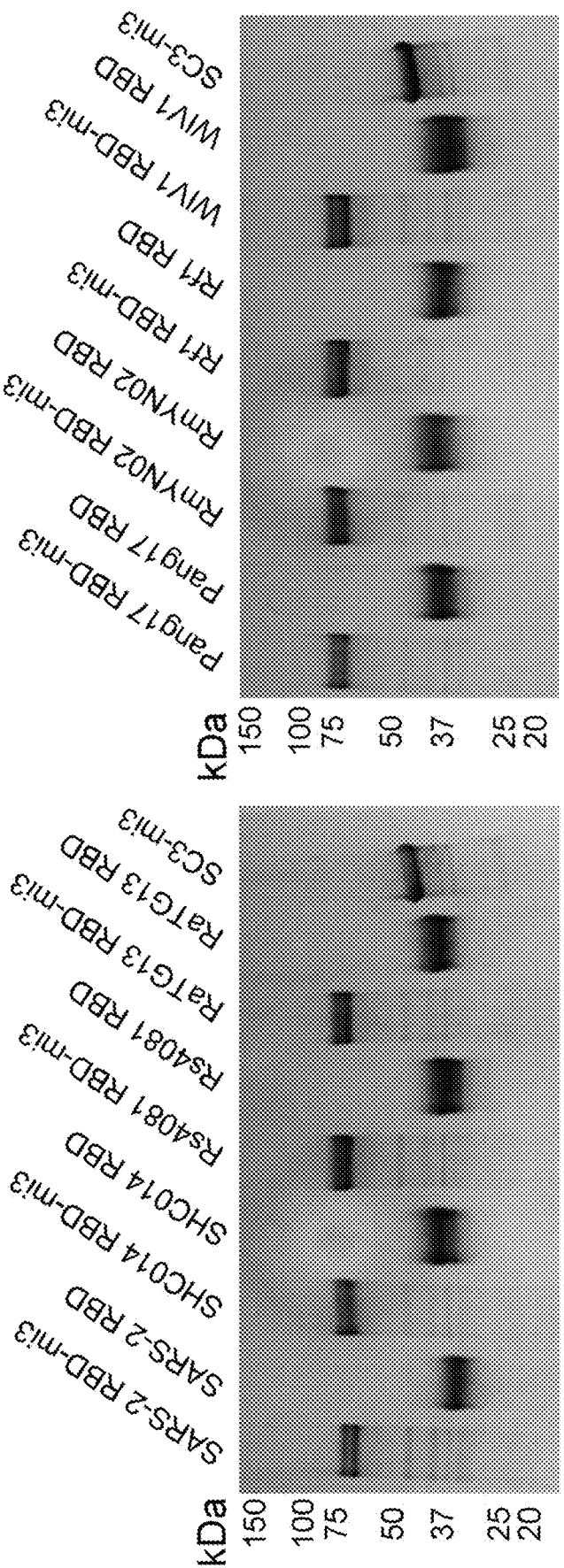

SpyTag003-RBDs were coupled to SpyCatcher003-mi3 (60 potential conjugation sites) to make homotypic and mosaic nanoparticles (FIG. 2A). Particles were purified by size exclusion chromatography (SEC) and analyzed by SDS-PAGE, revealing monodisperse SEC profiles and nearly 100% conjugation (FIG. 2B-FIG. 2C). Representative RBDs were conjugated to SpyCatcher003-mi3 with similar or identical efficiencies (FIG. 6A-FIG. 6B), suggesting that mosaic particles contained approximately equimolar mixtures of different RBDs.

Mice were immunized with either soluble SARS-CoV-2 spike trimer (SARS-2 S), nanoparticles displaying only SARS-2 RBD (homotypic SARS-2), nanoparticles co-displaying RBDs (mosaic-4a, mosaic-4b, mosaic-8), or unconjugated nanoparticles (mi3). IgG responses were evaluated after prime or boost immunizations (FIG. 3A) by ELISA against SARS-2 S (FIG. 3B) or a panel of RBDs (FIG. 3C-FIG. 3F; FIG. 7A-FIG. 7F). Sera from unconjugated nanoparticle-immunized animals (black in FIG. 3A-FIG. 3F, FIG. 7A-FIG. 7F) showed no responses above background. Anti-SARS-2 S trimer and anti-SARS-2 RBD serum responses were similar (FIG. 3B-FIG. 3C), demonstrating that antibodies elicited against RBDs can access their epitopes on SARS-2 S trimer. In vitro neutralization assays were also conducted using a pseudotyped virus assay that quantitatively correlates with authentic virus neutralization for strains known to infect $293T_{ACE2}$ target cells (SARS-CoV-2, SARS, WIV1 and SHC104). Neutralization and ELISA titers were significantly correlated (FIG. 8A-FIG. 8D), thus suggesting ELISAs are predictive of neutralization results when pseudotyped neutralization assays were not possible due to unknown viral entry receptor usage.

Figure 3A:
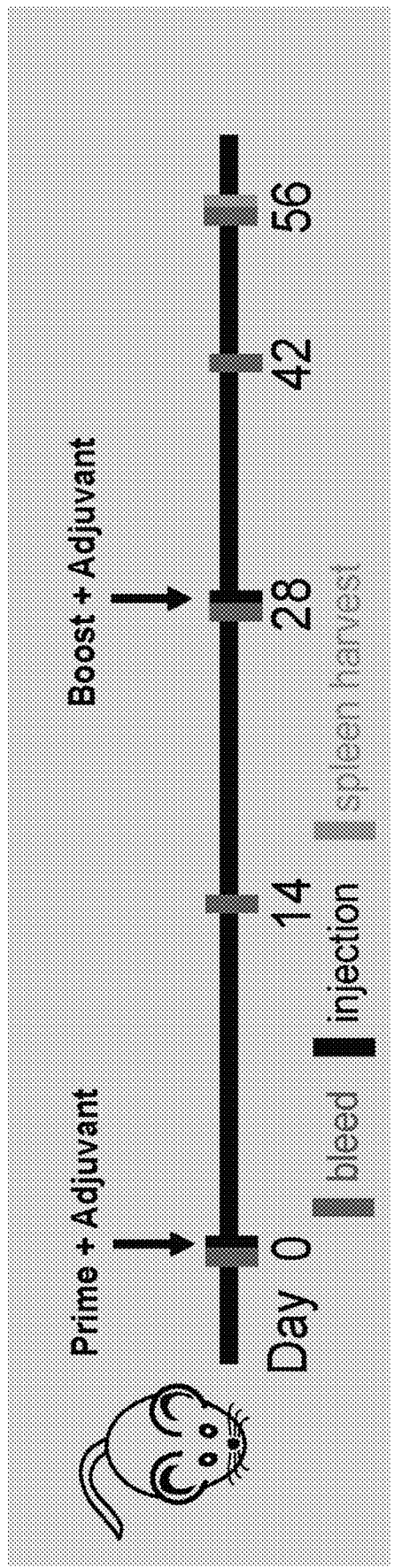
FIG. 3A-FIG. 3F depict non-limiting exemplary data showing RBD nanoparticles induce cross-reactive IgG responses in immunized mice. Red and gray rectangles below ELISA and neutralization data represent mismatched strains (red; RBD from that strain was not present on the immunized particle) or matched strains (gray; RBD was present on the immunized particle).
Figure 3B:
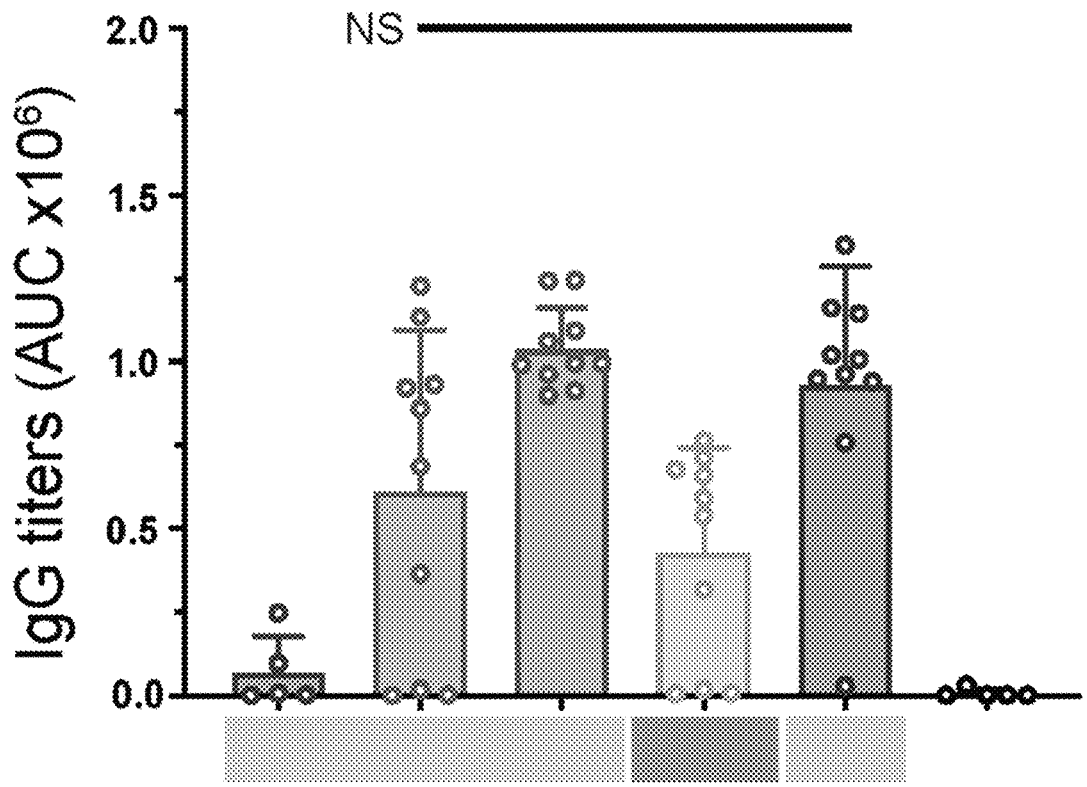
Figure 3B:
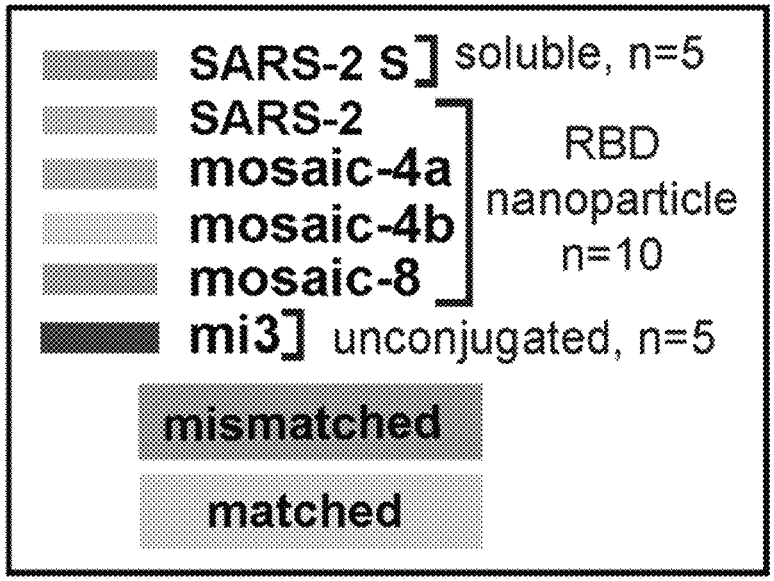
Figure 3C:
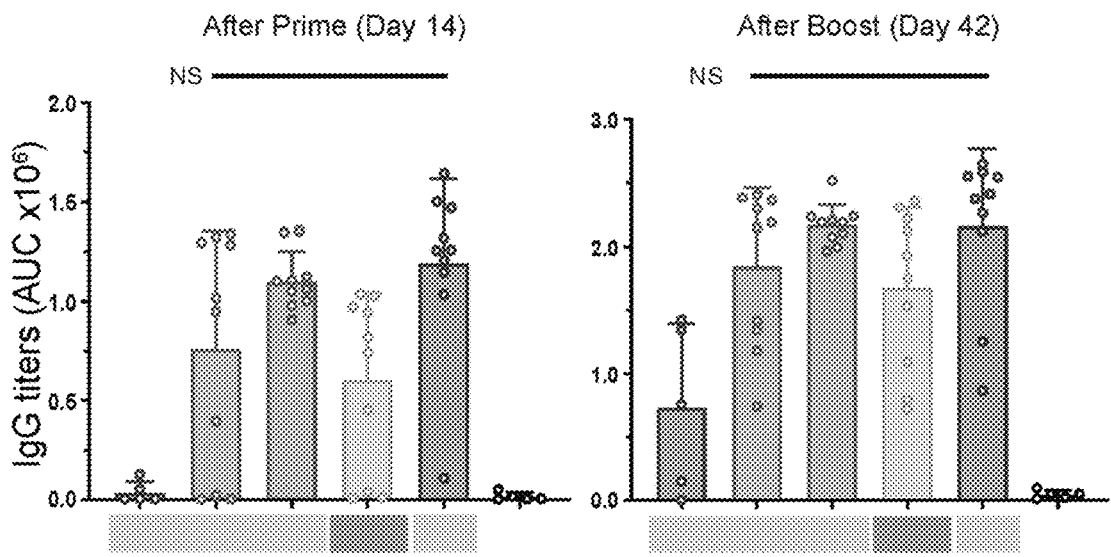
Figure 3C:
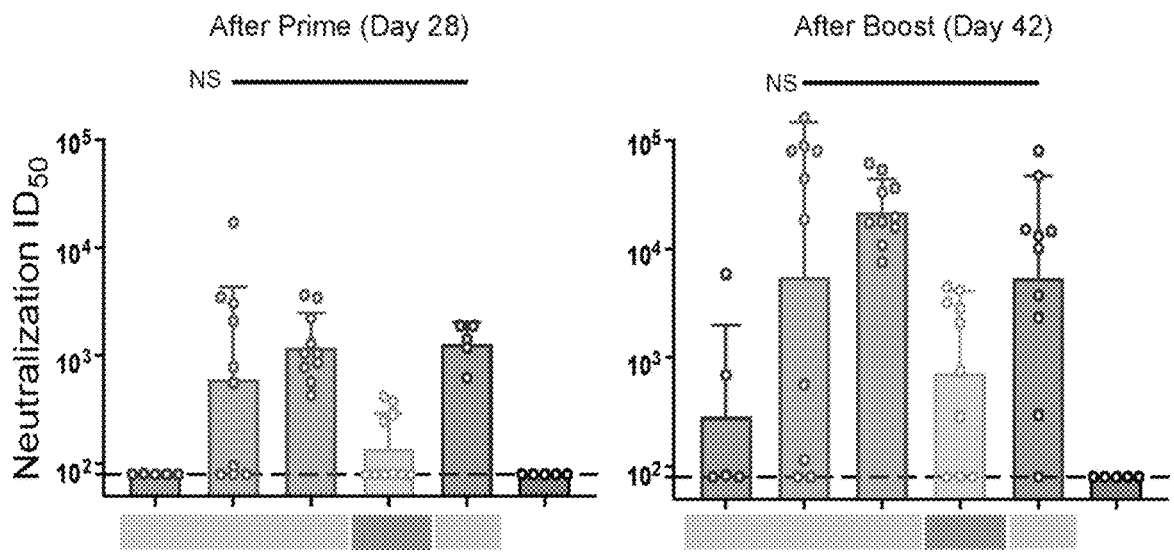
Figure 3C:
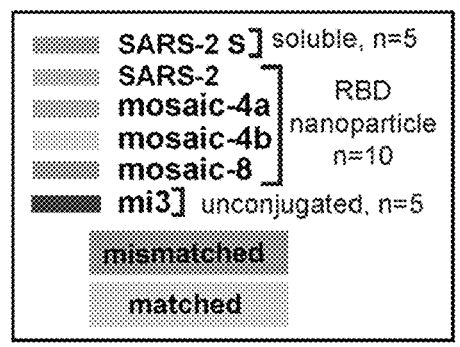
Figure 3D:
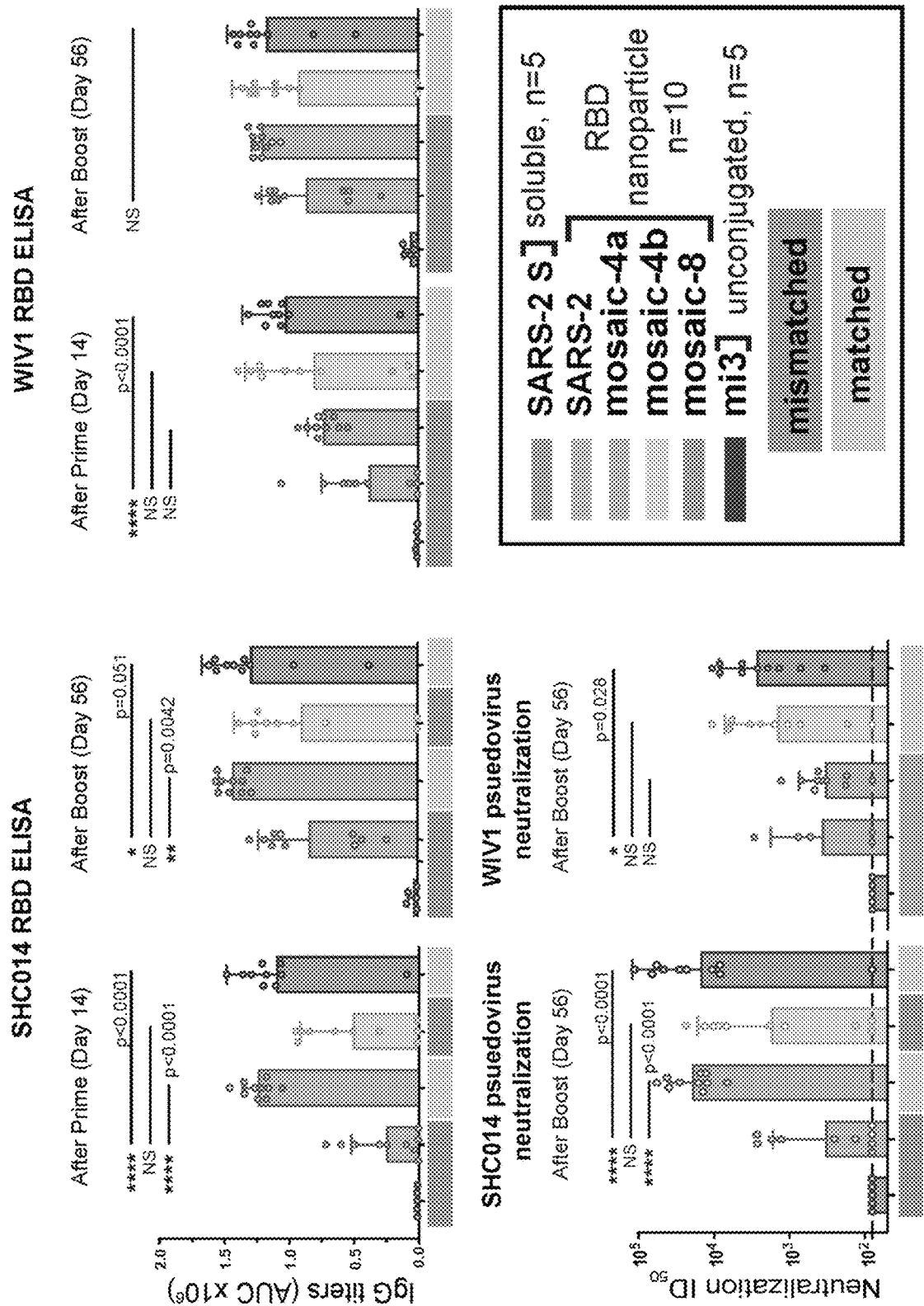
Figure 3E:
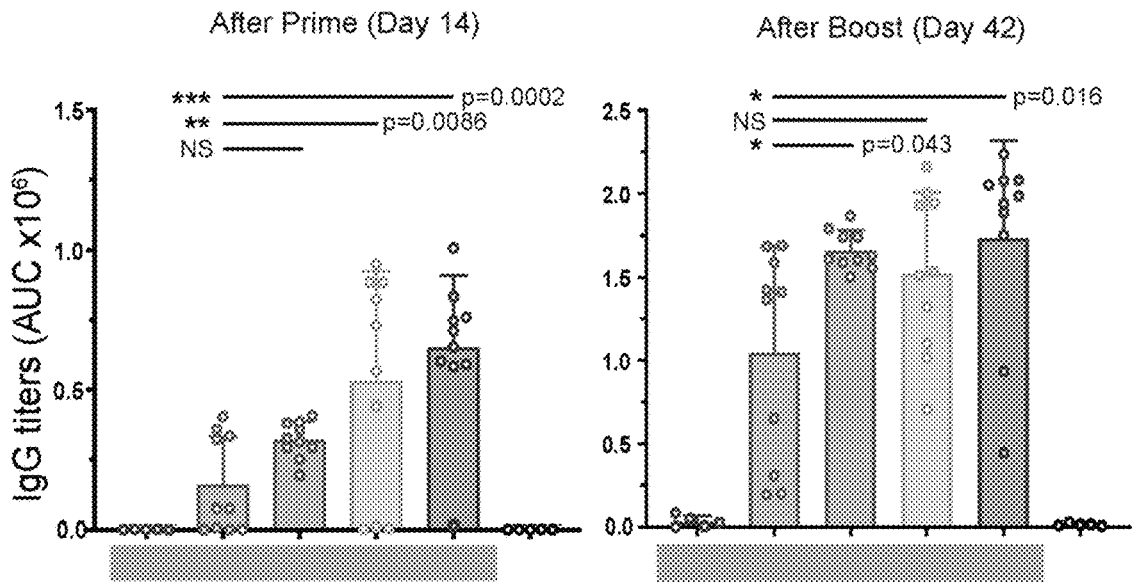
Figure 3E:
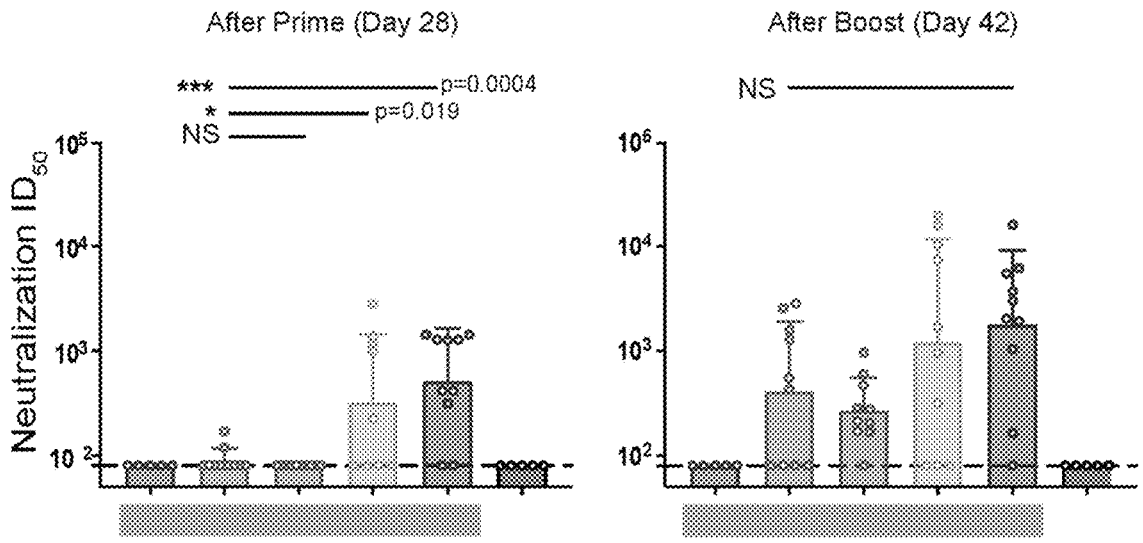
Figure 3E:
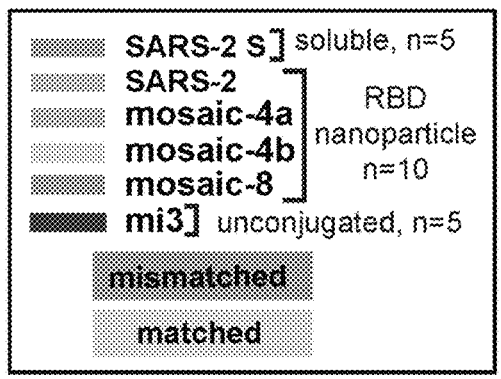
Figure 3F:
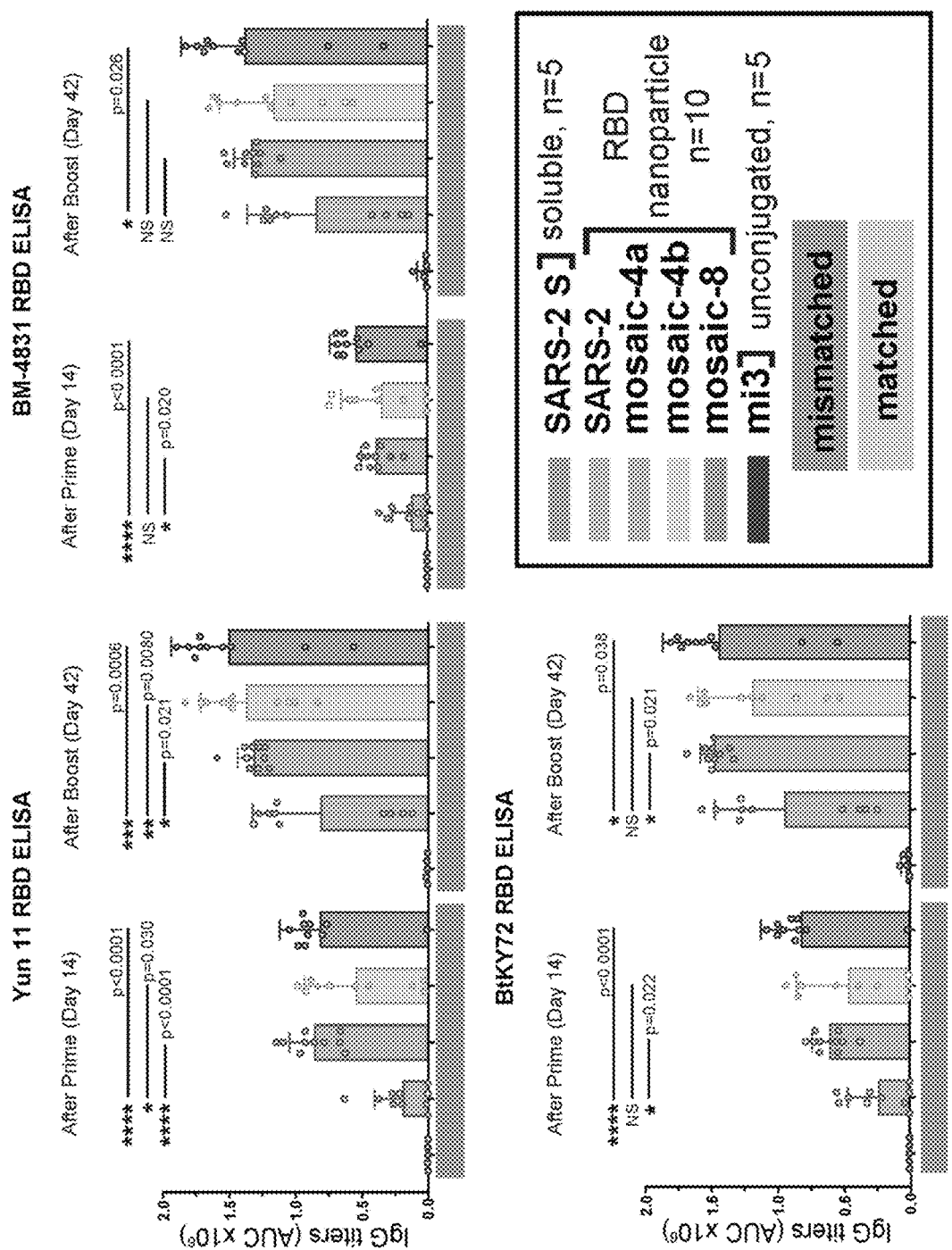
Figure 7A:
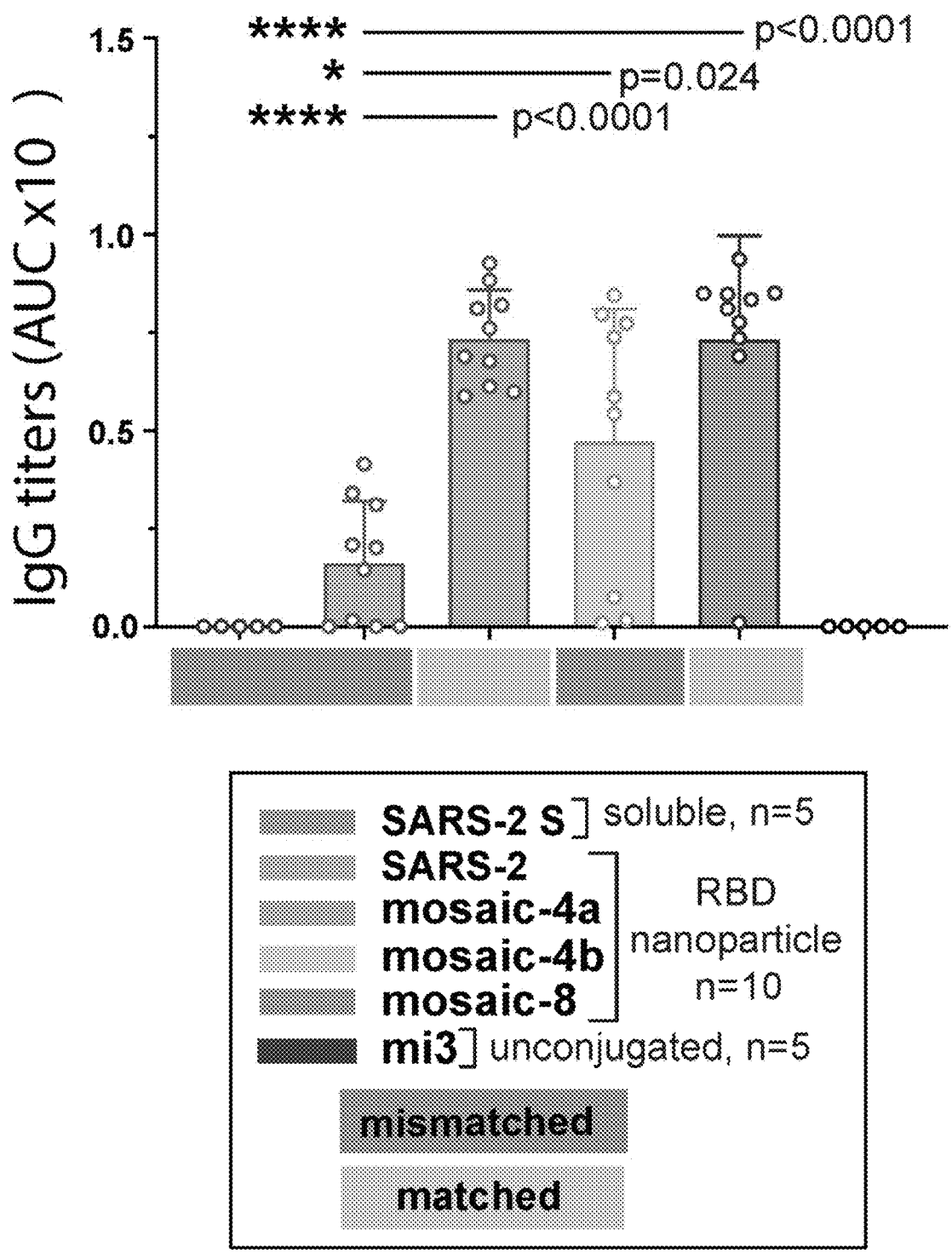
FIG. 7A-FIG. 7F show non-limiting exemplary data related to day 14 serum IgG responses to RBDs evaluated by ELISA shown as area under the curve (AUC) from mice immunized with soluble SARS-CoV-2 S trimers (SARS-2 S) or RBDs on nanoparticles (homotypic SARS-2, mosaic-4a, mosaic-4b, mosaic-8, or unconjugated SpyCatcher003-mi3 (mi3)). Each dot represents serum from one animal, with means and standard deviations represented by rectangles (mean) and horizontal lines (SD). RBDs from strains that were not present on an immunized particle or were present on an immunized particle are indicated by red and gray rectangles, respectively, below the ELISA data. Significant differences between groups linked by horizontal lines are indicated by asterisks and p-values. NS=not significant.

Mice immunized with soluble SARS-2 S trimer (brown bars) showed no binding or neutralization except for autologous responses against SARS-2 after boosting (FIG. 3C-FIG. 3F). By contrast, sera from RBD-nanoparticle-immunized animals (red, green, yellow, and blue bars) exhibited binding to all RBDs (FIG. 3C-FIG. 3F; FIG. 7A) and neutralization against all four strains after boosting (FIG. 3C-FIG. 3E), consistent with increased immunogenicities of multimerized antigen on nanoparticles versus soluble antigen. Homotypic SARS-2 nanoparticles, but not soluble SARS-2 trimer, induced heterologous responses to zoonotic RBDs and neutralization of heterologous *coronoviruses* (FIG. 3D-FIG. 3F). To address whether co-display of SARS-2 RBD along with other RBDs on mosaic-4a and mosaic-8 versus homotypic display of SARS-2 RBD (homotypic SARS-2) diminished anti-SARS-2 responses, SARS- 2-specific ELISA and neutralization titers for mosaic versus homotypic immunizations (FIG. 3C) were compared: there were no significant differences in IgG anti-SARS-2 titers for animals immunized with homotypic (red in FIG. 3C) versus mosaic nanoparticles (green and blue in FIG. 3C). Thus there was no advantage of immunization with a homotypic RBD-nanoparticle versus a mosaic-nanoparticle that included SARS-2 RBD in terms of the magnitude of immune responses against SARS-2.

Serum responses against matched RBDs (RBDs present on an injected nanoparticle; gray horizontal shading) versus mismatched RBDs (RBDs not present on injected nanoparticle; red horizontal shading) were compared next (FIG. 3A-FIG. 3F; FIG. 7A-FIG. 7F). Although SARS-2 RBD was not presented on mosaic-4b, antibody titers elicited by mosaic-4b immunization (yellow) were not significantly different than titers elicited by matched nanoparticle immunizations (homotypic SARS-2 (red), mosaic-4a (green), and mosaic-8 (blue)), and sera from boosted mosaic-4b-immunized mice neutralized SARS-2 pseudovirus (FIG. 3C). In other matched versus mismatched comparisons, sera showed binding and neutralization of SHC014 and WIV1 regardless of whether these RBDs were included on the injected nanoparticle (FIG. 3D), underscoring sharing of common epitopes among RBDs (FIG. 1A).

Figure 7B:
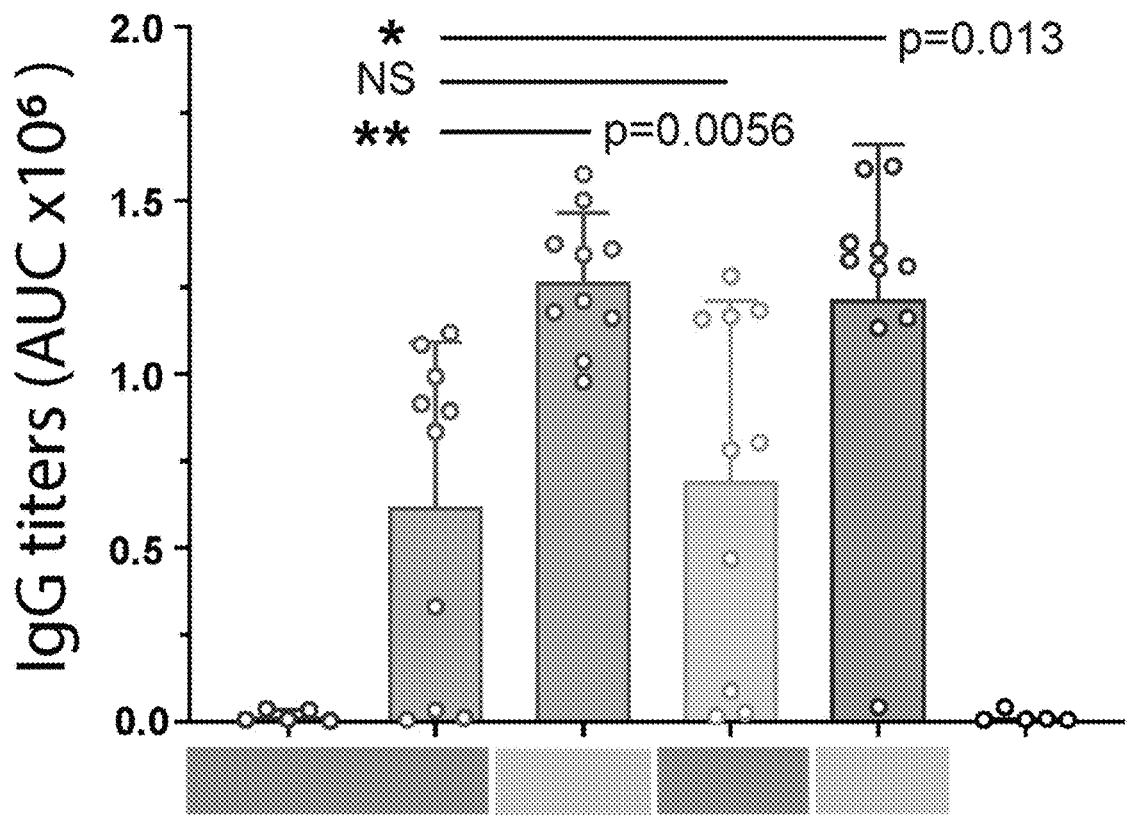
Figure 7B:
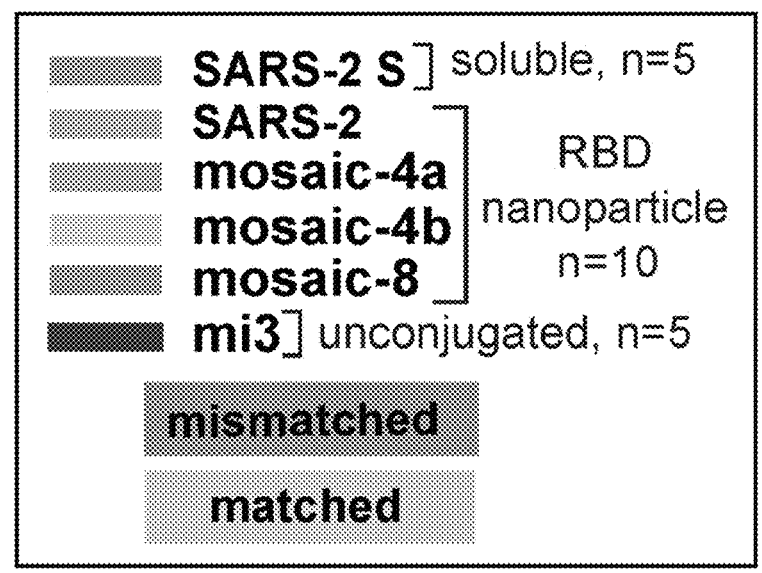
Figure 7C:
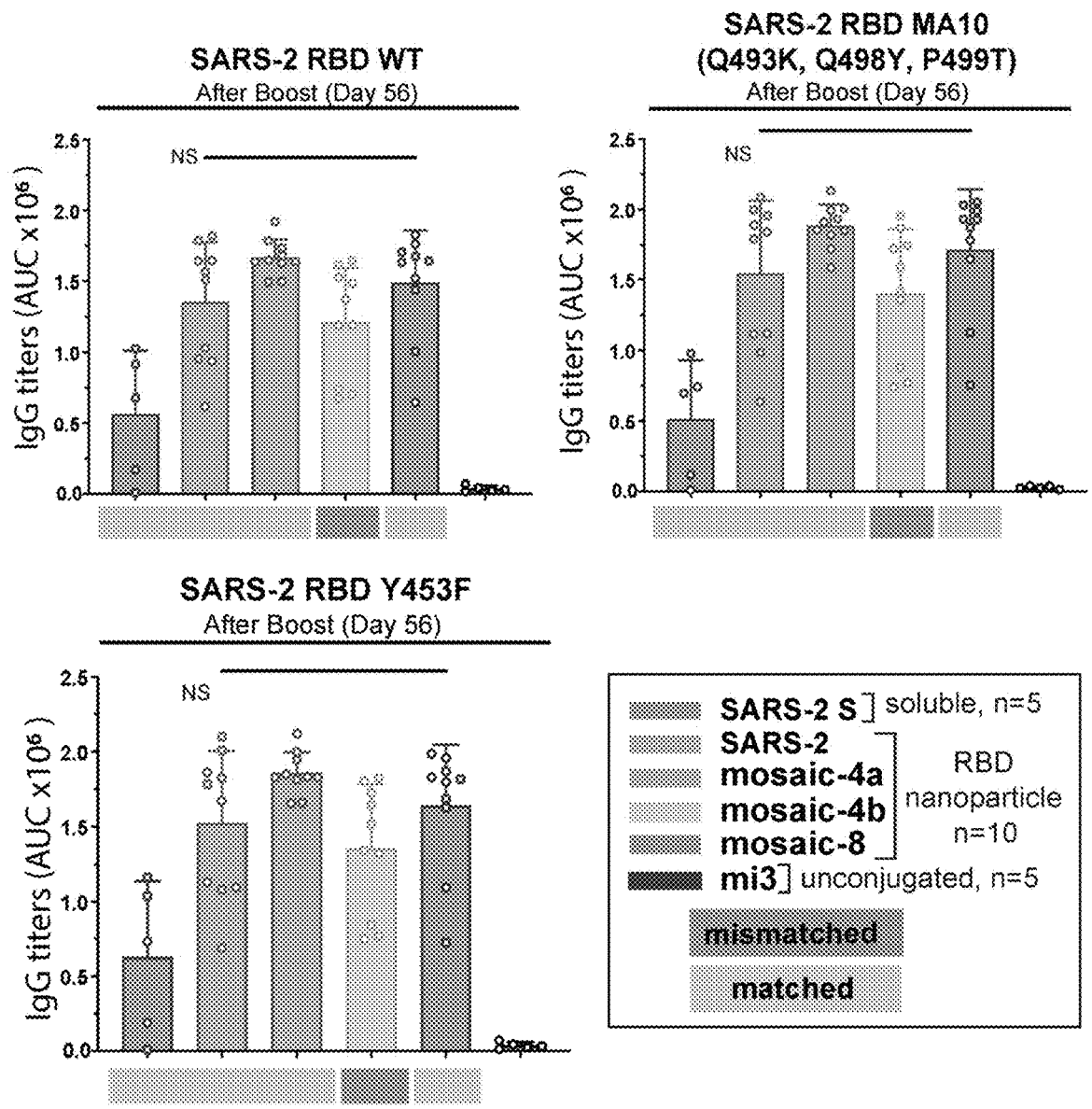
Figure 7D:
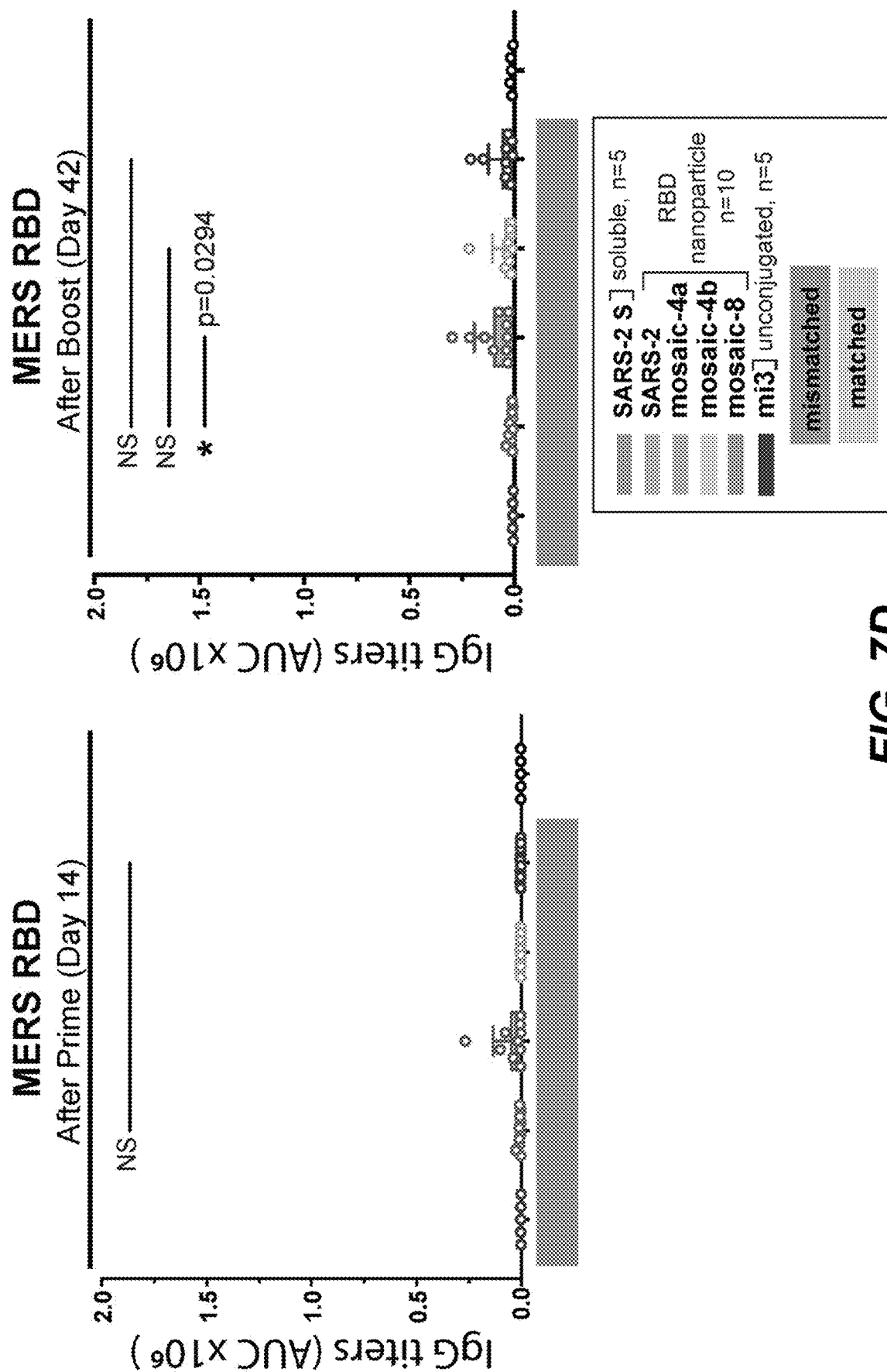

Demonstrating advantages of mosaic versus homotypic SARS-2 nanoparticles, sera from mosaic-8-immunized mice bound SHC014 and WIV1 RBDs significantly better after the prime than sera from homotypic SARS-2-immunized mice and retained better binding to SHC014 RBD after boosting (FIG. 3D). Thus the potential increased avidity of the homotypic SARS-2 nanoparticle displaying only one type of RBD over the mosaic-8 nanoparticles did not confer increased breadth. Moreover, mosaic-8-immunized and boosted sera were 7-44-fold more potent than sera from homotypic SARS-2-immunized animals in neutralizing SHC014 and WIV1 (FIG. 3D). Neutralization of the SHC014 and WIV1 pseudoviruses by mosaic-8 sera suggests that combining RBDs on a mosaic nanoparticle does not diminish the immune response against a particular RBD, also suggested by ELISA binding of sera to Rs4081 and RaTG13 (FIG. 7A-FIG. 7B).

Figure 1D:
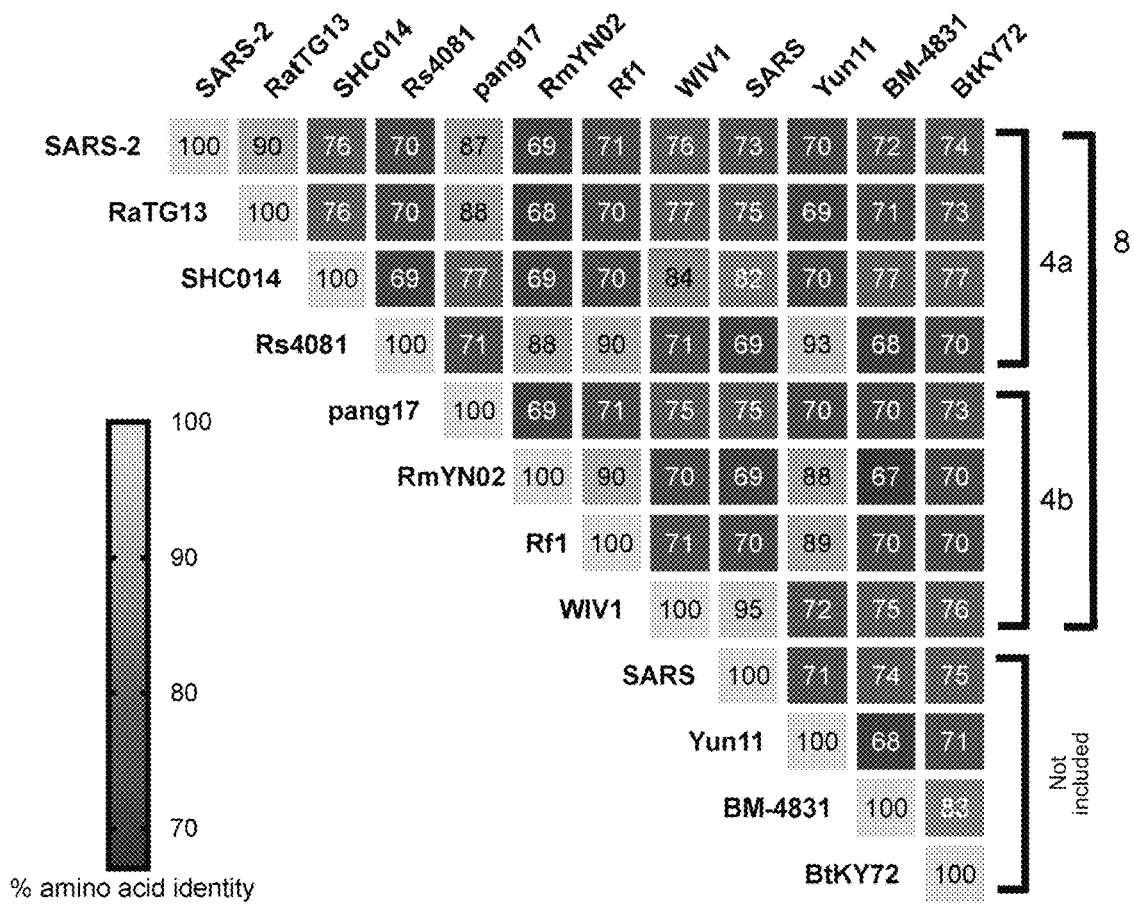

To further address whether RBD-nanoparticles elicited antibodies that recognized totally mismatched strains and SARS-CoV-2 RBD mutants, sera were evaluated for binding to SARS, Yun11, BM-4831, and BtKY72 RBDs (FIG. 3E-FIG. 3F), SARS-2 RBD mutants (FIG. 7C), MERS-CoV RBD (FIG. 7D), and for neutralization in SARS pseudovirus assays (FIG. 3E). No reductions in SARS-2 RBD binding were found as a result of mutations (Y453F, the "Danish mink variant" or a Q493K/Q498Y/P499T triple mutant) (FIG. 7C), no binding of any elicited sera to MERS-CoV RBD (FIG. 7D), and higher and more cross-reactive antibody responses for mosaic immunizations compared with homotypic SARS-2 immunizations: e.g., mosaic-8-primed and boosted animals showed significantly higher titers against SARS RBD than sera from homotypic SARS-2-immunized mice (FIG. 3E). After the prime, sera from the homotypic SARS-2-immunized animals did not neutralize SARS, whereas the mosaic-4b and mosaic-8 sera were neutralizing (FIG. 3E), perhaps facilitated by these nanoparticles including WIV1 RBD, which is related by 95% amino acid identity to SARS RBD (FIG. 1D). After boosting, SARS-2 and mosaic-4a sera were also neutralizing, although titers were ~4-fold lower than for mosaic-8-immunized animals (FIG. 3E). ELISA titers against other mismatched RBDs (Yun11, BM-4831, BtKY72) were significantly higher for sera collected after mosaic-8 priming compared to sera from homotypic SARS-2 priming, and heightened binding was retained after boosting (FIG. 3F). Thus mosaic nanoparticles, particularly mosaic-8, induce higher antibody titers against mismatched RBDs than homotypic SARS-2 nanoparticles, again favoring the co-display approach for inducing broader anti-*coronavirus* responses, especially after a single prime.

Figure 9A:
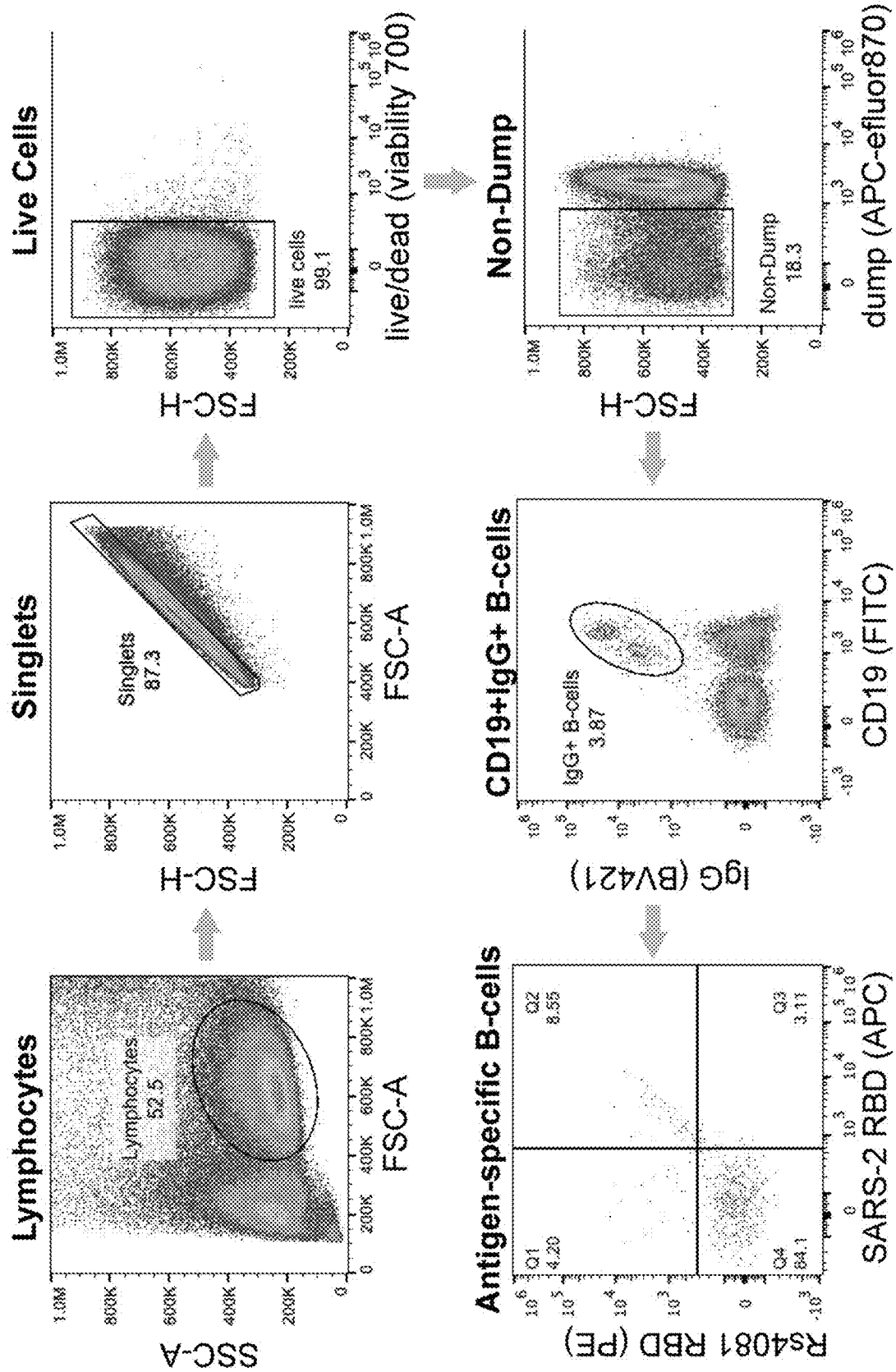
FIG. 9A-FIG. 9E depict non-limiting exemplary data related to antigen-specific IgG$^+$ B-cell analysis of splenocytes isolated from animals immunized with mosaic-RBD nanoparticles.
Figure 9B:
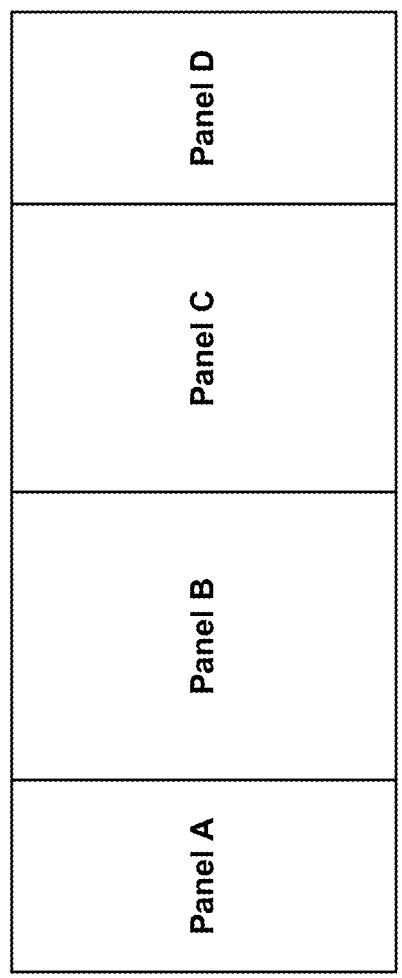
Figure 9C:
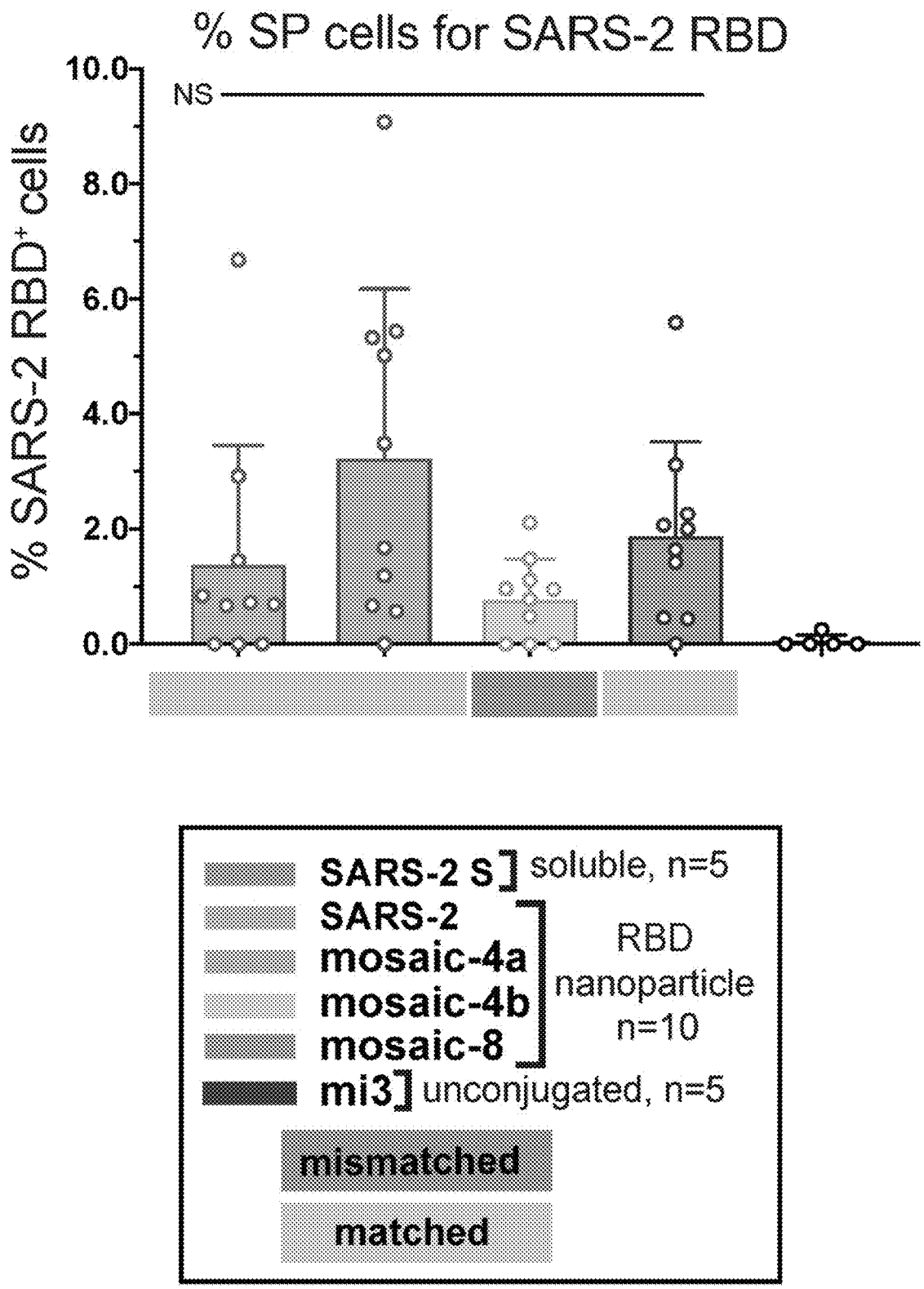
Figure 9D:
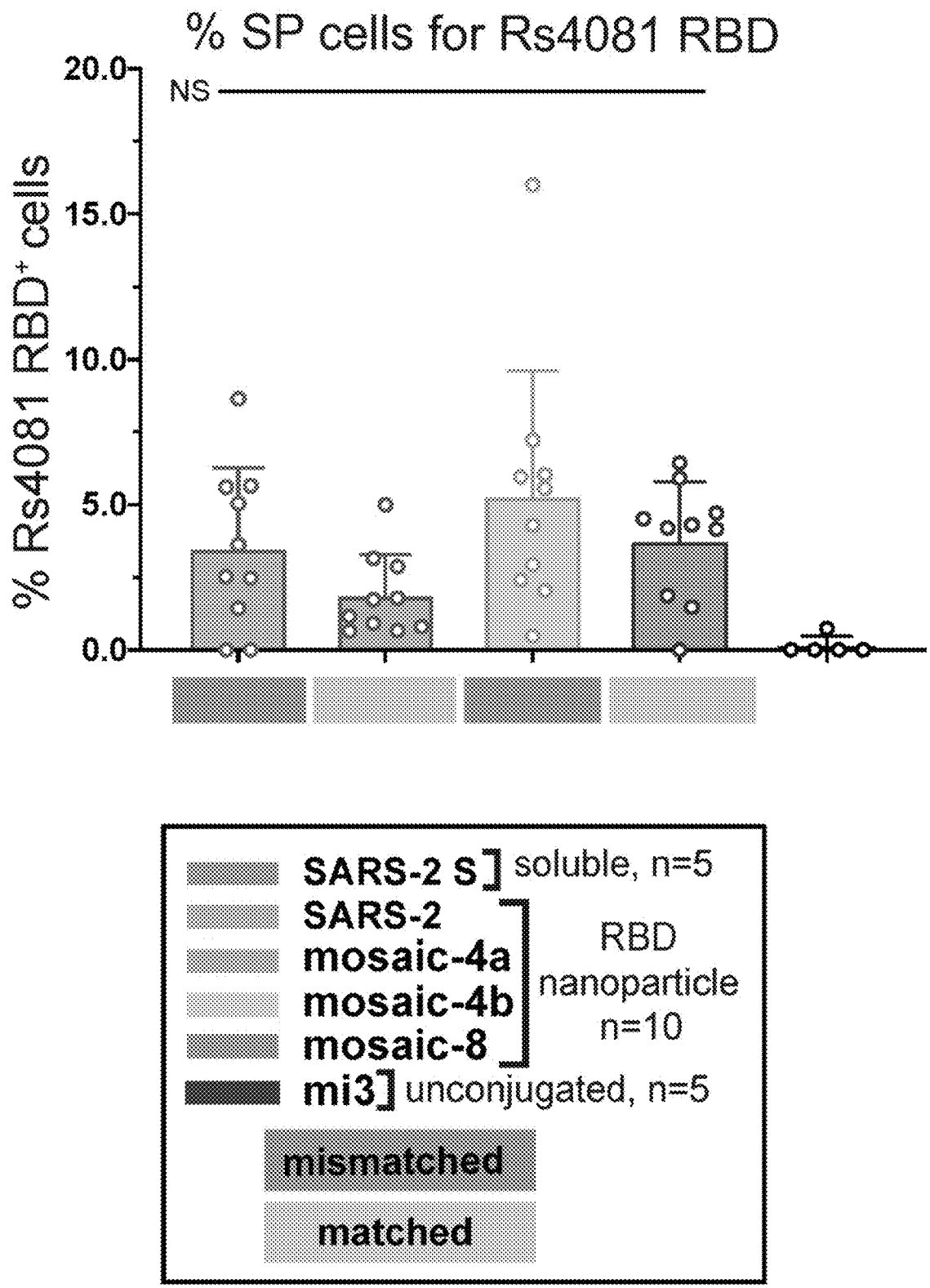
Figure 9E:
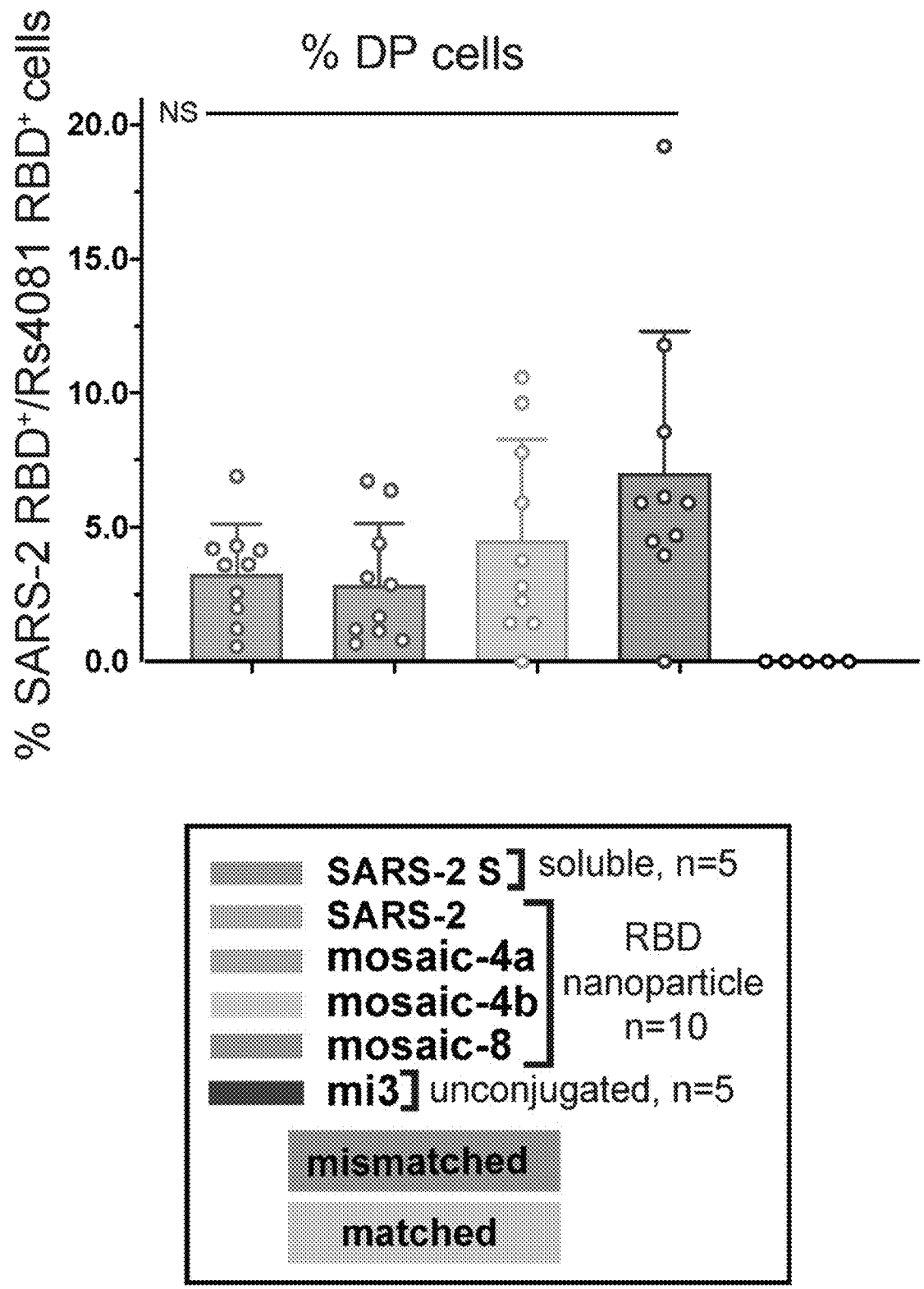

The potential for cross-reactive recognition was investigated using flow cytometry to ask whether B-cell receptors on IgG+ splenic B-cells from RBD-nanoparticle-boosted animals could simultaneously recognize RBDs from SARS-2 and Rs4081 (related by 70% sequence identity) (FIG. 1D; FIG. 9A-FIG. 9E). Whereas control animals were negative, all other groups showed B-cells that recognized SARS-2 and Rs4081 RBDs simultaneously, suggesting the existence of antibodies that cross-react with both RBDs (FIG. 9E).

Figure 4A:
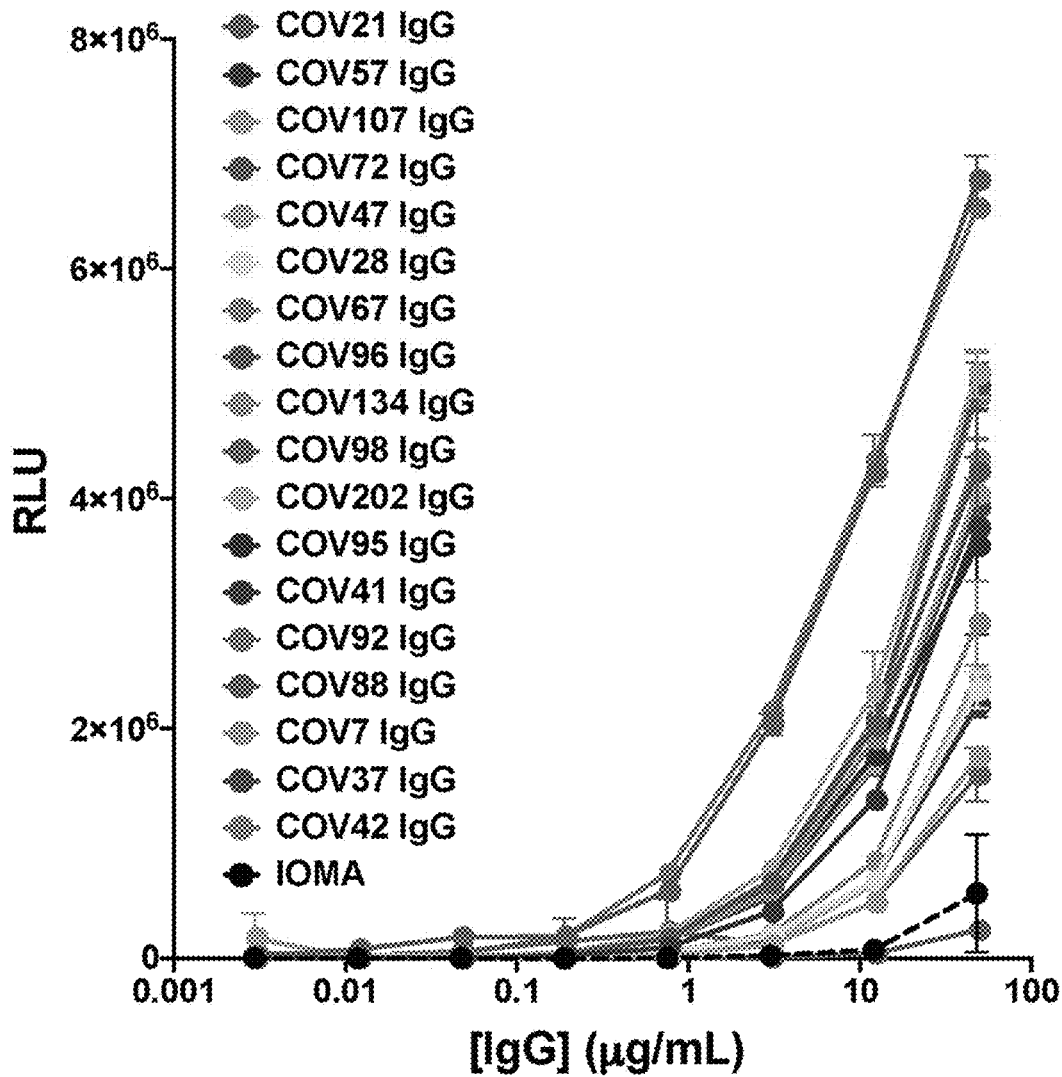
Figure 4B:
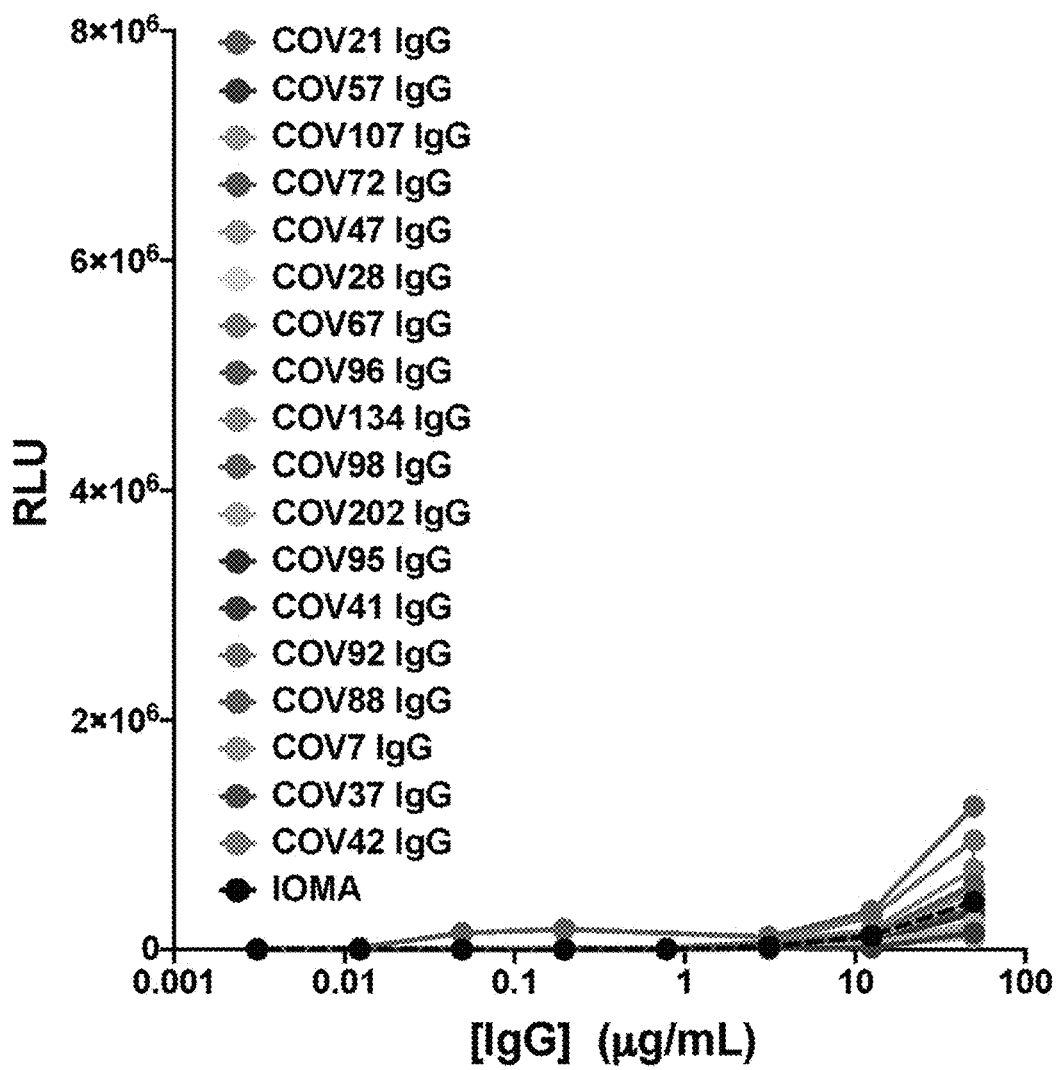
Figure 4C:
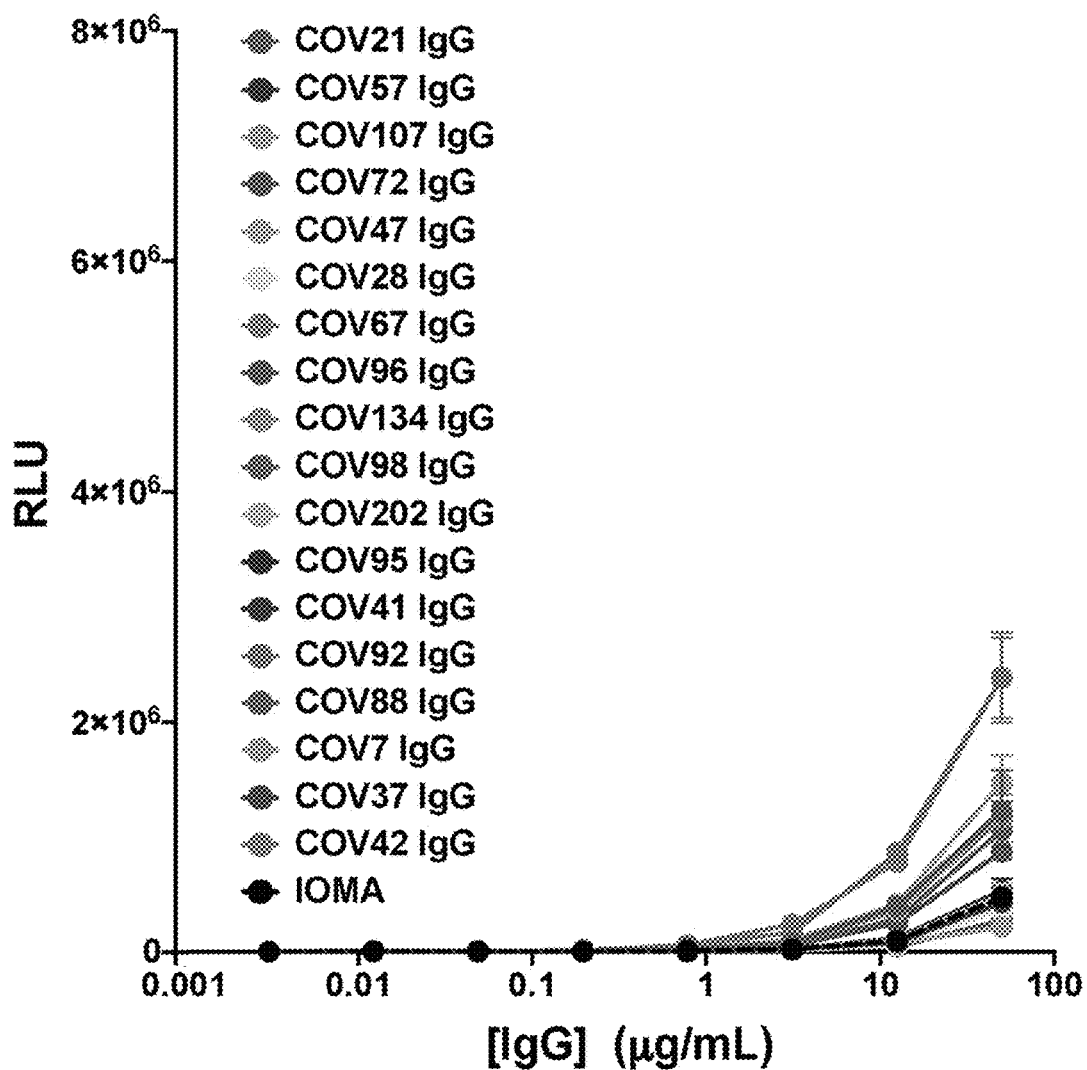
Figure 4D:
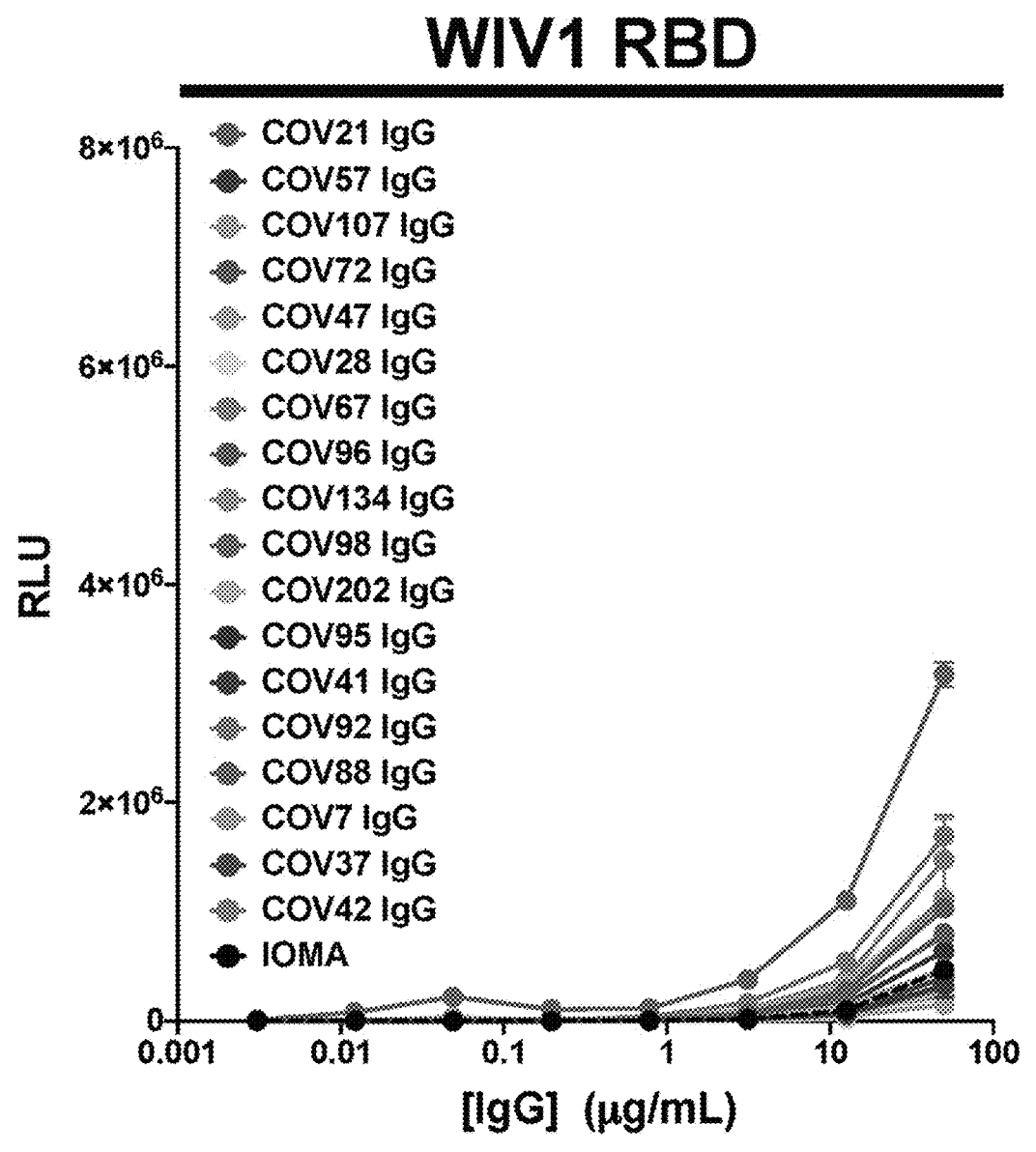
Figure 4E:
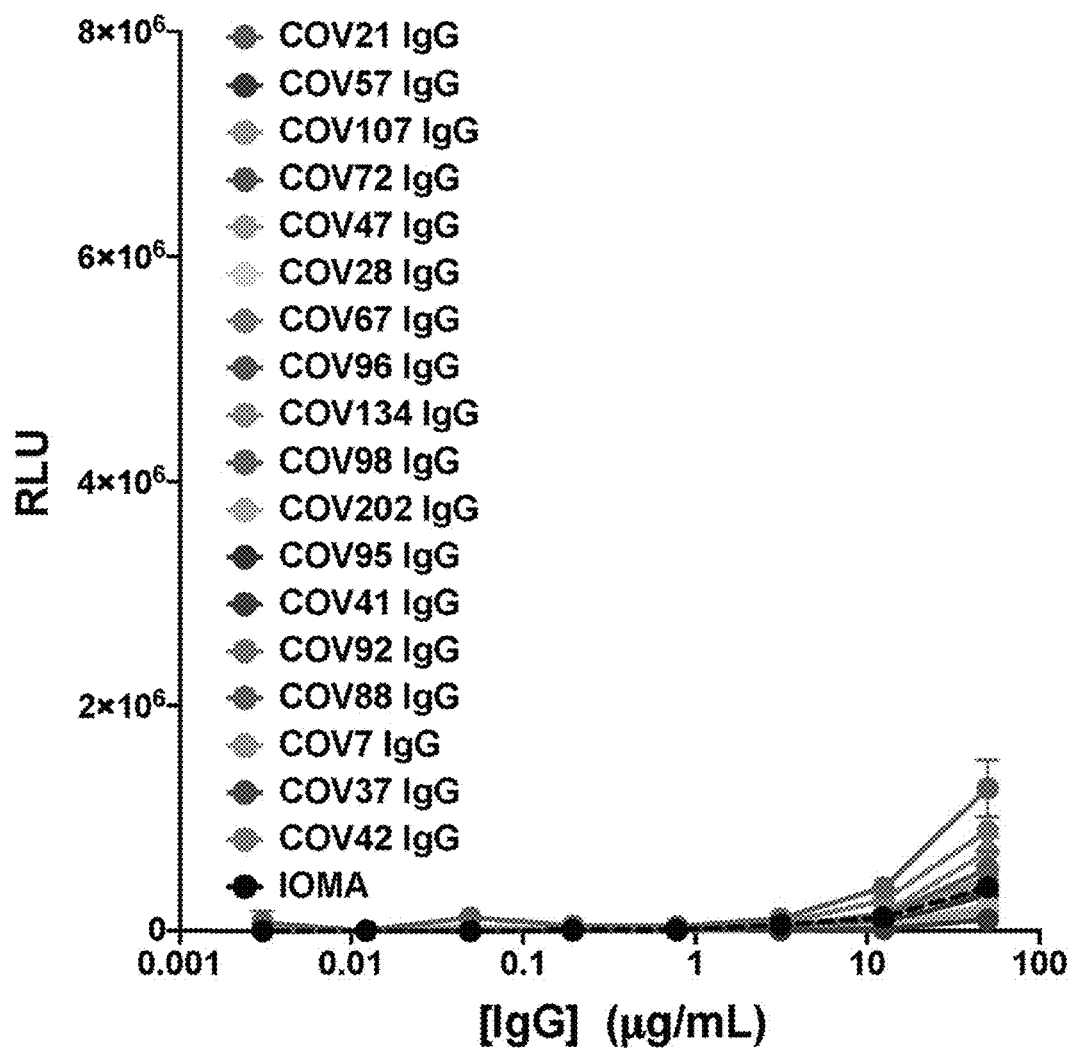
Figure 4F:
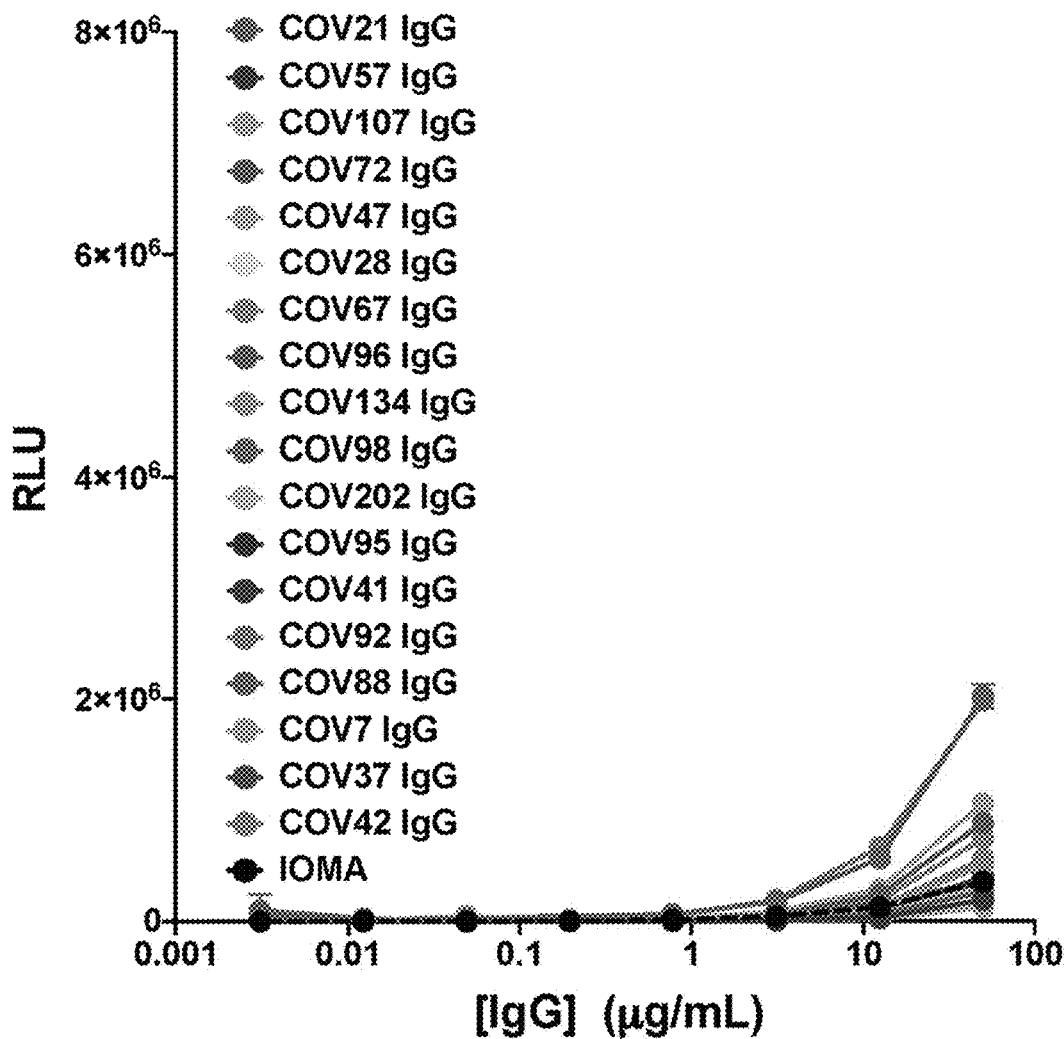
Figure 4G:
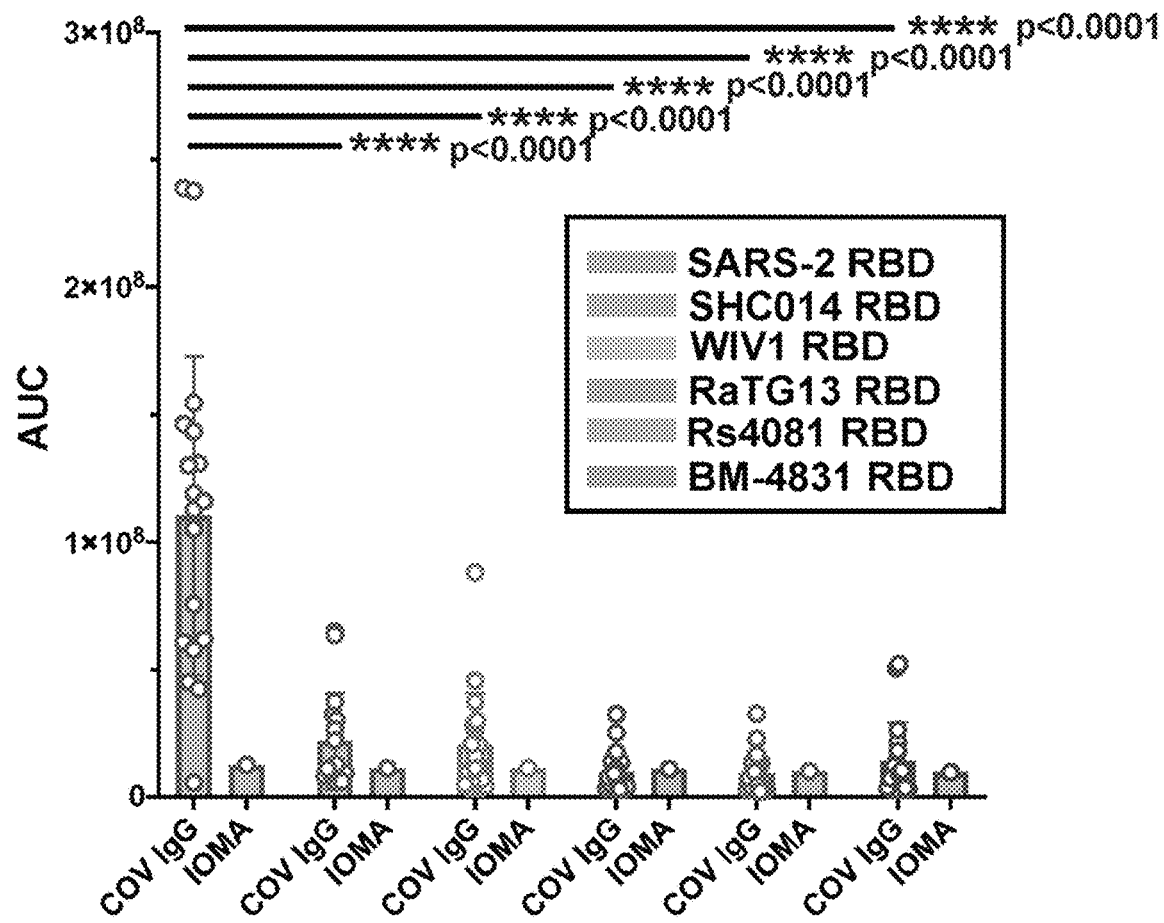

To compare antibodies elicited by RBD-nanoparticle immunization to antibodies elicited by SARS-CoV-2 infection, ELISAs against the RBD panel were repeated using IgGs from COVID-19 plasma donors (FIG. 4A-FIG. 4H). Most of the convalescent plasmas showed detectable binding to SARS-2 RBD (FIG. 4A). However, binding to other *Sarbecovirus* RBDs (RaTG13, SHC014, WIV1, Rs4081 and BM-4831) was significantly weaker than binding to SARS 2 RBD, with many human plasma IgGs showing no binding above background (FIG. 4B-FIG. 4G). In addition, although convalescent plasma IgGs neutralized SARS-CoV-2 pseudoviruses, they showed weak or no neutralization of SARS, SHC014, or WIV1 pseudoviruses (FIG. 4H). These results are consistent with little to no cross-reactive recognition of RBDs from zoonotic *coronavirus* strains resulting from SARS-CoV-2 infection in humans.

In conclusion, multimerization of RBDs on nanoparticles enhances immunogenicity compared with soluble antigen and homotypic SARS-2 nanoparticle immunization produced IgG responses that bound zoonotic RBDs and neutralized heterologous *coronoviruses* after boosting. By contrast, soluble SARS-2 S immunization and natural infection with SARS-CoV-2 resulted in weak or no heterologous responses in plasmas. Co-display of SARS-2 RBD along with diverse RBDs on mosaic nanoparticles showed no disadvantages for eliciting neutralizing antibodies against SARS-CoV-2 compared with homotypic SARS-2 nanoparticles, suggesting mosaic nanoparticles as a candidate vaccine to protect against COVID-19. Furthermore, compared with homotypic SARS-2 RBD particles, the mosaic co-display strategy demonstrated advantages for eliciting neutralizing antibodies against zoonotic *Sarbecoviruses*, thus potentially also providing protection against emerging *coronoviruses* with human spillover potential. Neutralization of matched and mismatched strains was observed after mosaic priming, suggesting a single injection of a mosaic-RBD nanoparticle might be sufficient in a vaccine. Since COVID-19 convalescent plasmas showed little to no recognition of *coronavirus* RBDs other than SARS-CoV-2, COVD-19-induced immunity in humans may not protect against another emergent *coronavirus*. Embodiments of the mosaic nanoparticles described herein could be used to present RBDs from newly-discovered zoonotic *coronaviruses*.

Example 2

Exemplary Materials and Methods

The following exemplary materials and methods are used in the preparation and practice of the embodiments disclosed herein.

Phylogenetic tree. A sequence alignment of *coronavirus* RBD domains was made using Clustal Omega. A phylogenetic tree was calculated from this amino acid alignment using PhyML 3.0, and a figure of this tree was made using PRESTO (http://www.atgc-montpellier.fr/presto/).

Expression of RBD and S proteins. Mammalian expression vectors encoding the RBDs of SARS-CoV-2 (GenBank MN985325.1; S protein residues 319-537; SEQ ID NO: 1) and SARS-CoV S (GenBank AAP13441.1; residues 318-510; SEQ ID NO: 9) with an N-terminal human IL-2 or Mu phosphatase signal peptide were previously described. Expression vectors were constructed similarly for RBDs from the following other *Sarbecovirus* strains: RaTG13-CoV (GenBank QHR63300; S protein residues 319-541; SEQ ID NO: 2), SHC014-CoV (GenBank KC881005; residues 307-524; SEQ ID NO: 3), Rs4081-CoV (GenBank KY417143; S protein residues 310-513; SEQ ID NO: 4), pangolin17-CoV (GenBank QIA48632; residues 317-539; SEQ ID NO: 5), RmYN02-CoV (GSAID EPI_ISL 412977; residues 298-501; SEQ ID NO: 6), Rf1-CoV (GenBank DQ412042; residues 310-513; SEQ ID NO: 7), WIV1-CoV (GenBank KF367457; residues 307-528; SEQ ID NO: 8), Yun11-CoV (GenBank JX993988; residues 310-513; SEQ ID NO: 10), BM-4831-CoV (GenBank NC014470; residues 310-528; SEQ ID NO: 11), BtKY72-CoV (GenBank KY352407; residues 309-530; SEQ ID NO: 12). Two versions of each RBD expression vector were made: one including a C-terminal hexahistidine tag (G-HHHHHH, SEQ ID NO: 13) and SpyTag003 (RGVPHIVMV-DAYKRYK, SEQ ID NO: 14) (for coupling to Spy-Catcher003-mi3) and one with only a hexahistidine tag (for ELISAs). Biotinylated SARS-CoV-2 and Rs4081 RBDs were produced by co-transfection of Avi/His-tagged RBD expression plasmids with an expression plasmid encoding an ER-directed BirA enzyme (kind gift of Michael Anaya, Caltech). RBD proteins were purified from transiently-transfected Expi293F cell (Gibco) supernatants by nickel affinity and size-exclusion chromatography. Peak fractions corresponding to RBDs were identified by SDS-PAGE and then pooled and stored at 4° C. A trimeric SARS-CoV-2 ectodomain with 6P stabilizing mutations was expressed and purified as described. Correct folding of the soluble SARS-CoV-2 S trimer was verified by a 3.3 Å cryo-EM structure of a neutralizing antibody complexed with the trimer preparation used for immunizations. To prepare fluorochrome-conjugated streptavidin-tetramerized RBDs, biotinylated SARS-2 and Rs4081 RBDs were incubated with streptavidin-APC (eBioscience™) and streptavidin-PE (ThermoFisher), respectively, overnight at 4° C. at a 1:1 molar ratio of RBD to streptavidin subunit.

Preparation of human plasma IgGs. Plasma samples collected from COVID-19 convalescent and healthy donors are described in Robbiani et al., Nature 584, 437-442 (2020). Human IgGs were isolated from heat-inactivated plasma samples using 5-mL HiTrap MabSelect SuRe columns (GE Healthcare Life Sciences) as described.

Preparation of RBD-mi3 nanoparticles. SpyCatcher003-mi3 particles were prepared by purification from BL21 (DE3)-RIPL *E coli* (Agilent) transformed with a pET28a SpyCatcher003-mi3 gene (including an N-terminal 6x-His tag) as described in Cohen AA et al, 2021, PLoS ONE 16(3): e0247963. Briefly, cell pellets from transformed bacteria were lysed with a cell disruptor in the presence of 2.0 mM PMSF (Sigma). Lysates were spun at 21,000×g for 30 min, filtered with a 0.2 µm filter, and mi3 particles were isolated by Ni-NTA chromatography using a pre-packed HisTrap™ HP column (GE Healthcare). Eluted particles were concentrated using an Amicon Ultra 15 mL 30K concentrator (MilliporeSigma) and purified by SEC using a HiLoad® 16/600 Superdex® 200 (GE Healthcare) column equilibrated with 25 mM Tris-HCl pH 8.0, 150 mM NaCl, 0.02% $NaN_3$ (TBS). SpyCatcher-mi3 particles were stored at 4° C. and used for conjugations for up to 1 month after filtering with a 0.2 µm filter or spinning at 21,000×g for 10 min.

Purified SpyCatcher003-mi3 was incubated with a 3-fold molar excess (RBD to mi3 subunit) of purified SpyTagged RBD (either a single RBD for making homotypic SARS-CoV-2 RBD particles or an equimolar mixture of four or eight RBDs for making mosaic particles) overnight at room temperature in TBS. Conjugated mi3 particles were separated from free RBDs by SEC on a Superose 6 10/300 column (GE Healthcare) equilibrated with PBS (20 mM sodium phosphate pH 7.5, 150 mM NaCl). Fractions corresponding to conjugated mi3 particles were collected and analyzed by SDS-PAGE. Concentrations of conjugated mi3 particles were determined using a Bio-Rad Protein Assay.

Immunizations. Animal procedures and experiments were performed according to protocols approved by the IACUC. Experiments were done using 4-6 week old female Balb/c mice (Charles River Laboratories), with 5 animals each for cohorts immunized with soluble SARS-CoV-2 S or SpyCatcher003-mi3, and 10 animals each for remaining cohorts (FIG. 3A). Immunizations were carried out with intraperitoneal (ip) injections of either 5 µg of conjugated RBD (calculated as the mass of the RBD, assuming 100% efficiency of conjugation to SpyCatcher003-mi3), 5 µg of soluble SARS-CoV-2 S, or 6 µg of unconjugated SpyCatcher003-mi3, in 100 µL of 50% v/v AddaVax™ adjuvant (Invivogen). Animals were boosted 4 weeks after the prime with the same quantity of antigen in adjuvant. Animals were bled every 2 weeks via tail veins, and then euthanized 8 weeks after the prime (Day 56, 57) and bled through cardiac puncture. Blood samples were allowed to clot at room temperature in MiniCollect® Serum and Plasma Tubes (Greiner), and serum was harvested, preserved in liquid nitrogen, and stored at −80° C. until use.

Sera for ELISAs were collected at Day 14 (Prime) and Day 42 (Boost). Sera for neutralization assays were collected at Day 28 (Prime) and Day 56 (Boost) (FIG. 3A-FIG. 3F, FIG. 7A-FIG. 7F).

Figure 7E:
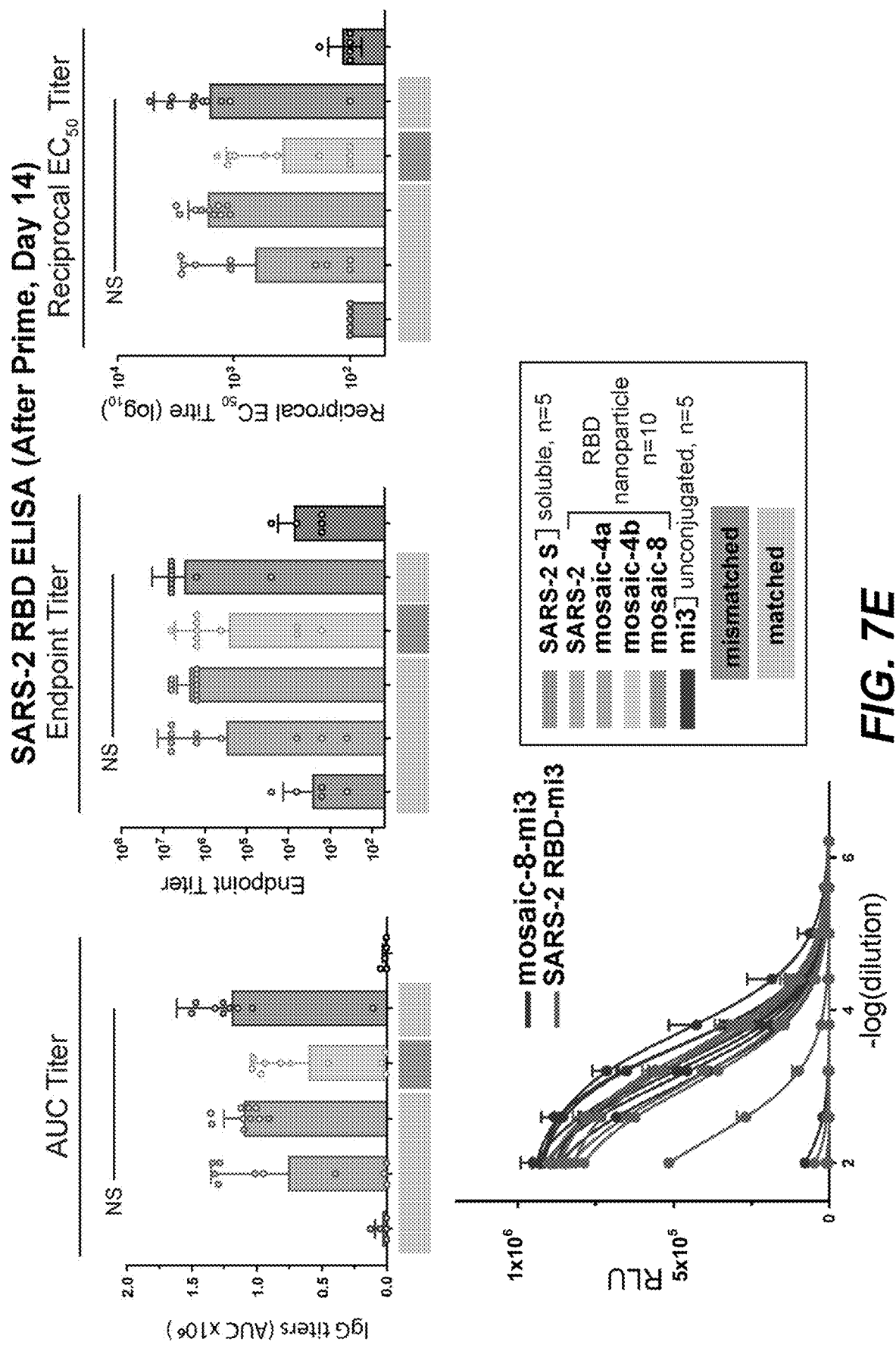
Figure 7F:
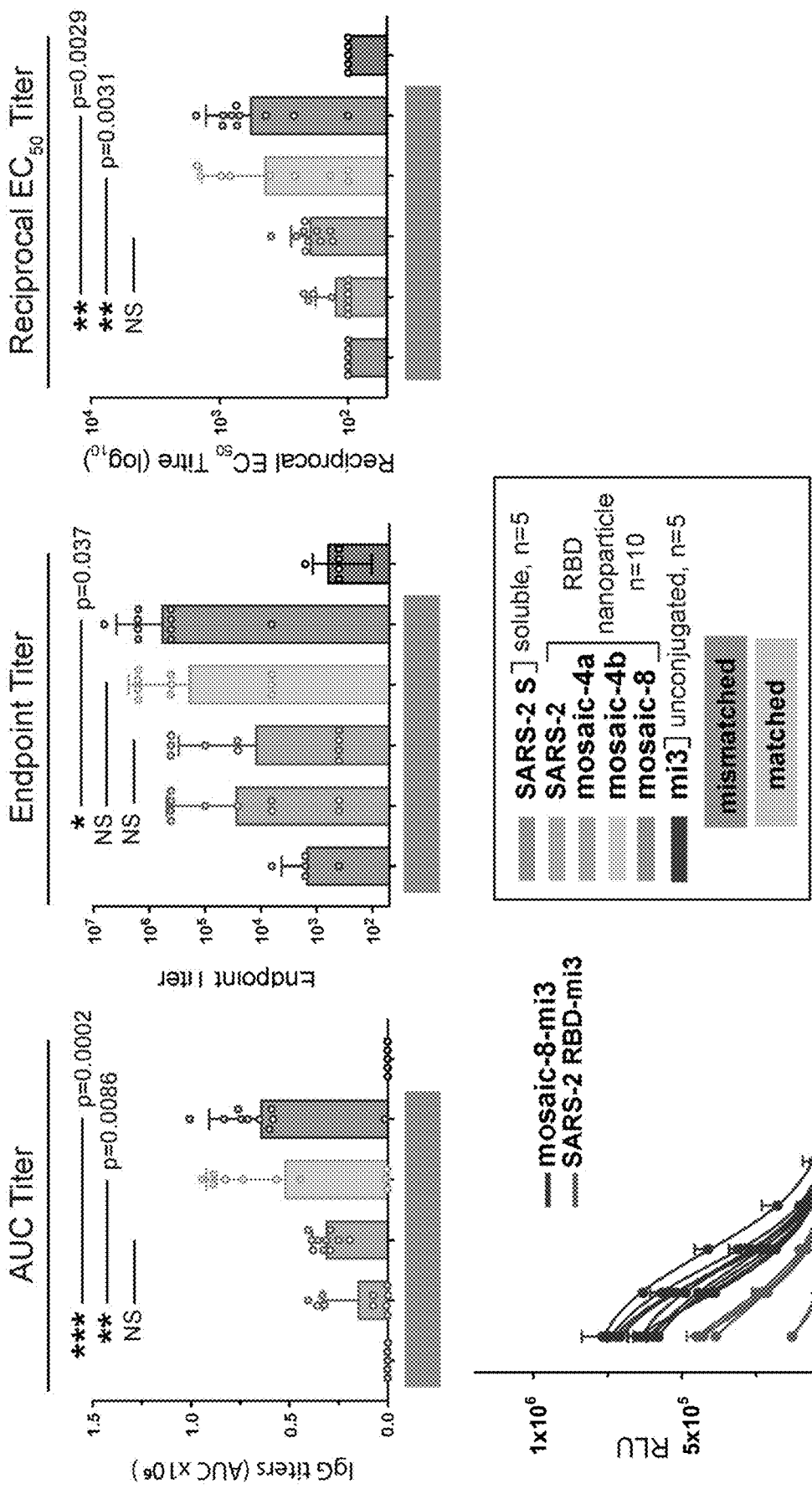
Figure 8A:
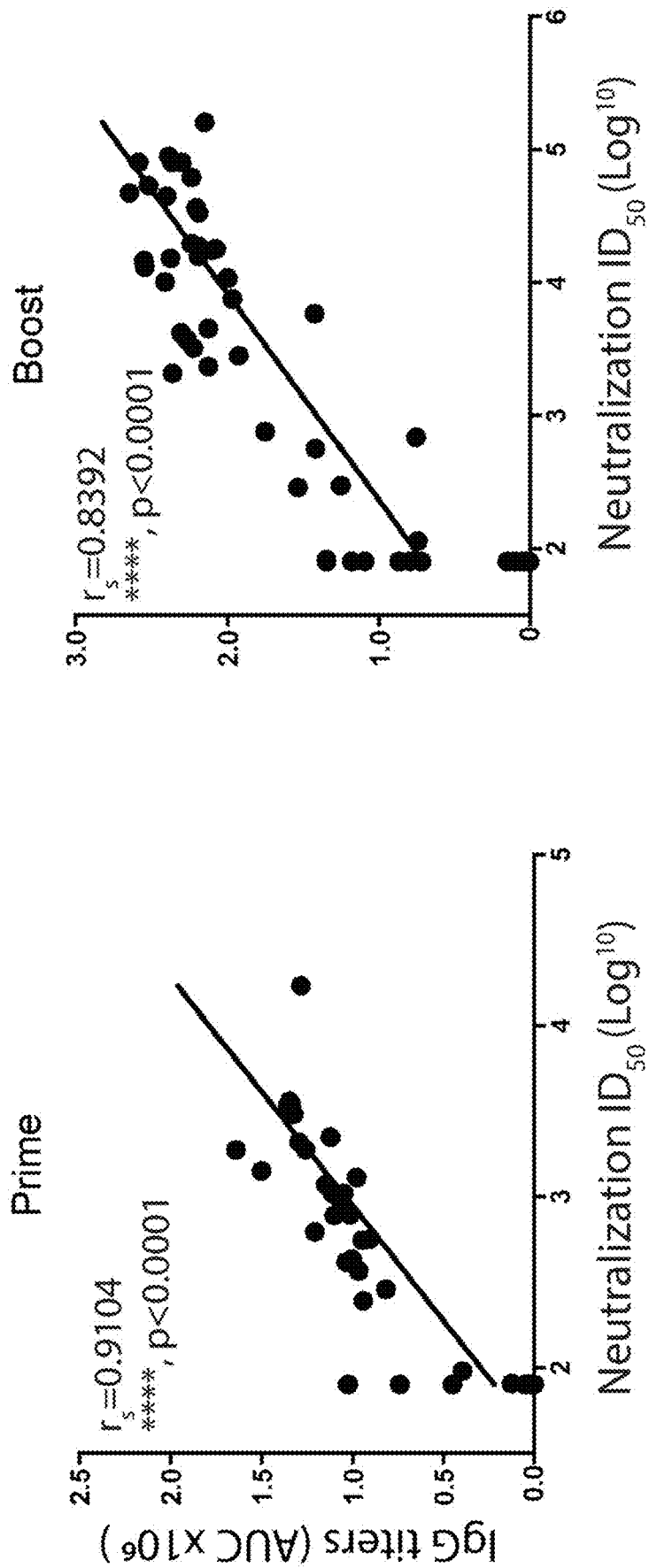
Figure 8B:
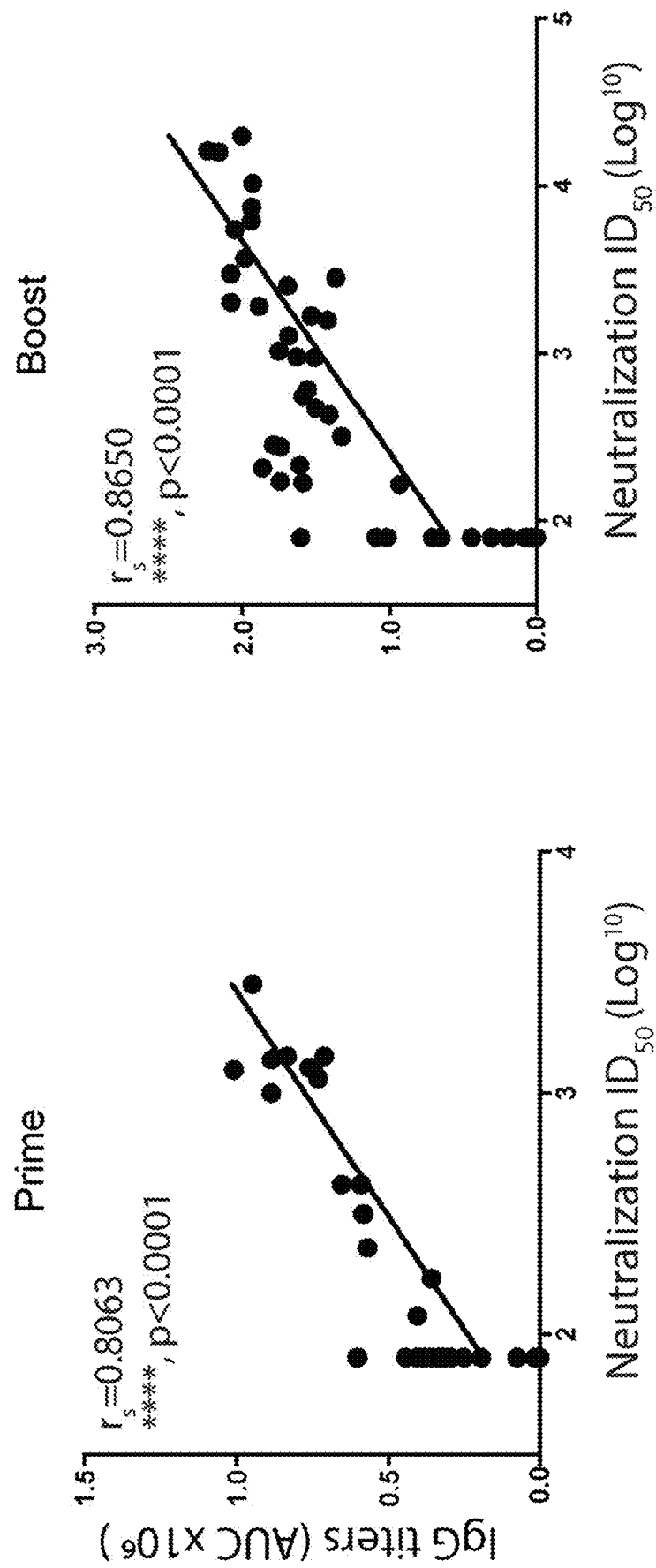
Figure 8C:
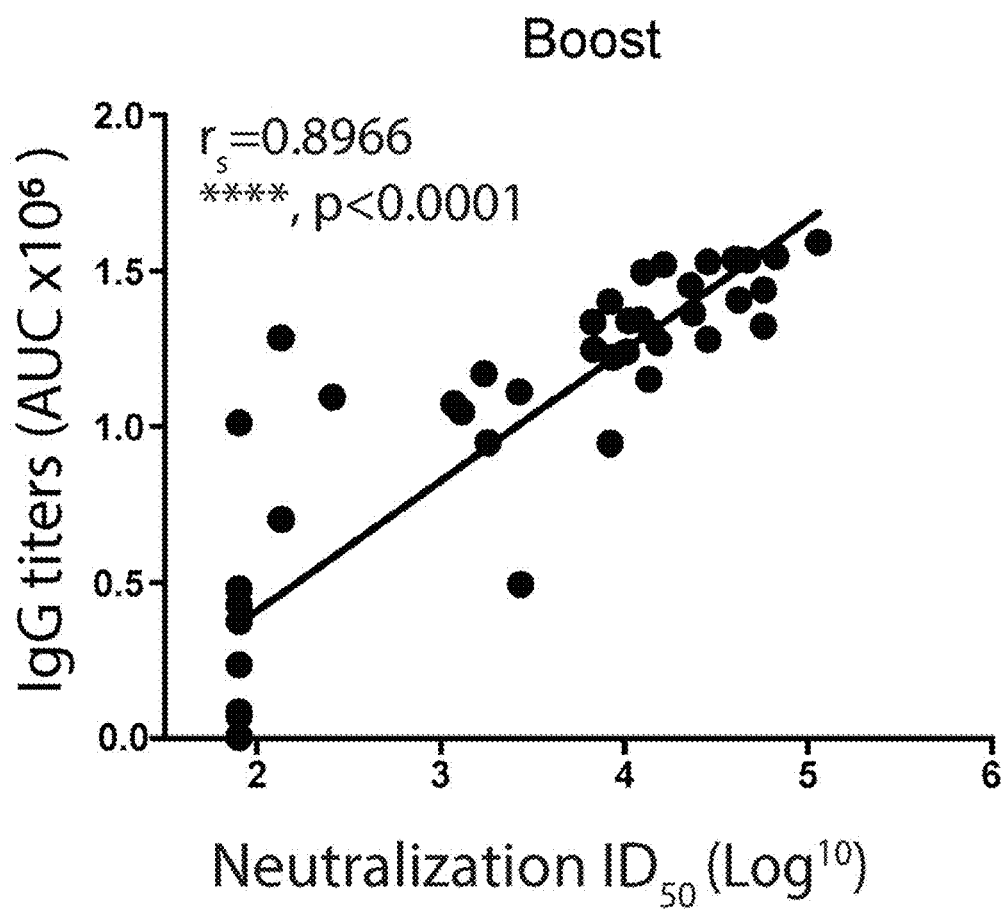

ELISAs. 10 µg/ml of a purified RBD (not SpyTagged) in 0.1 M $NaHCO_3$ pH 9.8 was coated onto Nunc® MaxiSorp™ 384-well plates (Sigma) and stored overnight at 4° C. Plates were washed with Tris-buffered saline with 0.1% Tween 20 (TBS-T) after blocking with 3% bovine serum albumin (BSA) in TBS-T for 1 hr at room temperature. Mouse serum was diluted 1:100 and then serially diluted by 4-fold with TBS-T/3% BSA and added to plates for 3 hr at room temperature. A 1:50,000 dilution of secondary HRP-conjugated goat anti-mouse IgG (Abcam) was added after washing for 1 hr at room temperature. Plates were developed using SuperSignal™ ELISA Femto Maximum Sensitivity Substrate (ThermoFisher) and read at 425 nm. Curves were plotted and integrated to obtain the area under the curve (AUC) using Graphpad Prism 8.3 assuming a one-site binding model with a Hill coefficient (FIG. 3A-FIG. 3F, FIG. 7A-FIG. 7F). $EC_{50}$s and endpoint titers were also calculated, which were determined using the dilution that was at or below the mean+2×the standard deviation of the plate control (no primary serum added) for ELISA binding data (FIG. 7E-FIG. 7F). AUC calculations were used as they better capture changes in maximum binding. Statistical significance of titer differences between groups were calculated using Tukey's multiple comparison test using Graphpad Prism 8.3.

Neutralization assays. SARS-CoV-2, SARS, WIV1, and SHC014 pseudoviruses based on HIV lentiviral particles were prepared as described using genes encoding S protein sequences lacking C-terminal residues in the cytoplasmic tail: 21 amino acid deletions for SARS-CoV-2, WIV1, and SHC014 and a 19 amino acid deletion for SARS-CoV. $IC_{50}$ values derived from this pseudotyped neutralization assay method were shown to quantitatively correlate with results from neutralization assays using authentic SARS-CoV-2 virus. For pseudovirus neutralization assays, four-fold serially diluted sera from immunized mice were incubated with a pseudotyped virus for 1 hour at 37° C. After incubation with $293T_{ACE2}$ target cells for 48 hours at 37° C., cells were washed twice with phosphate-buffered saline (PBS) and lysed with Luciferase Cell Culture Lysis 5×reagent (Promega). NanoLuc Luciferase activity in lysates was measured using the Nano-Glo Luciferase Assay System (Promega). Relative luminescence units (RLUs) were normalized to values derived from cells infected with pseudotyped virus in the absence of serum. Half-maximal inhibitory dilutions ($ID_{50}$ values) were determined using 4-parameter nonlinear regression in AntibodyDatabase. Statistical significance of titer differences between groups were calculated using Tukey's multiple comparison test of $ID_{50}$ converted to $\log^{10}$ scale using Graphpad Prism 8.3.

Statistical Analysis. Comparisons between groups for ELISAs and neutralization assays were calculated with one-way analysis of variance (ANOVA) using Tukey's post hoc test in Prism 9.0 (Graphpad). For correlation analysis between ELISA and neutralization titers, significance (p), Spearman coefficients ($r_s$), and linear plots were calculated using Prism 9.0 (Graphpad). Differences were considered significant when p values were less than 0.05. Exact p values are in relevant drawings near each corresponding line, with asterisks denoting level of significance (*denotes $0.01<p<0.05$, denotes $0.001<p<0.01$, *denotes $0.0001<p<0.001$, and ****denotes $p<0.0001$).

Flow cytometry. B-cell analysis using flow cytometry was carried out as described. Briefly, single-cell suspensions were prepared from mouse spleens using mechanical dissociation, and red blood cells were removed using ACK lysing buffer (Gibco). The white blood cell preparation was enriched for IgG+ B-cells using the negative selection protocol in a mouse memory B-cell isolation kit (Miltenyi). The following commercial reagents were used to stain enriched splenocytes: CD4-APC-eFluor 780 (clone: RM4-5), F4/80-APC-eFluor 780 (clone: BM8), CD8a-APC-eFluor 780 (clone: 53-6.7), Ly-6G-APC-eFluor 780 (clone: RB6-8C5), IgM-APC-eFluor 780 (clone: II/41) (Thermo Fisher Scientific), CD19-FITC (clone: 6D5) (Biolegend), IgG1 BV421 (clone: X40) and IgG2 BV421 (clone: R19-15) (BD Bioscience). SARS-2 RBD-APC and Rs4081 RBD-PE for used to identify antigen-specific B-cells. Cell viability was analyzed with Fixable Viability Stain 700 (BD Bioscience). Stained cells were analyzed with a SY3200 Cell Sorter (Sony) configured to detect 6 fluorochromes. 2,000,000 events were collected per sample and analyzed via FlowJo software (TreeStar).

Terminology

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vaccine composition, comprising a multivalent carrier associated with a plurality of *coronavirus* antigens, wherein the plurality of *coronavirus* antigens comprises a first *coronavirus* antigen of a first *coronavirus* strain and a second *coronavirus* antigen of a second *coronavirus* strain that is different from the first *coronavirus* strain,
wherein the first *coronavirus* antigen and the second *coronavirus* antigen each comprise an amino acid sequence having at least 80% sequence identity to an amino acid sequence selected from the group consisting of SEQ ID NOs: 1-12 and the amino acid sequences of the first and second *coronavirus* antigens are different from one another, and
wherein the multivalent carrier comprises a self-assembling nanoparticle.

2. The vaccine composition of claim 1, wherein the plurality of *coronavirus* antigens are displayed on the surface of the multivalent carrier.

3. The vaccine composition of claim 1, wherein the first *coronavirus* antigen, the second *coronavirus* antigen, or both comprise a *coronavirus* S protein.

4. The vaccine composition of claim 1, wherein the first *coronavirus* antigen and the second *coronavirus* antigen each comprise (1) an amino acid sequence having at least 85%, 90%, 95%, 98%, or 99% sequence identity to an amino acid sequence selected from the group consisting of SEQ ID NOs: 1-12; or (2) an amino acid sequence selected from the group consisting of SEQ ID NOs: 1-12.

5. The vaccine composition of claim 1, wherein the plurality of *coronavirus* antigens further comprise at least a third *coronavirus* antigen of a third *coronavirus* strain and a fourth *coronavirus* antigen of a fourth *coronavirus* strain, and wherein the first, second, third and fourth *coronavirus* strains are different from one another.

6. The vaccine composition of claim 1, comprise three, four, five, six, seven, or eight *coronavirus* S protein RBDs, and wherein each of the plurality of *coronavirus* S protein RBDs is from a *coronavirus* strain different from another.

7. The vaccine composition of claim 1, wherein the first *coronavirus* strain and the second *coronavirus* strain are in the genus of Beta-*coronavirus*.

8. The vaccine composition of claim 1, wherein the first *coronavirus* strain, the second *coronavirus* strain, or both are selected from the group consisting of: SARS-COV, SARS-COV-2, WIV1, SHC014, Rf1, RmYN02, pang17, RaTG13, Rs4081, Yun11, BM-4831, and BtKY72.

9. The vaccine composition of claim 1, further comprising an adjuvant.

10. The vaccine composition of claim 9, wherein the adjuvant is selected from the group consisting of: aluminum hydroxide, alhydrogel, MF59, AS03, Freund's adjuvant, CpG, Poly I:C, glucopyranosyl lipid A, flagellin, resiquimod, and a combination thereof.

11. A method of stimulating an immune response in a subject in need thereof, comprising: administering to the subject a pharmaceutically effective amount of the vaccine composition of claim 1, thereby stimulating an immune response in the subject.

12. A method for treating or preventing a *coronavirus* infection in a subject in need thereof, comprising: administering to the subject a pharmaceutically effective amount of the vaccine composition of claim 1, thereby treating or preventing the *coronavirus* infection in the subject.

13. A method of treating or preventing a disease or disorder caused by a *coronavirus* infection in a subject in need thereof, comprising: administering to the subject a pharmaceutically effective amount of the vaccine composition of claim 1, thereby treating or preventing the disease or disorder caused by the *coronavirus* infection in the subject.

14. The method of claim 11, wherein administering the vaccine composition induces neutralizing responses against additional *coronaviruses* different from the *coronaviruses* the plurality of *coronavirus* antigens are of.

15. The method of claim 11, wherein administering the vaccine composition induces neutralizing responses against the *coronaviruses* the plurality of *coronavirus* antigens are of.

16. The method of claim 12, wherein administering the vaccine composition results in treating or preventing infection caused by additional *coronaviruses* different from the *coronavirus* the plurality of *coronavirus* antigens are of.

17. The method of claim 12, wherein administering the vaccine composition results in treating or preventing infection caused by the *coronaviruses* the plurality of *coronavirus* antigens are of.

18. The method of claim 11, wherein administering the vaccine composition comprises administering to the subject a first vaccine composition and administering to the subject a second vaccine composition.

19. The method of claim 18, wherein administering to the subject the second vaccine composition occurs about two, three, or four weeks after administering to the subject the first vaccine composition.

20. The vaccine composition of claim 1, wherein the plurality of *coronavirus* antigens further comprises a third *coronavirus* antigen of a third *coronavirus* strain and a fourth *coronavirus* antigen of a fourth *coronavirus* strain, and wherein the first, second, third, and fourth *coronavirus* strains are different from one another and selected from the group consisting of: SARS-COV, SARS-COV-2, WIV1, SHC014, Rf1, RmYN02, pang17, RaTG13, Rs4081, Yun11, BM-4831, and BtKY72.

21. The vaccine composition of claim 5, wherein the third and fourth *coronavirus* antigens each comprise (1) an amino acid sequence having at least 65%, 70%, 75%, 80%, 85%, 90%, 95%, 98%, or 99% sequence identity to an amino acid sequence selected from the group consisting of SEQ ID NOs: 1-12; or (2) an amino acid sequence selected from the group consisting of SEQ ID NOs: 1-12, and wherein the amino acid sequences of the first, second, third and fourth *coronavirus* antigens are different from one another.

22. The vaccine composition of claim 21, wherein the first, second, third, and fourth *coronavirus* antigens each comprise an amino acid sequence having at least 85% sequence identity to an amino acid sequence selected from the group consisting of SEQ ID NOs: 1-12.

23. The vaccine composition of claim 21, wherein the first, second, third, and fourth *coronavirus* antigens each comprise an amino acid sequence selected from the group consisting of SEQ ID NOs: 1-12.

24. The vaccine composition of claim 1, wherein the plurality of *coronavirus* antigens further comprise at least a third *coronavirus* antigen of a third *coronavirus* strain, a fourth *coronavirus* antigen of a fourth *coronavirus* strain, a fifth *coronavirus* antigen of a fifth *coronavirus* strain, a sixth *coronavirus* antigen of a sixth *coronavirus* strain, a seventh *coronavirus* antigen of a seventh *coronavirus* strain, and an eighth *coronavirus* antigen of an eighth *coronavirus* strain, the first, second, third, fourth, fifth, sixth, seventh, and eighth *coronavirus* antigens each comprising an amino acid sequence having at least 85% sequence identity to an amino acid sequence selected from the group consisting of SEQ ID NOs: 1-12, and wherein the amino acid sequences of the first, second, third, fourth, fifth, sixth, seventh and eighth *coronavirus* antigens are different from one another.

25. The vaccine composition of claim 1, wherein the first *coronavirus* strain and the second *coronavirus* strains are from different clades.

26. The vaccine composition of claim 1, wherein the self-assembling nanoparticle is an i301 nanoparticle or a variant thereof, or a mi3 nanoparticle or a variant thereof.

27. A vaccine composition, comprising a multivalent carrier associated with a plurality of *coronavirus* antigens, wherein the plurality of *coronavirus* antigens comprises a first *coronavirus* antigen of a first *coronavirus* strain, a second *coronavirus* antigen of a second *coronavirus* strain, a third *coronavirus* antigen of a third *coronavirus* strain and a fourth *coronavirus* antigen of a fourth *coronavirus* strain, and wherein the first, second, third, and fourth *coronavirus* strains are different from one another and selected from the group consisting of: SARS-COV, SARS-COV-2, WIV1, SHC014, Rf1, RmYN02, pang17, RaTG13, Rs4081, Yun11, BM-4831, and BtKY72, wherein the first *coronavirus* antigen and the second *coronavirus* antigen each comprise an amino acid sequence having at least 80% sequence identity to an amino acid sequence selected from the group consisting of SEQ ID NOs: 1-12 and the amino acid sequences of the first and second *coronavirus* antigens are different from one another.

28. The vaccine composition of claim 27, wherein the first *coronavirus* antigen and the second *coronavirus* antigen each comprise (1) an amino acid sequence having at least 85%, 90%, 95%, 98%, or 99% sequence identity to an amino acid sequence selected from the group consisting of SEQ ID NOs: 1-12; or (2) an amino acid sequence selected from the group consisting of SEQ ID NOs: 1-12.

29. The vaccine composition of claim 27, further comprising an adjuvant.

\* \* \* \* \*

SEQUENCE LISTING

```
<160> NUMBER OF SEQ ID NOS: 26

<210> SEQ ID NO 1
<211> LENGTH: 219
<212> TYPE: PRT
<213> ORGANISM: Artificial Sequence
<220> FEATURE:
<223> OTHER INFORMATION: SARS-CoV-2_RBD-ST003_Delta_CVNF_translation

<400> SEQUENCE: 1

Arg Val Gln Pro Thr Glu Ser Ile Val Arg Phe Pro Asn Ile Thr Asn
1               5                   10                  15

Leu Cys Pro Phe Gly Glu Val Phe Asn Ala Thr Arg Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Ala Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Arg Gly Asp Glu Val Arg Gln Ile Ala Pro Gly Gln
                85                  90                  95

Thr Gly Lys Ile Ala Asp Tyr Asn Tyr Lys Leu Pro Asp Phe Thr
                100                 105                 110

Gly Cys Val Ile Ala Trp Asn Ser Asn Asn Leu Asp Ser Lys Val Gly
            115                 120                 125

Gly Asn Tyr Asn Tyr Leu Tyr Arg Leu Phe Arg Lys Ser Asn Leu Lys
        130                 135                 140

Pro Phe Glu Arg Asp Ile Ser Thr Glu Ile Tyr Gln Ala Gly Ser Thr
145                 150                 155                 160

Pro Cys Asn Gly Val Glu Gly Phe Asn Cys Tyr Phe Pro Leu Gln Ser
                165                 170                 175

Tyr Gly Phe Gln Pro Thr Asn Gly Val Gly Tyr Gln Pro Tyr Arg Val
            180                 185                 190

Val Val Leu Ser Phe Glu Leu Leu His Ala Pro Ala Thr Val Cys Gly
        195                 200                 205

Pro Lys Lys Ser Thr Asn Leu Val Lys Asn Lys
        210                 215

<210> SEQ ID NO 2
<211> LENGTH: 223
<212> TYPE: PRT
<213> ORGANISM: Artificial Sequence
```

<220> FEATURE:
<223> OTHER INFORMATION: Ratg13-RBD-ST3_translation SARS-related
      coronavirus spike

<400> SEQUENCE: 2

Arg Val Gln Pro Thr Asp Ser Ile Val Arg Phe Pro Asn Ile Thr Asn
1               5                   10                  15

Leu Cys Pro Phe Gly Glu Val Phe Asn Ala Thr Thr Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Thr Gly Asp Glu Val Arg Gln Ile Ala Pro Gly Gln
                85                  90                  95

Thr Gly Lys Ile Ala Asp Tyr Asn Tyr Lys Leu Pro Asp Asp Phe Thr
            100                 105                 110

Gly Cys Val Ile Ala Trp Asn Ser Lys His Ile Asp Ala Lys Glu Gly
        115                 120                 125

Gly Asn Phe Asn Tyr Leu Tyr Arg Leu Phe Arg Lys Ala Asn Leu Lys
    130                 135                 140

Pro Phe Glu Arg Asp Ile Ser Thr Glu Ile Tyr Gln Ala Gly Ser Lys
145                 150                 155                 160

Pro Cys Asn Gly Gln Thr Gly Leu Asn Cys Tyr Tyr Pro Leu Tyr Arg
                165                 170                 175

Tyr Gly Phe Tyr Pro Thr Asp Gly Val Gly His Gln Pro Tyr Arg Val
            180                 185                 190

Val Val Leu Ser Phe Glu Leu Leu Asn Ala Pro Ala Thr Val Cys Gly
        195                 200                 205

Pro Lys Lys Ser Thr Asn Leu Val Lys Asn Lys Cys Val Asn Phe
    210                 215                 220

<210> SEQ ID NO 3
<211> LENGTH: 218
<212> TYPE: PRT
<213> ORGANISM: Artificial Sequence
<220> FEATURE:
<223> OTHER INFORMATION: SHC014-RBD-ST3_DelCVNF_translation

<400> SEQUENCE: 3

Arg Val Ala Pro Ser Lys Glu Val Val Arg Phe Pro Asn Ile Thr Asn
1               5                   10                  15

Leu Cys Pro Phe Gly Glu Val Phe Asn Ala Thr Thr Phe Pro Ser Val
            20                  25                  30

Tyr Ala Trp Glu Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60

Ser Ala Thr Lys Leu Asn Asp Leu Cys Phe Ser Asn Val Tyr Ala Asp
65                  70                  75                  80

Ser Phe Val Val Lys Gly Asp Asp Val Arg Gln Ile Ala Pro Gly Gln
                85                  90                  95

Thr Gly Val Ile Ala Asp Tyr Asn Tyr Lys Leu Pro Asp Asp Phe Leu
            100                 105                 110

```
Gly Cys Val Leu Ala Trp Asn Thr Asn Ser Lys Asp Ser Ser Thr Ser
            115                 120                 125
Gly Asn Tyr Asn Tyr Leu Tyr Arg Trp Val Arg Arg Ser Lys Leu Asn
        130                 135                 140
Pro Tyr Glu Arg Asp Leu Ser Asn Asp Ile Tyr Ser Pro Gly Gly Gln
145                 150                 155                 160
Ser Cys Ser Ala Val Gly Pro Asn Cys Tyr Asn Pro Leu Arg Pro Tyr
                165                 170                 175
Gly Phe Phe Thr Thr Ala Gly Val Gly His Gln Pro Tyr Arg Val Val
            180                 185                 190
Val Leu Ser Phe Glu Leu Leu Asn Ala Pro Ala Thr Val Cys Gly Pro
        195                 200                 205
Lys Leu Ser Thr Asp Leu Ile Lys Asn Gln
210                 215

<210> SEQ ID NO 4
<211> LENGTH: 204
<212> TYPE: PRT
<213> ORGANISM: Artificial Sequence
<220> FEATURE:
<223> OTHER INFORMATION: Rs4081-RBD-ST3_translation SARS-related Spike
      constructs

<400> SEQUENCE: 4

Arg Val Ser Pro Thr His Glu Val Val Arg Phe Pro Asn Ile Thr Asn
1               5                   10                  15
Arg Cys Pro Phe Asp Lys Val Phe Asn Ala Ser Arg Phe Pro Asn Val
                20                  25                  30
Tyr Ala Trp Glu Arg Thr Lys Ile Ser Asp Cys Val Ala Asp Tyr Thr
            35                  40                  45
Val Leu Tyr Asn Ser Thr Ser Phe Ser Thr Phe Lys Cys Tyr Gly Val
    50                  55                  60
Ser Pro Ser Lys Leu Ile Asp Leu Cys Phe Thr Ser Val Tyr Ala Asp
65                  70                  75                  80
Thr Phe Leu Ile Arg Ser Ser Glu Val Arg Gln Val Ala Pro Gly Glu
                85                  90                  95
Thr Gly Val Ile Ala Asp Tyr Asn Tyr Lys Leu Pro Asp Asp Phe Thr
            100                 105                 110
Gly Cys Val Ile Ala Trp Asn Thr Ala Lys Gln Asp Gln Gly Gln Tyr
            115                 120                 125
Tyr Tyr Arg Ser Ser Arg Lys Thr Lys Leu Lys Pro Phe Glu Arg Asp
        130                 135                 140
Leu Thr Ser Asp Glu Asn Gly Val Arg Thr Leu Ser Thr Tyr Asp Phe
145                 150                 155                 160
Tyr Pro Asn Val Pro Ile Glu Tyr Gln Ala Thr Arg Val Val Val Leu
                165                 170                 175
Ser Phe Glu Leu Leu Asn Ala Pro Ala Thr Val Cys Gly Pro Lys Leu
            180                 185                 190
Ser Thr Ala Leu Val Lys Asn Gln Cys Val Asn Phe
        195                 200

<210> SEQ ID NO 5
<211> LENGTH: 223
<212> TYPE: PRT
<213> ORGANISM: Artificial Sequence
<220> FEATURE:
<223> OTHER INFORMATION: pang17-RBD-ST3_translation SARS-related
      coronavirus spike
```

<400> SEQUENCE: 5

Arg Val Gln Pro Thr Ile Ser Ile Val Arg Phe Pro Asn Ile Thr Asn
1               5                   10                  15

Leu Cys Pro Phe Gly Glu Val Phe Asn Ala Ser Lys Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Val Lys Gly Asp Glu Val Arg Gln Ile Ala Pro Gly Gln
                85                  90                  95

Thr Gly Val Ile Ala Asp Tyr Asn Tyr Lys Leu Pro Asp Asp Phe Thr
            100                 105                 110

Gly Cys Val Ile Ala Trp Asn Ser Val Lys Gln Asp Ala Leu Thr Gly
        115                 120                 125

Gly Asn Tyr Gly Tyr Leu Tyr Arg Leu Phe Arg Lys Ser Lys Leu Lys
130                 135                 140

Pro Phe Glu Arg Asp Ile Ser Thr Glu Ile Tyr Gln Ala Gly Ser Thr
145                 150                 155                 160

Pro Cys Asn Gly Gln Val Gly Leu Asn Cys Tyr Tyr Pro Leu Glu Arg
                165                 170                 175

Tyr Gly Phe His Pro Thr Thr Gly Val Asn Tyr Gln Pro Phe Arg Val
            180                 185                 190

Val Val Leu Ser Phe Glu Leu Leu Asn Gly Pro Ala Thr Val Cys Gly
        195                 200                 205

Pro Lys Leu Ser Thr Thr Leu Val Lys Asp Lys Cys Val Asn Phe
    210                 215                 220

<210> SEQ ID NO 6
<211> LENGTH: 204
<212> TYPE: PRT
<213> ORGANISM: Artificial Sequence
<220> FEATURE:
<223> OTHER INFORMATION: RmYN02-RBD-ST3_translation SARS-related Spike
      constructs

<400> SEQUENCE: 6

Arg Ile Leu Pro Ser Thr Glu Val Val Arg Phe Pro Asn Ile Thr Asn
1               5                   10                  15

Phe Cys Pro Phe Asp Lys Val Phe Asn Ala Thr Arg Phe Pro Asn Val
            20                  25                  30

Tyr Ala Trp Gln Arg Thr Lys Ile Ser Asp Cys Ile Ala Asp Tyr Thr
        35                  40                  45

Val Leu Tyr Asn Ser Thr Ser Phe Ser Thr Phe Lys Cys Tyr Gly Val
    50                  55                  60

Ser Pro Ser Lys Leu Ile Asp Leu Cys Phe Thr Ser Val Tyr Ala Asp
65                  70                  75                  80

Thr Phe Leu Ile Arg Phe Ser Glu Val Arg Gln Ile Ala Pro Gly Glu
                85                  90                  95

Thr Gly Val Ile Ala Asp Tyr Asn Tyr Lys Leu Pro Asp Asp Phe Thr
            100                 105                 110

Gly Cys Val Leu Ala Trp Asn Thr Ala Gln Gln Asp Ile Gly Ser Tyr
        115                 120                 125

Phe Tyr Arg Ser His Arg Ala Val Lys Leu Lys Pro Phe Glu Arg Asp
            130                 135                 140

```
Leu Cys Pro Phe Gly Glu Val Phe Asn Ala Thr Thr Phe Pro Ser Val
                20                  25                  30

Tyr Ala Trp Glu Arg Lys Arg Ile Ser Asn Cys Val Ala Asp Tyr Ser
            35                  40                  45

Val Leu Tyr Asn Ser Thr Ser Phe Ser Thr Phe Lys Cys Tyr Gly Val
        50                  55                  60

Ser Ala Thr Lys Leu Asn Asp Leu Cys Phe Ser Asn Val Tyr Ala Asp
 65                  70                  75                  80

Ser Phe Val Val Lys Gly Asp Asp Val Arg Gln Ile Ala Pro Gly Gln
                85                  90                  95

Thr Gly Val Ile Ala Asp Tyr Asn Tyr Lys Leu Pro Asp Asp Phe Thr
            100                 105                 110

Gly Cys Val Leu Ala Trp Asn Thr Arg Asn Ile Asp Ala Thr Gln Thr
        115                 120                 125

Gly Asn Tyr Asn Tyr Lys Tyr Arg Ser Leu Arg His Gly Lys Leu Arg
130                 135                 140

Pro Phe Glu Arg Asp Ile Ser Asn Val Pro Phe Ser Pro Asp Gly Lys
145                 150                 155                 160

Pro Cys Thr Pro Pro Ala Phe Asn Cys Tyr Trp Pro Leu Asn Asp Tyr
                165                 170                 175

Gly Phe Tyr Ile Thr Asn Gly Ile Gly Tyr Gln Pro Tyr Arg Val Val
            180                 185                 190

Val Leu Ser Phe Glu Leu Leu Asn Ala Pro Ala Thr Val Cys Gly Pro
        195                 200                 205

Lys Leu Ser Thr Asp Leu Ile Lys Asn Gln Cys Val Asn Phe
210                 215                 220

<210> SEQ ID NO 9
<211> LENGTH: 193
<212> TYPE: PRT
<213> ORGANISM: Artificial Sequence
<220> FEATURE:
<223> OTHER INFORMATION: SARS-CoV-RBD-ST3__translation SARS-related
      coronavirus spike

<400> SEQUENCE: 9

Asn Ile Thr Asn Leu Cys Pro Phe Gly Glu Val Phe Asn Ala Thr Lys
 1               5                  10                  15

Phe Pro Ser Val Tyr Ala Trp Glu Arg Lys Lys Ile Ser Asn Cys Val
                20                  25                  30

Ala Asp Tyr Ser Val Leu Tyr Asn Ser Thr Phe Phe Ser Thr Phe Lys
            35                  40                  45

Cys Tyr Gly Val Ser Ala Thr Lys Leu Asn Asp Leu Cys Phe Ser Asn
        50                  55                  60

Val Tyr Ala Asp Ser Phe Val Val Lys Gly Asp Asp Val Arg Gln Ile
 65                  70                  75                  80

Ala Pro Gly Gln Thr Gly Val Ile Ala Asp Tyr Asn Tyr Lys Leu Pro
                85                  90                  95

Asp Asp Phe Met Gly Cys Val Leu Ala Trp Asn Thr Arg Asn Ile Asp
            100                 105                 110

Ala Thr Ser Thr Gly Asn Tyr Asn Tyr Lys Tyr Arg Tyr Leu Arg His
        115                 120                 125

Gly Lys Leu Arg Pro Phe Glu Arg Asp Ile Ser Asn Val Pro Phe Ser
130                 135                 140

Pro Asp Gly Lys Pro Cys Thr Pro Pro Ala Leu Asn Cys Tyr Trp Pro
145                 150                 155                 160
```

```
Leu Asn Asp Tyr Gly Phe Tyr Thr Thr Thr Gly Ile Gly Tyr Gln Pro
            165                 170                 175

Tyr Arg Val Val Val Leu Ser Phe Glu Leu Leu Asn Ala Pro Ala Thr
            180                 185                 190

Val

<210> SEQ ID NO 10
<211> LENGTH: 204
<212> TYPE: PRT
<213> ORGANISM: Artificial Sequence
<220> FEATURE:
<223> OTHER INFORMATION: Yun11-RBD-ST003_translation

<400> SEQUENCE: 10

Arg Val Ser Pro Ser Thr Glu Val Ile Arg Phe Pro Asn Ile Thr Asn
1               5                   10                  15

Arg Cys Pro Phe Asp Arg Val Phe Asn Ala Ser Arg Phe Pro Ser Val
            20                  25                  30

Tyr Ala Trp Glu Arg Thr Lys Ile Ser Asp Cys Val Ala Asp Tyr Thr
        35                  40                  45

Val Leu Tyr Asn Ser Thr Ser Phe Ser Thr Phe Lys Cys Tyr Gly Val
    50                  55                  60

Ser Pro Ser Lys Leu Ile Asp Leu Cys Phe Thr Ser Val Tyr Ala Asp
65                  70                  75                  80

Thr Phe Leu Ile Arg Phe Ser Glu Val Arg Gln Ile Ala Pro Gly Glu
                85                  90                  95

Thr Gly Val Ile Ala Asp Tyr Asn Tyr Lys Leu Pro Asp Glu Phe Thr
            100                 105                 110

Gly Cys Val Ile Ala Trp Asn Thr Ala Asn Gln Asp Arg Gly Gln Tyr
        115                 120                 125

Tyr Tyr Arg Ser Ser Arg Lys Thr Lys Leu Lys Pro Phe Glu Arg Asp
    130                 135                 140

Leu Ser Ser Asp Glu Asn Gly Val Arg Thr Leu Ser Thr Tyr Asp Phe
145                 150                 155                 160

Tyr Pro Ser Val Pro Leu Glu Tyr Gln Ala Thr Arg Val Val Val Leu
                165                 170                 175

Ser Phe Glu Leu Leu Asn Ala Pro Ala Thr Val Cys Gly Pro Lys Leu
            180                 185                 190

Ser Thr Ser Leu Ile Lys Asn Gln Cys Val Asn Phe
        195                 200

<210> SEQ ID NO 11
<211> LENGTH: 219
<212> TYPE: PRT
<213> ORGANISM: Artificial Sequence
<220> FEATURE:
<223> OTHER INFORMATION: BM4831-RBD-ST3_translation SARS-related Spike
      constructs

<400> SEQUENCE: 11

Arg Val Thr Pro Thr Thr Glu Val Val Arg Phe Pro Asn Ile Thr Gln
1               5                   10                  15

Leu Cys Pro Phe Asn Glu Val Phe Asn Ile Thr Ser Phe Pro Ser Val
            20                  25                  30

Tyr Ala Trp Glu Arg Met Arg Ile Thr Asn Cys Val Ala Asp Tyr Ser
        35                  40                  45

Val Leu Tyr Asn Ser Ser Ala Ser Phe Ser Thr Phe Gln Cys Tyr Gly
```

Val Ser Pro Thr Lys Leu Asn Asp Leu Cys Phe Ser Ser Val Tyr Ala
65                  70                  75                  80

Asp Tyr Phe Val Val Lys Gly Asp Asp Val Arg Gln Ile Ala Pro Ala
            85                  90                  95

Gln Thr Gly Val Ile Ala Asp Tyr Asn Tyr Lys Leu Pro Asp Asp Phe
            100                 105                 110

Thr Gly Cys Val Ile Ala Trp Asn Thr Asn Ser Leu Asp Ser Ser Asn
            115                 120                 125

Glu Phe Phe Tyr Arg Arg Phe Arg His Gly Lys Ile Lys Pro Tyr Gly
        130                 135                 140

Arg Asp Leu Ser Asn Val Leu Phe Asn Pro Ser Gly Gly Thr Cys Ser
145                 150                 155                 160

Ala Glu Gly Leu Asn Cys Tyr Lys Pro Leu Ala Ser Tyr Gly Phe Thr
            165                 170                 175

Gln Ser Ser Gly Ile Gly Phe Gln Pro Tyr Arg Val Val Val Leu Ser
            180                 185                 190

Phe Glu Leu Leu Asn Ala Pro Ala Thr Val Cys Gly Pro Lys Gln Ser
        195                 200                 205

Thr Glu Leu Val Lys Asn Lys Cys Val Asn Phe
        210                 215

```
<210> SEQ ID NO 12
<211> LENGTH: 222
<212> TYPE: PRT
<213> ORGANISM: Artificial Sequence
<220> FEATURE:
<223> OTHER INFORMATION: BtKY72-RBD-ST3_translation SARS-related Spike
      constructs

<400> SEQUENCE: 12
```

Arg Val Ser Pro Ser Thr Glu Val Val Arg Phe Pro Asn Ile Thr Asn
1               5                   10                  15

Leu Cys Pro Phe Gly Gln Val Phe Asn Ala Ser Asn Phe Pro Ser Val
            20                  25                  30

Tyr Ala Trp Glu Arg Leu Arg Ile Ser Asp Cys Val Ala Asp Tyr Ala
        35                  40                  45

Val Leu Tyr Asn Ser Ser Ser Phe Ser Thr Phe Lys Cys Tyr Gly
    50                  55                  60

Val Ser Pro Thr Lys Leu Asn Asp Leu Cys Phe Ser Ser Val Tyr Ala
65                  70                  75                  80

Asp Tyr Phe Val Val Lys Gly Asp Asp Val Arg Gln Ile Ala Pro Ala
            85                  90                  95

Gln Thr Gly Val Ile Ala Asp Tyr Asn Tyr Lys Leu Pro Asp Asp Phe
            100                 105                 110

Thr Gly Cys Val Leu Ala Trp Asn Thr Asn Ser Val Asp Ser Lys Ser
            115                 120                 125

Gly Asn Asn Phe Tyr Tyr Arg Leu Phe Arg His Gly Lys Ile Lys Pro
        130                 135                 140

Tyr Glu Arg Asp Ile Ser Asn Val Leu Tyr Asn Ser Ala Gly Gly Thr
145                 150                 155                 160

Cys Ser Ser Ile Ser Gln Leu Gly Cys Tyr Glu Pro Leu Lys Ser Tyr
            165                 170                 175

Gly Phe Thr Pro Thr Val Gly Val Gly Tyr Gln Pro Tyr Arg Val Val
            180                 185                 190

Val Leu Ser Phe Glu Leu Leu Asn Ala Pro Ala Thr Val Cys Gly Pro
            195                 200                 205

Lys Lys Ser Thr Glu Leu Val Lys Asn Lys Cys Val Asn Phe
    210                 215                 220

<210> SEQ ID NO 13
<211> LENGTH: 7
<212> TYPE: PRT
<213> ORGANISM: Artificial Sequence
<220> FEATURE:
<223> OTHER INFORMATION: hexahistidine tag

<400> SEQUENCE: 13

Gly His His His His His His
1               5

<210> SEQ ID NO 14
<211> LENGTH: 16
<212> TYPE: PRT
<213> ORGANISM: Artificial Sequence
<220> FEATURE:
<223> OTHER INFORMATION: SpyTag003

<400> SEQUENCE: 14

Arg Gly Val Pro His Ile Val Met Val Asp Ala Tyr Lys Arg Tyr Lys
1               5                   10                  15

<210> SEQ ID NO 15
<211> LENGTH: 223
<212> TYPE: PRT
<213> ORGANISM: Artificial Sequence
<220> FEATURE:
<223> OTHER INFORMATION: SARS-2 RBD

<400> SEQUENCE: 15

Arg Val Gln Pro Thr Glu Ser Ile Val Arg Phe Pro Asn Ile Thr Asn
1               5                   10                  15

Leu Cys Pro Phe Gly Glu Val Phe Asn Ala Thr Arg Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Ala Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Arg Gly Asp Glu Val Arg Gln Ile Ala Pro Gly Gln
                85                  90                  95

Thr Gly Lys Ile Ala Asp Tyr Asn Tyr Lys Leu Pro Asp Asp Phe Thr
            100                 105                 110

Gly Cys Val Ile Ala Trp Asn Ser Asn Asn Leu Asp Ser Lys Val Gly
        115                 120                 125

Gly Asn Tyr Asn Tyr Leu Tyr Arg Leu Phe Arg Lys Ser Asn Leu Lys
    130                 135                 140

Pro Phe Glu Arg Asp Ile Ser Thr Glu Ile Tyr Gln Ala Gly Ser Thr
145                 150                 155                 160

Pro Cys Asn Gly Val Glu Gly Phe Asn Cys Tyr Phe Pro Leu Gln Ser
                165                 170                 175

Tyr Gly Phe Gln Pro Thr Asn Gly Val Gly Tyr Gln Pro Tyr Arg Val
            180                 185                 190

Val Val Leu Ser Phe Glu Leu Leu His Ala Pro Ala Thr Val Cys Gly

```
                195                 200                 205
Pro Lys Lys Ser Thr Asn Leu Val Lys Asn Lys Cys Val Asn Phe
    210                 215                 220

<210> SEQ ID NO 16
<211> LENGTH: 223
<212> TYPE: PRT
<213> ORGANISM: Artificial Sequence
<220> FEATURE:
<223> OTHER INFORMATION: RaTG13 RBD

<400> SEQUENCE: 16

Arg Val Gln Pro Thr Asp Ser Ile Val Arg Phe Pro Asn Ile Thr Asn
1               5                   10                  15

Leu Cys Pro Phe Gly Glu Val Phe Asn Ala Thr Thr Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Ile Thr Gly Asp Glu Val Arg Gln Ile Ala Pro Gly Gln
                85                  90                  95

Thr Gly Lys Ile Ala Asp Tyr Asn Tyr Lys Leu Pro Asp Asp Phe Thr
            100                 105                 110

Gly Cys Val Ile Ala Trp Asn Ser Lys His Ile Asp Ala Lys Glu Gly
        115                 120                 125

Gly Asn Phe Asn Tyr Leu Tyr Arg Leu Phe Arg Lys Ala Asn Leu Lys
    130                 135                 140

Pro Phe Glu Arg Asp Ile Ser Thr Glu Ile Tyr Gln Ala Gly Ser Lys
145                 150                 155                 160

Pro Cys Asn Gly Gln Thr Gly Leu Asn Cys Tyr Tyr Pro Leu Tyr Arg
                165                 170                 175

Tyr Gly Phe Tyr Pro Thr Asp Gly Val Gly His Gln Pro Tyr Arg Val
            180                 185                 190

Val Val Leu Ser Phe Glu Leu Leu Asn Ala Pro Ala Thr Val Cys Gly
        195                 200                 205

Pro Lys Lys Ser Thr Asn Leu Val Lys Asn Lys Cys Val Asn Phe
    210                 215                 220

<210> SEQ ID NO 17
<211> LENGTH: 222
<212> TYPE: PRT
<213> ORGANISM: Artificial Sequence
<220> FEATURE:
<223> OTHER INFORMATION: SHC014 RBD

<400> SEQUENCE: 17

Arg Val Ala Pro Ser Lys Glu Val Val Arg Phe Pro Asn Ile Thr Asn
1               5                   10                  15

Leu Cys Pro Phe Gly Glu Val Phe Asn Ala Thr Thr Phe Pro Ser Val
            20                  25                  30

Tyr Ala Trp Glu Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60
```

Ser Ala Thr Lys Leu Asn Asp Leu Cys Phe Ser Asn Val Tyr Ala Asp
 65                  70                  75                  80

Ser Phe Val Val Lys Gly Asp Asp Val Arg Gln Ile Ala Pro Gly Gln
                 85                  90                  95

Thr Gly Val Ile Ala Asp Tyr Asn Tyr Lys Leu Pro Asp Asp Phe Leu
            100                 105                 110

Gly Cys Val Leu Ala Trp Asn Thr Asn Ser Lys Asp Ser Ser Thr Ser
        115                 120                 125

Gly Asn Tyr Asn Tyr Leu Tyr Arg Trp Val Arg Arg Ser Lys Leu Asn
    130                 135                 140

Pro Tyr Glu Arg Asp Leu Ser Asn Asp Ile Tyr Ser Pro Gly Gly Gln
145                 150                 155                 160

Ser Cys Ser Ala Val Gly Pro Asn Cys Tyr Asn Pro Leu Arg Pro Tyr
                165                 170                 175

Gly Phe Phe Thr Thr Ala Gly Val Gly His Gln Pro Tyr Arg Val Val
            180                 185                 190

Val Leu Ser Phe Glu Leu Leu Asn Ala Pro Ala Thr Val Cys Gly Pro
        195                 200                 205

Lys Leu Ser Thr Asp Leu Ile Lys Asn Gln Cys Val Asn Phe
    210                 215                 220

<210> SEQ ID NO 18
<211> LENGTH: 206
<212> TYPE: PRT
<213> ORGANISM: Artificial Sequence
<220> FEATURE:
<223> OTHER INFORMATION: Rs4081 RBD

<400> SEQUENCE: 18

Arg Val Ser Pro Thr His Glu Val Val Arg Phe Pro Asn Ile Thr Asn
1               5                   10                  15

Arg Cys Pro Phe Asp Lys Val Phe Asn Ala Ser Arg Phe Pro Asn Val
                20                  25                  30

Tyr Ala Trp Glu Arg Thr Lys Ile Ser Asp Cys Val Ala Asp Tyr Thr
            35                  40                  45

Val Leu Tyr Asn Ser Thr Ser Phe Ser Thr Phe Lys Cys Tyr Gly Val
        50                  55                  60

Ser Pro Ser Lys Leu Ile Asp Leu Cys Phe Thr Ser Val Tyr Ala Asp
 65                  70                  75                  80

Thr Phe Leu Ile Arg Ser Ser Glu Val Arg Gln Val Ala Pro Gly Glu
                 85                  90                  95

Thr Gly Val Ile Ala Asp Tyr Asn Tyr Lys Leu Pro Asp Asp Phe Thr
            100                 105                 110

Gly Cys Val Ile Ala Trp Asn Thr Ala Lys Gln Asp Gln Gly Gln Tyr
        115                 120                 125

Tyr Tyr Arg Ser Ser Arg Lys Thr Lys Leu Lys Pro Phe Glu Arg Asp
    130                 135                 140

Leu Thr Ser Asp Glu Asn Gly Val Arg Thr Leu Ser Thr Tyr Asp Phe
145                 150                 155                 160

Tyr Pro Asn Val Pro Ile Glu Tyr Gln Ala Thr Arg Val Val Val Leu
                165                 170                 175

Ser Phe Glu Leu Leu Asn Ala Pro Ala Thr Val Cys Gly Pro Lys Leu
            180                 185                 190

Ser Thr Ala Leu Val Lys Asn Gln Cys Val Asn Phe Asn Phe
        195                 200                 205

<210> SEQ ID NO 19
<211> LENGTH: 223
<212> TYPE: PRT
<213> ORGANISM: Artificial Sequence
<220> FEATURE:
<223> OTHER INFORMATION: pang17 RBD

<400> SEQUENCE: 19

```
Arg Val Gln Pro Thr Ile Ser Ile Val Arg Phe Pro Asn Ile Thr Asn
1               5                   10                  15

Leu Cys Pro Phe Gly Glu Val Phe Asn Ala Ser Lys Phe Ala Ser Val
            20                  25                  30

Tyr Ala Trp Asn Arg Lys Arg Ile Ser Asn Cys Val Ala Asp Tyr Ser
        35                  40                  45

Val Leu Tyr Asn Ser Thr Ser Phe Ser Thr Phe Lys Cys Tyr Gly Val
    50                  55                  60

Ser Pro Thr Lys Leu Asn Asp Leu Cys Phe Thr Asn Val Tyr Ala Asp
65                  70                  75                  80

Ser Phe Val Val Lys Gly Asp Glu Val Arg Gln Ile Ala Pro Gly Gln
                85                  90                  95

Thr Gly Val Ile Ala Asp Tyr Asn Tyr Lys Leu Pro Asp Phe Thr
            100                 105                 110

Gly Cys Val Ile Ala Trp Asn Ser Val Lys Gln Asp Ala Leu Thr Gly
        115                 120                 125

Gly Asn Tyr Gly Tyr Leu Tyr Arg Leu Phe Arg Lys Ser Lys Leu Lys
    130                 135                 140

Pro Phe Glu Arg Asp Ile Ser Thr Glu Ile Tyr Gln Ala Gly Ser Thr
145                 150                 155                 160

Pro Cys Asn Gly Gln Val Gly Leu Asn Cys Tyr Tyr Pro Leu Glu Arg
                165                 170                 175

Tyr Gly Phe His Pro Thr Thr Gly Val Asn Tyr Gln Pro Phe Arg Val
            180                 185                 190

Val Val Leu Ser Phe Glu Leu Leu Asn Gly Pro Ala Thr Val Cys Gly
        195                 200                 205

Pro Lys Leu Ser Thr Thr Leu Val Lys Asp Lys Cys Val Asn Phe
    210                 215                 220
```

<210> SEQ ID NO 20
<211> LENGTH: 206
<212> TYPE: PRT
<213> ORGANISM: Artificial Sequence
<220> FEATURE:
<223> OTHER INFORMATION: RmYN02 RBD

<400> SEQUENCE: 20

```
Arg Ile Leu Pro Ser Thr Glu Val Val Arg Phe Pro Asn Ile Thr Asn
1               5                   10                  15

Phe Cys Pro Phe Asp Lys Val Phe Asn Ala Thr Arg Phe Pro Asn Val
            20                  25                  30

Tyr Ala Trp Gln Arg Thr Lys Ile Ser Asp Cys Ile Ala Asp Tyr Thr
        35                  40                  45

Val Leu Tyr Asn Ser Thr Ser Phe Ser Thr Phe Lys Cys Tyr Gly Val
    50                  55                  60

Ser Pro Ser Lys Leu Ile Asp Leu Cys Phe Thr Ser Val Tyr Ala Asp
65                  70                  75                  80

Thr Phe Leu Ile Arg Phe Ser Glu Val Arg Gln Ile Ala Pro Gly Glu
                85                  90                  95
```

Thr Gly Val Ile Ala Asp Tyr Asn Tyr Lys Leu Pro Asp Asp Phe Thr
            100                 105                 110

Gly Cys Val Leu Ala Trp Asn Thr Ala Gln Gln Asp Ile Gly Ser Tyr
            115                 120                 125

Phe Tyr Arg Ser His Arg Ala Val Lys Leu Lys Pro Phe Glu Arg Asp
130                 135                 140

Leu Ser Ser Asp Glu Asn Gly Val Arg Thr Leu Ser Thr Tyr Asp Phe
145                 150                 155                 160

Asn Pro Asn Val Pro Leu Asp Tyr Gln Ala Thr Arg Val Val Val Leu
                165                 170                 175

Ser Phe Glu Leu Leu Asn Ala Pro Ala Thr Val Cys Gly Pro Lys Leu
            180                 185                 190

Ser Thr Gln Leu Val Lys Asn Arg Cys Val Asn Phe Asn Phe
            195                 200                 205

<210> SEQ ID NO 21
<211> LENGTH: 206
<212> TYPE: PRT
<213> ORGANISM: Artificial Sequence
<220> FEATURE:
<223> OTHER INFORMATION: Rf1 RBD

<400> SEQUENCE: 21

Arg Val Ser Pro Val Thr Glu Val Val Arg Phe Pro Asn Ile Thr Asn
1               5                   10                  15

Leu Cys Pro Phe Asp Lys Val Phe Asn Ala Thr Arg Phe Pro Ser Val
            20                  25                  30

Tyr Ala Trp Glu Arg Thr Lys Ile Ser Asp Cys Val Ala Asp Tyr Thr
        35                  40                  45

Val Phe Tyr Asn Ser Thr Ser Phe Ser Thr Phe Asn Cys Tyr Gly Val
    50                  55                  60

Ser Pro Ser Lys Leu Ile Asp Leu Cys Phe Thr Ser Val Tyr Ala Asp
65                  70                  75                  80

Thr Phe Leu Ile Arg Phe Ser Glu Val Arg Gln Val Ala Pro Gly Gln
                85                  90                  95

Thr Gly Val Ile Ala Asp Tyr Asn Tyr Lys Leu Pro Asp Asp Phe Thr
            100                 105                 110

Gly Cys Val Ile Ala Trp Asn Thr Ala Lys Gln Asp Val Gly Ser Tyr
            115                 120                 125

Phe Tyr Arg Ser His Arg Ser Ser Lys Leu Lys Pro Phe Glu Arg Asp
130                 135                 140

Leu Ser Ser Glu Glu Asn Gly Val Arg Thr Leu Ser Thr Tyr Asp Phe
145                 150                 155                 160

Asn Gln Asn Val Pro Leu Glu Tyr Gln Ala Thr Arg Val Val Val Leu
                165                 170                 175

Ser Phe Glu Leu Leu Asn Ala Pro Ala Thr Val Cys Gly Pro Lys Leu
            180                 185                 190

Ser Thr Ser Leu Val Lys Asn Gln Cys Val Asn Phe Asn Phe
            195                 200                 205

<210> SEQ ID NO 22
<211> LENGTH: 222
<212> TYPE: PRT
<213> ORGANISM: Artificial Sequence
<220> FEATURE:
<223> OTHER INFORMATION: WIV1 RBD

<400> SEQUENCE: 22

Arg Val Ala Pro Ser Lys Glu Val Val Arg Phe Pro Asn Ile Thr Asn
1               5                   10                  15

Leu Cys Pro Phe Gly Glu Val Phe Asn Ala Thr Thr Phe Pro Ser Val
            20                  25                  30

Tyr Ala Trp Glu Arg Lys Arg Ile Ser Asn Cys Val Ala Asp Tyr Ser
            35                  40                  45

Val Leu Tyr Asn Ser Thr Ser Phe Ser Thr Phe Lys Cys Tyr Gly Val
    50                  55                  60

Ser Ala Thr Lys Leu Asn Asp Leu Cys Phe Ser Asn Val Tyr Ala Asp
65                  70                  75                  80

Ser Phe Val Val Lys Gly Asp Val Arg Gln Ile Ala Pro Gly Gln
                85                  90                  95

Thr Gly Val Ile Ala Asp Tyr Asn Tyr Lys Leu Pro Asp Phe Thr
                100                 105                 110

Gly Cys Val Leu Ala Trp Asn Thr Arg Asn Ile Asp Ala Thr Gln Thr
            115                 120                 125

Gly Asn Tyr Asn Tyr Lys Tyr Arg Ser Leu Arg His Gly Lys Leu Arg
    130                 135                 140

Pro Phe Glu Arg Asp Ile Ser Asn Val Pro Phe Ser Pro Asp Gly Lys
145                 150                 155                 160

Pro Cys Thr Pro Pro Ala Phe Asn Cys Tyr Trp Pro Leu Asn Asp Tyr
                165                 170                 175

Gly Phe Tyr Ile Thr Asn Gly Ile Gly Tyr Gln Pro Tyr Arg Val Val
                180                 185                 190

Val Leu Ser Phe Glu Leu Leu Asn Ala Pro Ala Thr Val Cys Gly Pro
            195                 200                 205

Lys Leu Ser Thr Asp Leu Ile Lys Asn Gln Cys Val Asn Phe
        210                 215                 220

<210> SEQ ID NO 23
<211> LENGTH: 222
<212> TYPE: PRT
<213> ORGANISM: Artificial Sequence
<220> FEATURE:
<223> OTHER INFORMATION: SARS RBD

<400> SEQUENCE: 23

Arg Val Val Pro Ser Gly Asp Val Val Arg Phe Pro Asn Ile Thr Asn
1               5                   10                  15

Leu Cys Pro Phe Gly Glu Val Phe Asn Ala Thr Lys Phe Pro Ser Val
            20                  25                  30

Tyr Ala Trp Glu Arg Lys Lys Ile Ser Asn Cys Val Ala Asp Tyr Ser
            35                  40                  45

Val Leu Tyr Asn Ser Thr Phe Phe Ser Thr Phe Lys Cys Tyr Gly Val
    50                  55                  60

Ser Ala Thr Lys Leu Asn Asp Leu Cys Phe Ser Asn Val Tyr Ala Asp
65                  70                  75                  80

Ser Phe Val Val Lys Gly Asp Asp Val Arg Gln Ile Ala Pro Gly Gln
                85                  90                  95

Thr Gly Val Ile Ala Asp Tyr Asn Tyr Lys Leu Pro Asp Asp Phe Met
                100                 105                 110

Gly Cys Val Leu Ala Trp Asn Thr Arg Asn Ile Asp Ala Thr Ser Thr
            115                 120                 125

Gly Asn Tyr Asn Tyr Lys Tyr Arg Tyr Leu Arg His Gly Lys Leu Arg

```
            130                 135                 140
Pro Phe Glu Arg Asp Ile Ser Asn Val Pro Phe Ser Pro Asp Gly Lys
145                 150                 155                 160

Pro Cys Thr Pro Pro Ala Leu Asn Cys Tyr Trp Pro Leu Asn Asp Tyr
                165                 170                 175

Gly Phe Tyr Thr Thr Thr Gly Ile Gly Tyr Gln Pro Tyr Arg Val Val
            180                 185                 190

Val Leu Ser Phe Glu Leu Leu Asn Ala Pro Ala Thr Val Cys Gly Pro
        195                 200                 205

Lys Leu Ser Thr Asp Leu Ile Lys Asn Gln Cys Val Asn Phe
    210                 215                 220

<210> SEQ ID NO 24
<211> LENGTH: 206
<212> TYPE: PRT
<213> ORGANISM: Artificial Sequence
<220> FEATURE:
<223> OTHER INFORMATION: Yun11 RBD

<400> SEQUENCE: 24

Arg Val Ser Pro Ser Thr Glu Val Ile Arg Phe Pro Asn Ile Thr Asn
1               5                   10                  15

Arg Cys Pro Phe Asp Arg Val Phe Asn Ala Ser Arg Phe Pro Ser Val
                20                  25                  30

Tyr Ala Trp Glu Arg Thr Lys Ile Ser Asp Cys Val Ala Asp Tyr Thr
            35                  40                  45

Val Leu Tyr Asn Ser Thr Ser Phe Ser Thr Phe Lys Cys Tyr Gly Val
        50                  55                  60

Ser Pro Ser Lys Leu Ile Asp Leu Cys Phe Thr Ser Val Tyr Ala Asp
65                  70                  75                  80

Thr Phe Leu Ile Arg Phe Ser Glu Val Arg Gln Ile Ala Pro Gly Glu
                85                  90                  95

Thr Gly Val Ile Ala Asp Tyr Asn Tyr Lys Leu Pro Asp Glu Phe Thr
            100                 105                 110

Gly Cys Val Ile Ala Trp Asn Thr Ala Asn Gln Asp Arg Gly Gln Tyr
        115                 120                 125

Tyr Tyr Arg Ser Ser Arg Lys Thr Lys Leu Lys Pro Phe Glu Arg Asp
    130                 135                 140

Leu Ser Ser Asp Glu Asn Gly Val Arg Thr Leu Ser Thr Tyr Asp Phe
145                 150                 155                 160

Tyr Pro Ser Val Pro Leu Glu Tyr Gln Ala Thr Arg Val Val Val Leu
                165                 170                 175

Ser Phe Glu Leu Leu Asn Ala Pro Ala Thr Val Cys Gly Pro Lys Leu
            180                 185                 190

Ser Thr Ser Leu Ile Lys Asn Gln Cys Val Asn Phe Asn Phe
        195                 200                 205

<210> SEQ ID NO 25
<211> LENGTH: 221
<212> TYPE: PRT
<213> ORGANISM: Artificial Sequence
<220> FEATURE:
<223> OTHER INFORMATION: BM-4831 RBD

<400> SEQUENCE: 25

Arg Val Thr Pro Thr Thr Glu Val Val Arg Phe Pro Asn Ile Thr Gln
1               5                   10                  15
```

-continued

Leu Cys Pro Phe Asn Glu Val Phe Asn Ile Thr Ser Phe Pro Ser Val
             20                  25                  30

Tyr Ala Trp Glu Arg Met Arg Ile Thr Asn Cys Val Ala Asp Tyr Ser
         35                  40                  45

Val Leu Tyr Asn Ser Ser Ala Ser Phe Ser Thr Phe Gln Cys Tyr Gly
     50                  55                  60

Val Ser Pro Thr Lys Leu Asn Asp Leu Cys Phe Ser Ser Val Tyr Ala
 65                  70                  75                  80

Asp Tyr Phe Val Val Lys Gly Asp Asp Val Arg Gln Ile Ala Pro Ala
                 85                  90                  95

Gln Thr Gly Val Ile Ala Asp Tyr Asn Tyr Lys Leu Pro Asp Asp Phe
            100                 105                 110

Thr Gly Cys Val Ile Ala Trp Asn Thr Asn Ser Leu Asp Ser Ser Asn
        115                 120                 125

Glu Phe Phe Tyr Arg Arg Phe Arg His Gly Lys Ile Lys Pro Tyr Gly
130                 135                 140

Arg Asp Leu Ser Asn Val Leu Phe Asn Pro Ser Gly Gly Thr Cys Ser
145                 150                 155                 160

Ala Glu Gly Leu Asn Cys Tyr Lys Pro Leu Ala Ser Tyr Gly Phe Thr
                165                 170                 175

Gln Ser Ser Gly Ile Gly Phe Gln Pro Tyr Arg Val Val Val Leu Ser
            180                 185                 190

Phe Glu Leu Leu Asn Ala Pro Ala Thr Val Cys Gly Pro Lys Gln Ser
        195                 200                 205

Thr Glu Leu Val Lys Asn Lys Cys Val Asn Phe Asn Phe
210                 215                 220

<210> SEQ ID NO 26
<211> LENGTH: 222
<212> TYPE: PRT
<213> ORGANISM: Artificial Sequence
<220> FEATURE:
<223> OTHER INFORMATION: BtKY72 RBD

<400> SEQUENCE: 26

Arg Val Ser Pro Ser Thr Glu Val Val Arg Phe Pro Asn Ile Thr Asn
 1               5                  10                  15

Leu Cys Pro Phe Gly Gln Val Phe Asn Ala Ser Asn Phe Pro Ser Val
             20                  25                  30

Tyr Ala Trp Glu Arg Leu Arg Ile Ser Asp Cys Val Ala Asp Tyr Ala
         35 40 45

Val Leu Tyr Asn Ser Ser Ser Ser Phe Ser Thr Phe Lys Cys Tyr Gly
50 55 60

Val Ser Pro Thr Lys Leu Asn Asp Leu Cys Phe Ser Ser Val Tyr Ala
65 70 75 80

Asp Tyr Phe Val Val Lys Gly Asp Asp Val Arg Gln Ile Ala Pro Ala
85 90 95

Gln Thr Gly Val Ile Ala Asp Tyr Asn Tyr Lys Leu Pro Asp Asp Phe
100 105 110

Thr Gly Cys Val Leu Ala Trp Asn Thr Asn Ser Val Asp Ser Lys Ser
115 120 125

Gly Asn Asn Phe Tyr Tyr Arg Leu Phe Arg His Gly Lys Ile Lys Pro
130 135 140

Tyr Glu Arg Asp Ile Ser Asn Val Leu Tyr Asn Ser Ala Gly Gly Thr
145 150 155 160

-continued

```
Cys Ser Ser Ile Ser Gln Leu Gly Cys Tyr Glu Pro Leu Lys Ser Tyr
            165                 170                 175

Gly Phe Thr Pro Thr Val Gly Val Gly Tyr Gln Pro Tyr Arg Val Val
            180                 185                 190

Val Leu Ser Phe Glu Leu Leu Asn Ala Pro Ala Thr Val Cys Gly Pro
            195                 200                 205

Lys Lys Ser Thr Glu Leu Val Lys Asn Lys Cys Val Asn Phe
210                 215                 220
```